United States Patent [19]
Hirota

[11] Patent Number: 5,398,124
[45] Date of Patent: Mar. 14, 1995

[54] IMAGE PROCESSOR

[75] Inventor: Yoshihiko Hirota, Toyokawa, Japan

[73] Assignee: Minolta Camera Kabushiki Kaisha, Osaka, Japan

[21] Appl. No.: 905,112

[22] Filed: Jun. 26, 1992

[30] Foreign Application Priority Data

Jun. 29, 1991 [JP] Japan .................................. 3-159232
Jun. 29, 1991 [JP] Japan .................................. 3-159257
Jun. 29, 1991 [JP] Japan .................................. 3-185442

[51] Int. Cl.⁶ .............................................. H04N 1/40
[52] U.S. Cl. ............................. 358/530; 358/501;518
[58] Field of Search ............... 358/500, 501, 518, 520, 358/521, 523, 530, 533, 537, 538, 443, 447, 448, 452, 458, 462, 468; 355/218, 246, 266, 326 R, 327

[56] References Cited

U.S. PATENT DOCUMENTS

| | | |
|---|---|---|
| 4,763,190 | 8/1988 | Froelich . |
| 4,878,125 | 10/1989 | Katayama et al. .................. 358/443 |
| 4,908,712 | 3/1990 | Uchiyama et al. .................. 358/298 |
| 4,965,664 | 10/1990 | Udagawa et al. ..................... 358/80 |
| 4,989,079 | 1/1991 | Ito ........................................ 358/80 |
| 4,992,863 | 2/1991 | Moriya ................................. 358/80 |
| 5,047,844 | 9/1991 | Ikeda et al. . |
| 5,119,187 | 6/1992 | Ikeda et al. . |
| 5,144,688 | 9/1992 | Bovir et al. . |

*Primary Examiner*—Bentsu Ro
*Attorney, Agent, or Firm*—Burns, Doane, Swecker & Mathis

[57] ABSTRACT

In an image possessor, two kinds of color differences in the orthogonal coordinate axes in the hue plane in the color space are separated from the digital data of three primary colors, and the separate color signals are synthesized to generate the chroma signal. When the digital data of the three primary colors are converted to the data of the reproduction colors with use of the under color remove amount and the black paint amount, an under color remove amount is subtracted from the digital data of the three primary colors, while a black paint amount which is the black data obtained from the digital data is generated to print with black toners. The under color remove amount and the black paint amount are increased with increase in the chroma signal according to the color data of the three primary colors and the chroma signal at the same pixel position. The edge emphasis is performed not on the image data of the three primary colors in the subtractive color system, but on the image data of the black color, in an edge image portion of achromatic color. Further, in the edge emphasis, a first change in the value signal and a second change in the image data for image reproduction are detected, and the two changes are synthesized. Then, the edge emphasis is conducted on the image data for printing or on the image data for color reproduction according to the synthesized change.

12 Claims, 74 Drawing Sheets

(c) $\frac{1}{4}a1+\frac{3}{4}f1$, $\frac{1}{4}a2+\frac{3}{4}f2$, $\frac{1}{4}a3+\frac{1}{4}f3$, $\frac{1}{4}a4+\frac{3}{4}f4$, $\frac{1}{4}a5+\frac{3}{4}f5$, $\frac{1}{4}a6+\frac{3}{4}f6$ (d) f1, f2, f3, f4, f5, f6

(e) f1, f2, f3, f4, f5, f6, f7, f8, f9

(f) f1, f2, f3, f4, f5

(g) f1, f2, f3, f4, f5, f6, f7

(h) a1, a2, a3, a4, a5, a6, a7

(i) a1−f1, a2−f2, a3−f3, a4−f4, a5−f5, a6−f6

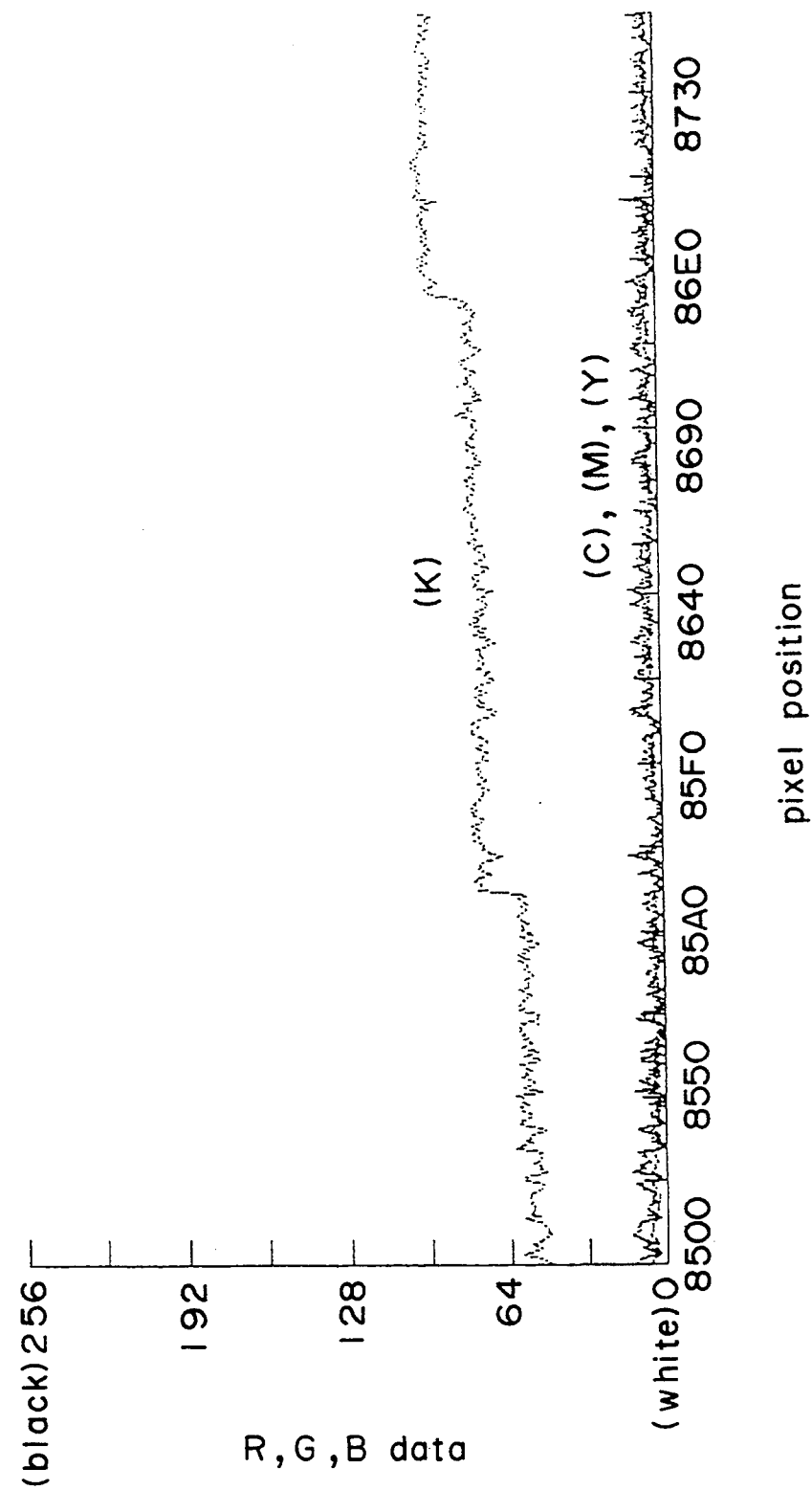

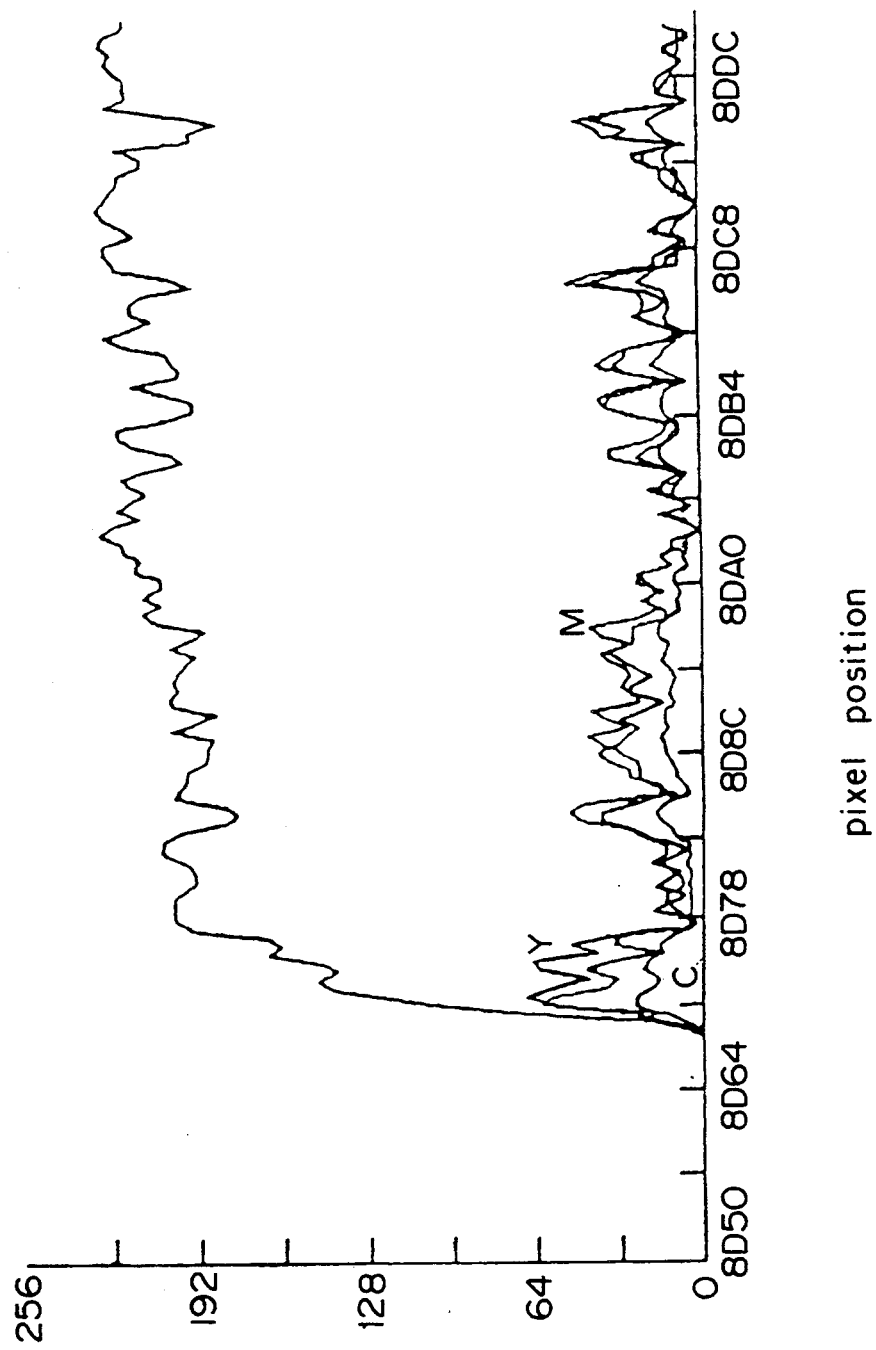

IMAGE PROCESSOR

BACKGROUND OF THE INVENTION

1 Field of the Invention

The present invention relates to an image processor which processes digital image data for image reproduction.

2. Description of the Related Art

In a printer or the like wherein an image of full color is reproduced, digital image data R, G, B of three primary colors of red, green and blue of the additive color system which have been read by scanning a document are converted for image reproduction to data C, M, Y of three colors of cyan, magenta and yellow for color reproduction (of subtractive color system).

In the data processing of a full color image to convert the digital data of red, green and blue of the three primary colors to the data of the colors for image reproduction, it is demanded to reconcile the purity of black and the brightness of chromatic colors.

In the reproduction of black in a full color image, when black is reproduced by overlaying cyan, magenta and yellow, it is difficult to reproduce pure black due to the effects of the spectral characteristics of each toner. Then, the reproducibility of black is improved by using the subtractive mixing of the reproduction color data C, M and Y and black painting of black data K. That is, the reproduction color data C, M and Y are subtracted by a certain amount (under color remove amount), while the black data K is obtained from the reproduction color data C, M and Y to reproduce black by using black toner. However, in this method, though the purity of black is improved with increasing the degree of black painting, whereas the brightness of chromatic colors is deteriorated.

As explained above, the reproducibility of black and the improvement of the brightness of full color are not compatible as to the under color remove amount for chromatic colors and the amount of black paint for black. Therefore, it is necessary to control optimally the subtraction amount for chromatic colors and the amount of black paint for black.

It is better to emphasize an edge for an image such as a character. The read data is converted to the density data in order to adjust to the sense of naked eyes. When the edge emphasis is conducted on the data after the density conversion of the read data, the following problems arise: As to an edge portion of a character or a narrow line, the data changes more smoothly than before the density conversion, and sufficient edge emphasis is not performed. Further, the data change at the high density side is large so that an edge is easily detected at the high density side and even image noises are emphasized. This is ascribable to that the slope of the -log characteristic is small at the low density side and large at the high density side. As to a full color image, the hue changes if the edge emphasis is performed on the data after the color correction.

SUMMARY OF THE DISCLOSURE

It is an object of the present invention to provide an image processor wherein the under color remove amount and the black paint amount can be controlled optimally in order to reconcile the reproducibility of black and the improvement of the chromaticity of the chromatic colors.

It is another object of the present invention to provide an image processor wherein the edge emphasis can be performed optimally.

In one aspect of the present invention, the digital image data R, G, B of three primary colors are converted to the value V and the chroma W. That is, two kinds of color differences B-V, R-V in the orthogonal coordinate axes in the hue plane in the color space are obtained from the digital data R, G, B, to be synthesized to generate the chroma signal. When the digital data R, G, B are converted to the data of the reproduction colors, an under color remove amount is subtracted from the digital data of the three primary colors, while a black paint amount which is the black data obtained from the digital data is generated to print with black toners. The under color remove amount and the black paint amount are increased with increase in the chroma signal according to the color data of the three primary colors and the chroma signal at the same pixel position. Because the data of the reproduction colors and the black are determined according to the under color remove amount, the black paint amount, the digital data and the chroma, the erroneous decision decreases and the range of the control is extended to 100%. Thus, the under color remove amount and the black paint amount can be determined optimally.

In another aspect of the present invention, the edge emphasis is performed not on the image data of the three primary colors in the subtractive color system, but on the image data of the black color, in an edge image portion of achromatic color.

Further, in the edge emphasis, a first change in the value signal and a second change in the image data for image reproduction are detected, and the two changes are synthesized. Then, the edge emphasis is conducted on the image data for printing or on the image data for color reproduction according to the synthesized change.

It is an advantage of the present invention that the under color remove amount and the black paint amount can be determined optimally in the reproduction of a full color image.

BRIEF DESCRIPTION OF THE DRAWINGS

These and other objects and features of the present invention will become clear from the following description taken in conjunction with the preferred embodiments thereof with reference to the accompanying drawings, and in which:

FIG. 13 is another part of the timing chart at the positions (a)-(i);

FIG. 38 is a graph of a part of the result of automatic UCR/BP processing of the data shown in FIG. 37;

FIG. 43 is a diagram of the result of automatic UCR/BP processing of the data of FIG. 39;

DETAILED DESCRIPTION OF THE PREFERRED EMBODIMENTS

Figure 1:
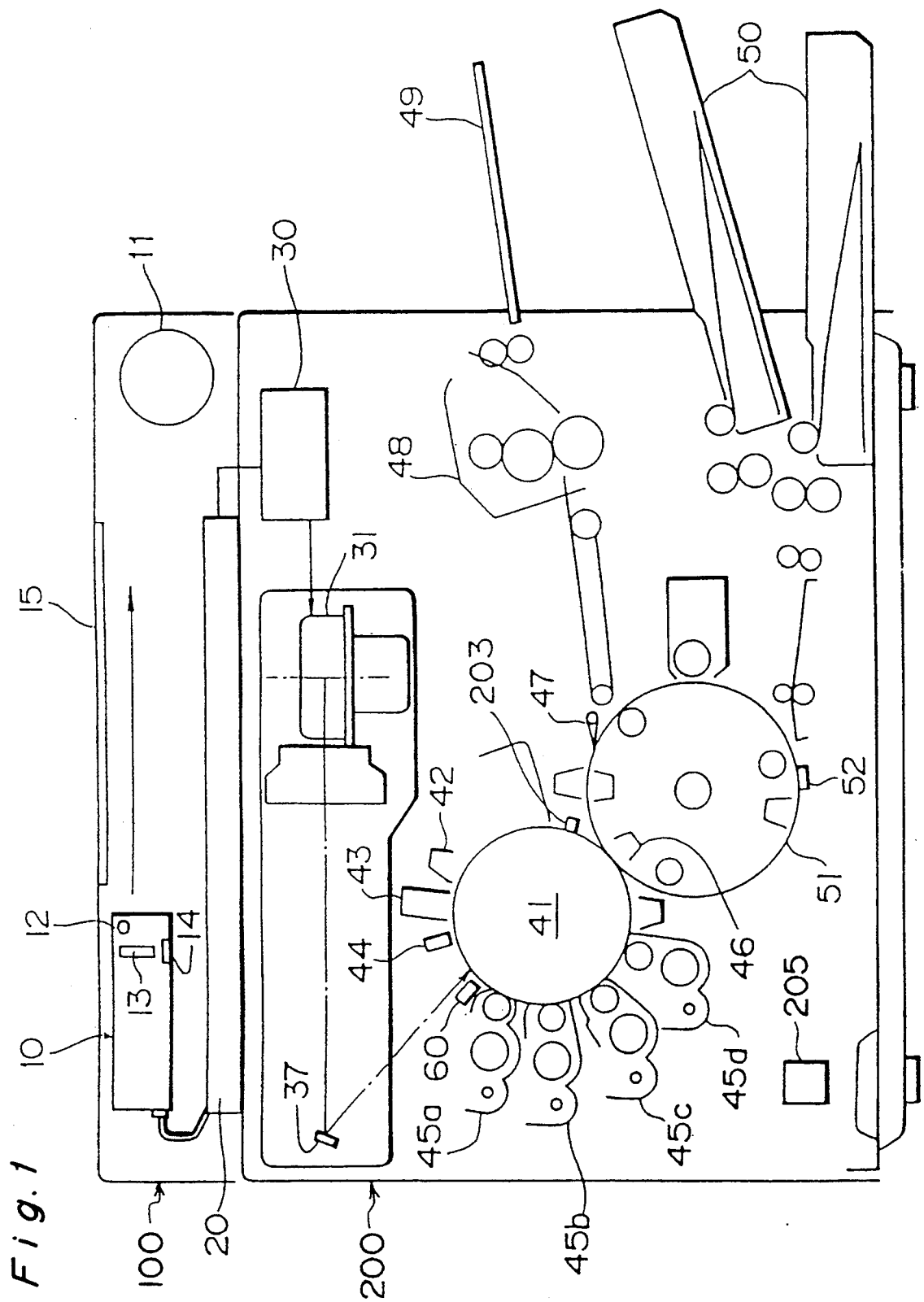
FIG. 1 is a sectional view of a full-color copying machine.

A digital color copying machine of an embodiment of the present invention will be explained below in the following order:

(a) structure of digital color copying machine
(b) image data processor
(c) shading correction
(d) HVC conversion
(d-1) R, G, B read position correction
(d-2) separation of chroma and hue
(d-3) circuit of HVC conversion section
(e) density conversion
(f) region discrimination (f-1) circuit of region discrimination section
(f-2) automatic control of under color remove/black painting (UCR/BP)
(f-3) automatic control of edge emphasis
(f-4) decision of achromatic edge portion
(g) color correction
(g-1) automatic UCR/BP processing
(g-2) masking processing
(g-3) example of automatic UCR/BP processing
(g-4) monochromatic color mode and color change mode
(g-5) bordering processing
(g-6) circuit of color correction section
(h) MTF correction
(h-1) circuit of MTF correction section
(h-2) smoothing
(h-3) edge emphasis
(h-4) edge emphasis and sharpness mode
(h-5) color blur correction
(h-6) contour extraction mode
(h-7) examples of automatic MTF correction
(a) structure of digital color copying machine Referring now to the drawings, wherein like reference characters designate like or corresponding parts throughout the views, FIG. 1 shows a schematic structure of a digital color copying machine which consists mainly of an image reader 100 for reading a document image and a main body 200 for reproducing the document image.

In FIG. 1, a scanner includes an exposure lamp 12, a rod lens array 13 to collect reflection light from a document put on a platen 15 and a contact type CCD color image sensor 14 to convert the collected light to an electric signal. The scanner 10 is driven by a motor 11 to move in the direction (subscan direction) of the arrow shown in FIG. 1. The optical image of the document illuminated by the exposure lamp 12 is converted by the image sensor 14 into a multi-level electric signal of red (R), green (G) and blue (B). The electric signal is converted by an image signal processor 20 to gradation data of yellow (Y), magenta (M), cyan (C) or black (K). Then, a print head 31 performs the gamma correction of the gradation data and a dither processing if necessary, and it converts the corrected data to a digital drive signal to drive a laser diode 221 (not shown) in the print head 31.

A laser beam emitted from the laser diode 221 according to the gradation data exposes a photoconductor drum 41 driven to be rotated, via a reflection mirror 37 as shown with a dot and dash line. Thus, an image of the document is formed on the photoconductor of the drum 41. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of developers 45a–45d of yellow, magenta, cyan and black toners is selected to develop the latent image. The developed image is transferred by a transfer charger 46 to a paper wound on a transfer drum 51.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of an isolation claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 2:
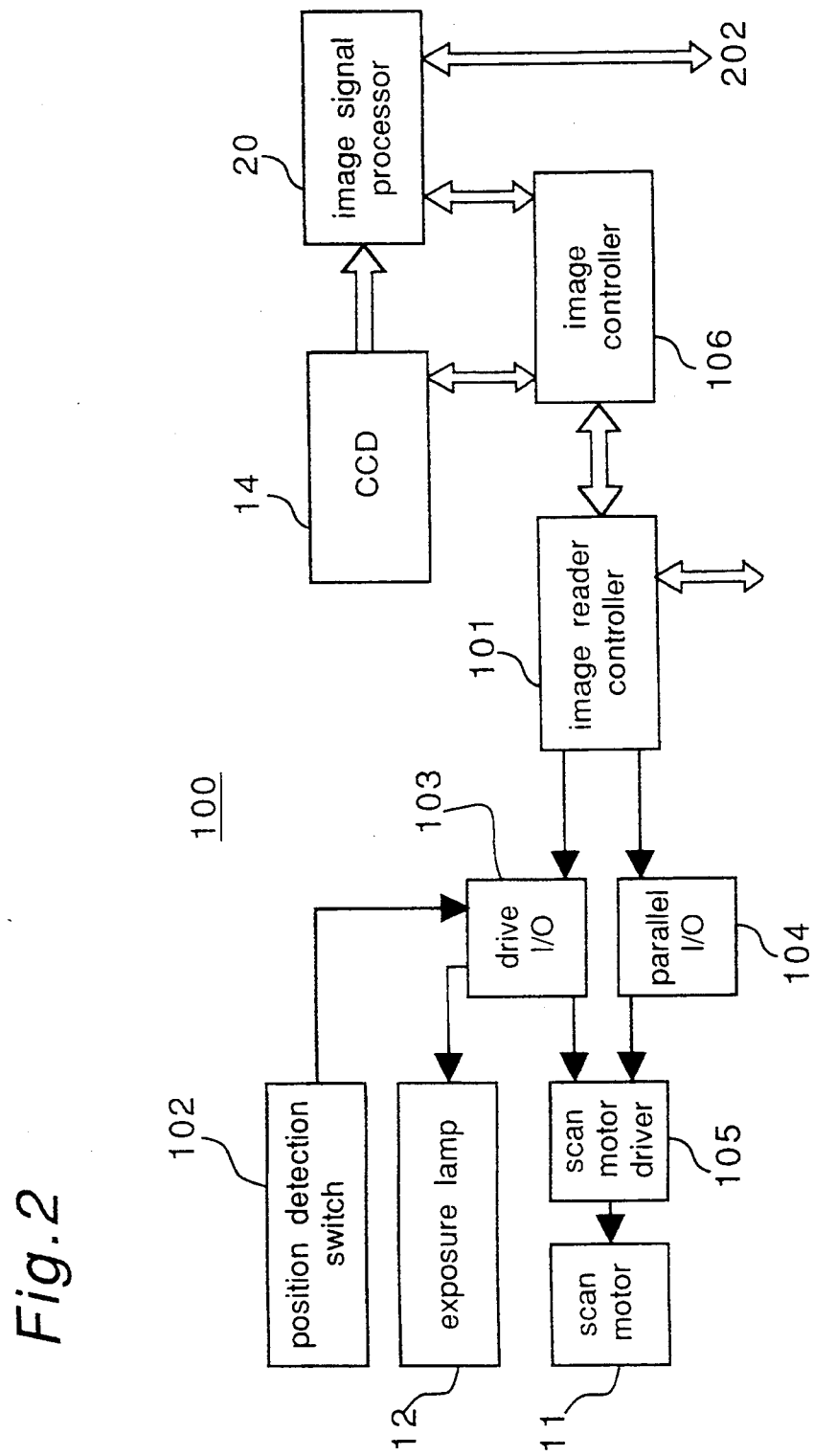
FIG. 2 is a block diagram of a part of the control system of the copying machine.
Figure 3:
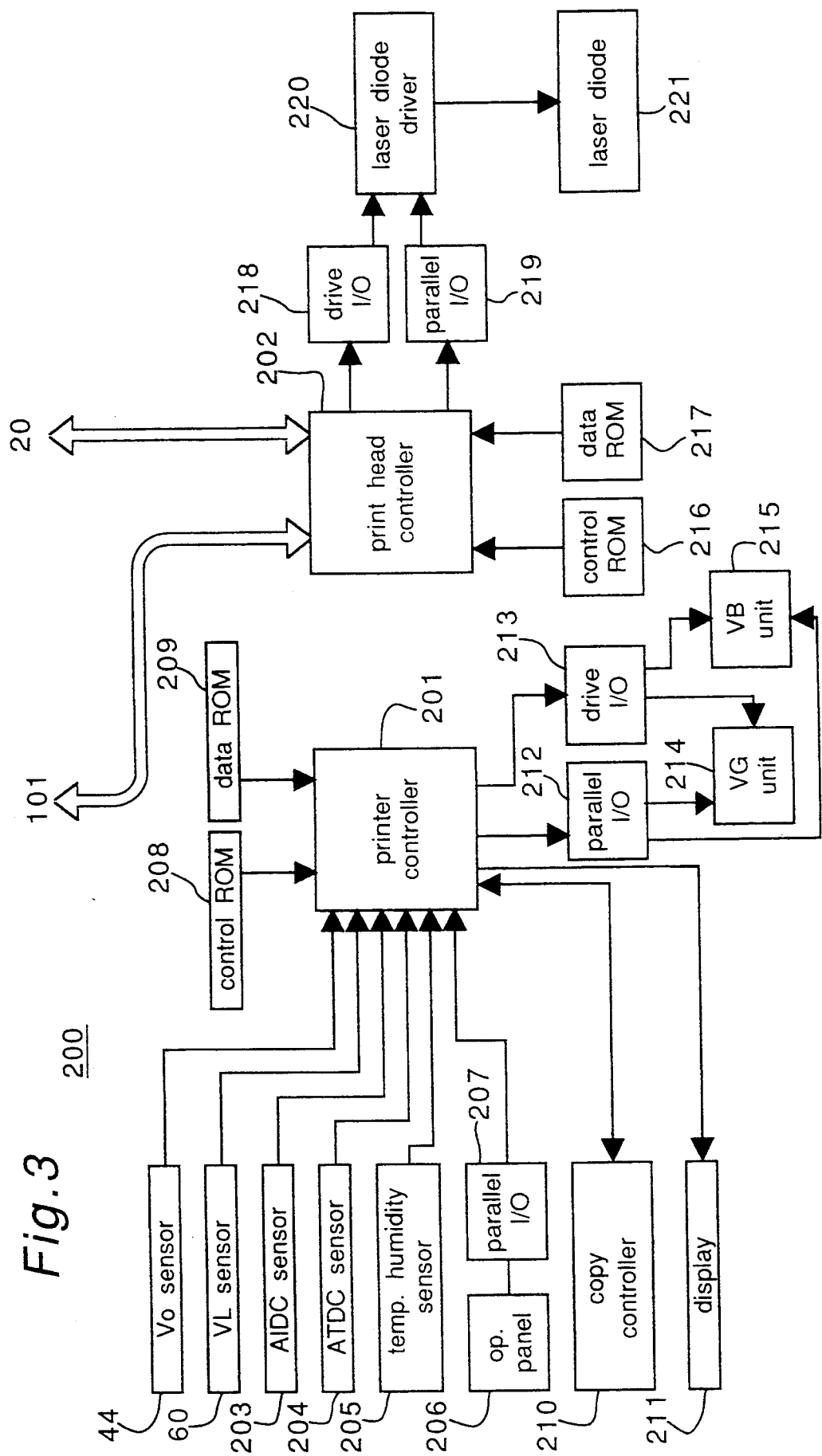
FIG. 3 is a block diagram of the other part of the control system of the copying machine.

FIGS. 2 and 3 show a whole block diagram of the control system of the digital color copying machine. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O 103. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

The main body 200 includes a printer controller 201 for controlling the copying action and a print head controller 202 for controlling the print head 31. The printer controller receives analog signals from various sensors 44, 60 and 203–205 for automatic density control. Various data inputted with an operational panel 206 are sent to the printer controller 201 via a parallel I/O 207. The printer controller 201 is connected to a control ROM 208 storing a control program and a data ROM 217 storing various data. The printer controller 201 controls a copying controller 210 and the display panel 211 according to the data from the operational panel 206 and the data ROM 209 under the contents of the control ROM 208. Further, the printer controller 201 controls high voltage units 214 and 215 for the grid voltage of the sensitizing charger 43 and for the developer bias voltage of the developer 45a–45d.

The print head controller 202 acts according to the control program stored in the control ROM 216. The print head controller 202 is connected to the image signal processor 202 of the image reader 100 via an image bus and performs gamma correction on the basis of the image signal received via the image data bus with reference to a conversion table stored in the data ROM 217. Further, a dither processing is performed if necessary to express gradation. Then, the print head controller 202 controls the laser diode controller 220 via the drive I/O 218 and a parallel I/O 216, and the laser diode controller 220 controls the emitting of the laser diode 221. Further, the print head controller 202 is synchronized with the printer controller 201 and with the image signal processor 20 to each other via the buses.

Figure 4:
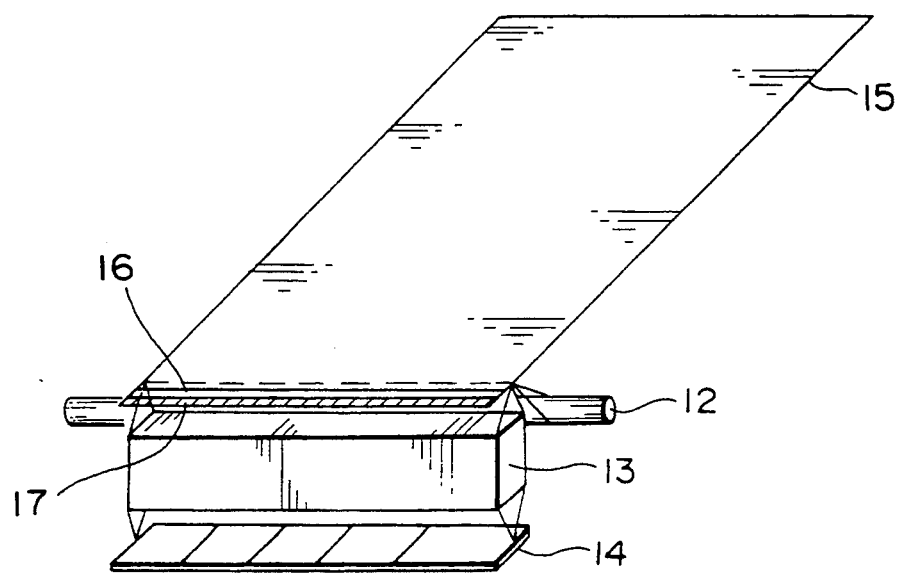
FIG. 4 is a perspective view of a reading device.

FIG. 4 shows a perspective view of a reading device, in which a surface of a document placed on the platen 15 is illuminated by the light source (halogen lamp) 12 having an optical spectrum of three wavelengths (R, G and B). The light reflected from the document is focused with the rod lens array 13 linearly on the light-receiving plane of the CCD sensor 14. The optical system including the rod lens array 13, the light source 12 and the CCD color image sensor 14 is moved in the direction of the arrow shown in FIG. 1, and the optical information of the document is converted to an electrical signal by the CCD color image sensor 14.

Further, a white standard plate 16 and a black standard plate 17 for the shading correction are provided adjacent a side of the platen 15.

(b) structure of image signal processor

Figure 5:
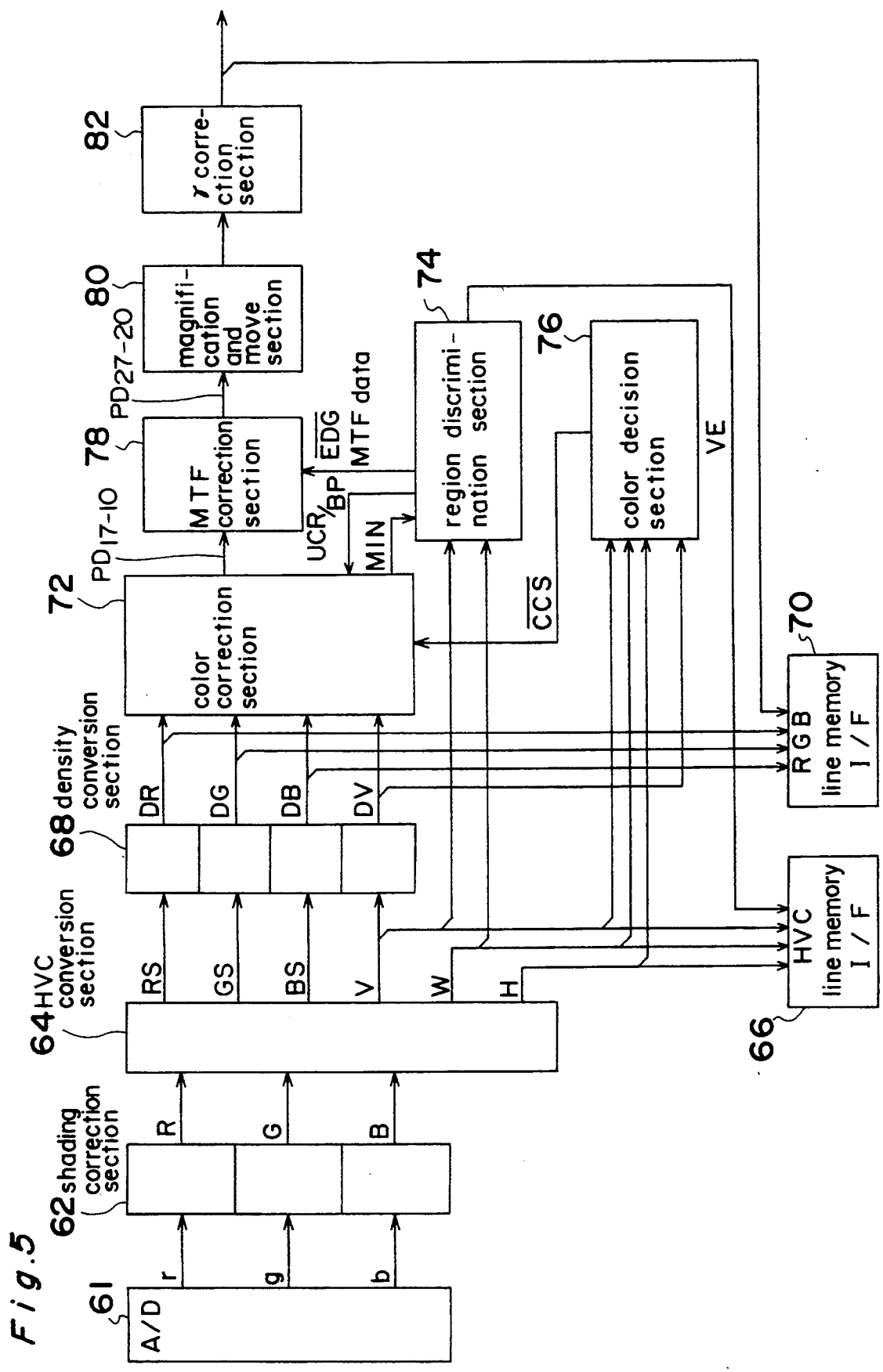
FIG. 5 is a block diagram of an image signal processor.

FIG. 5 shows a block diagram of the image signal processor 20, and the processing of the image data from the CCD color image sensor 14 via the image signal processor 20 to the print head controller 202 is explained below.

In the image signal processor 20, the image signal obtained by the photoelectric conversion by the CCD sensor 14 is converted to multi-value digital image data of $r_{7-0}$, $g_{7-0}$ and $b_{7-0}$ of red, green and blue of the three primary colors with an A/D converter 61. The converted image data is normalized with shading correction by a shading correction section 62 to generate image data of $R_{7-0}$, $G_{7-0}$ and $B_{7-0}$ of red, green and blue. Then, the image data are converted to data $V_{7-0}$, $W_{7-0}$ and $H_{7-0}$ of value, chroma and hue by an HVC converter 64, and the converted data is sent to an HVC line memory interface 66.

On the other hand, the image data of $R_{7-0}$, $G_{7-0}$ and $B_{7-0}$ which are outputted as image data of $RS_{7-0}$, $GS_{7-0}$ and $BS_{7-0}$ by the HVC converter 64 are reflection data of the document. Then, the image data $RS_{7-0}$, $GS_{7-0}$ and $BS_{7-0}$ are converted by a density conversion section 68 to density data $DR_{7-0}$, $DG_{7-0}$ and $DB_{7-0}$ of the actual image according to logarithmic conversion. The converted data are sent to a color correction section 72 and to an RGB line memory interface 70.

Further, a regional discrimination section 74 decides the region and the color according to the data $V_{7-0}$, $W_{7-0}$ and $H_{7-0}$ of value, chroma and hue, and sends UCR/BP ratios to the color correction section 72 and sends MTF data and a control data $\overline{EDG}$ to an MTF correction section 78. Further, the data V, W, H are decided as to the color in a color decision section 76, which sends a signal $\overline{CCS}$ to the color correction section 72.

The color correction section 72 processes the black data generation and the masking at the same time. That is, a black data is generated and the black data is subtracted from the density data DR, DG and DB, while the density data DR, DG and DB are converted to data of the three reproduction colors, cyan, magenta and yellow.

Further, the MTF correction section 78 selects a digital filter according to a signal from the region discrimination section 74 to conduct optimum smoothing processing or edge emphasis processing. Color blur correction and contour extraction are also performed.

Next, a magnification and remove section 80 changes the magnification. Further, a gamma correction section adjusts the color balance and sends the obtained data to the print head controller 202.

Figure 6:
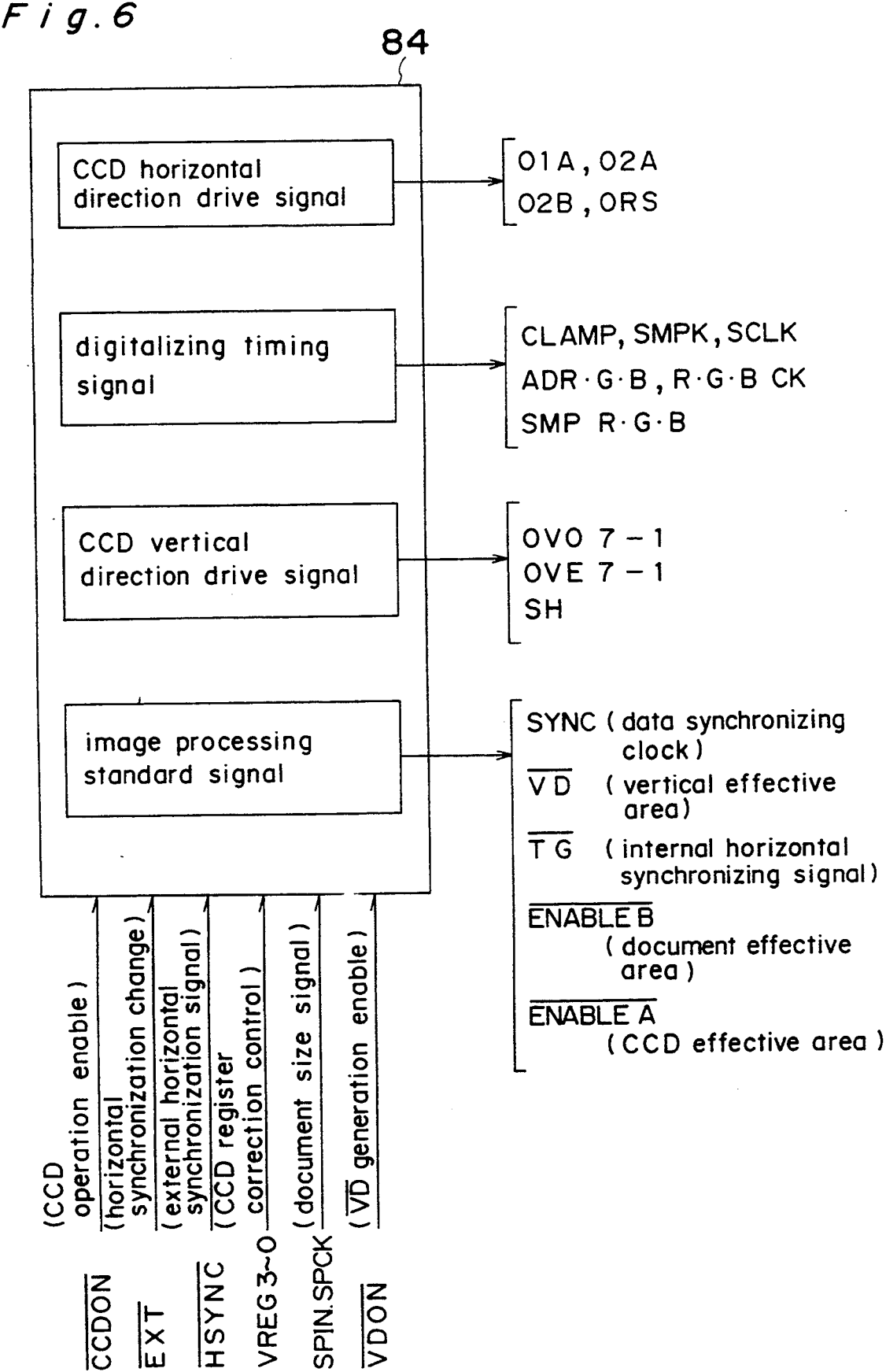
FIG. 6 is a circuit diagram of a timing controller.

FIG. 6 shows a timing generator 84 which generates timing signals for the image signal processor 20. The timing generator 84 generates a drive signal for CCD in the horizontal (main scan) direction, a drive signal for CCD in the vertical (subscan) direction, a timing signal of the digitalization of the A/D converter 61 and image processing standard signals.

Figure 7:
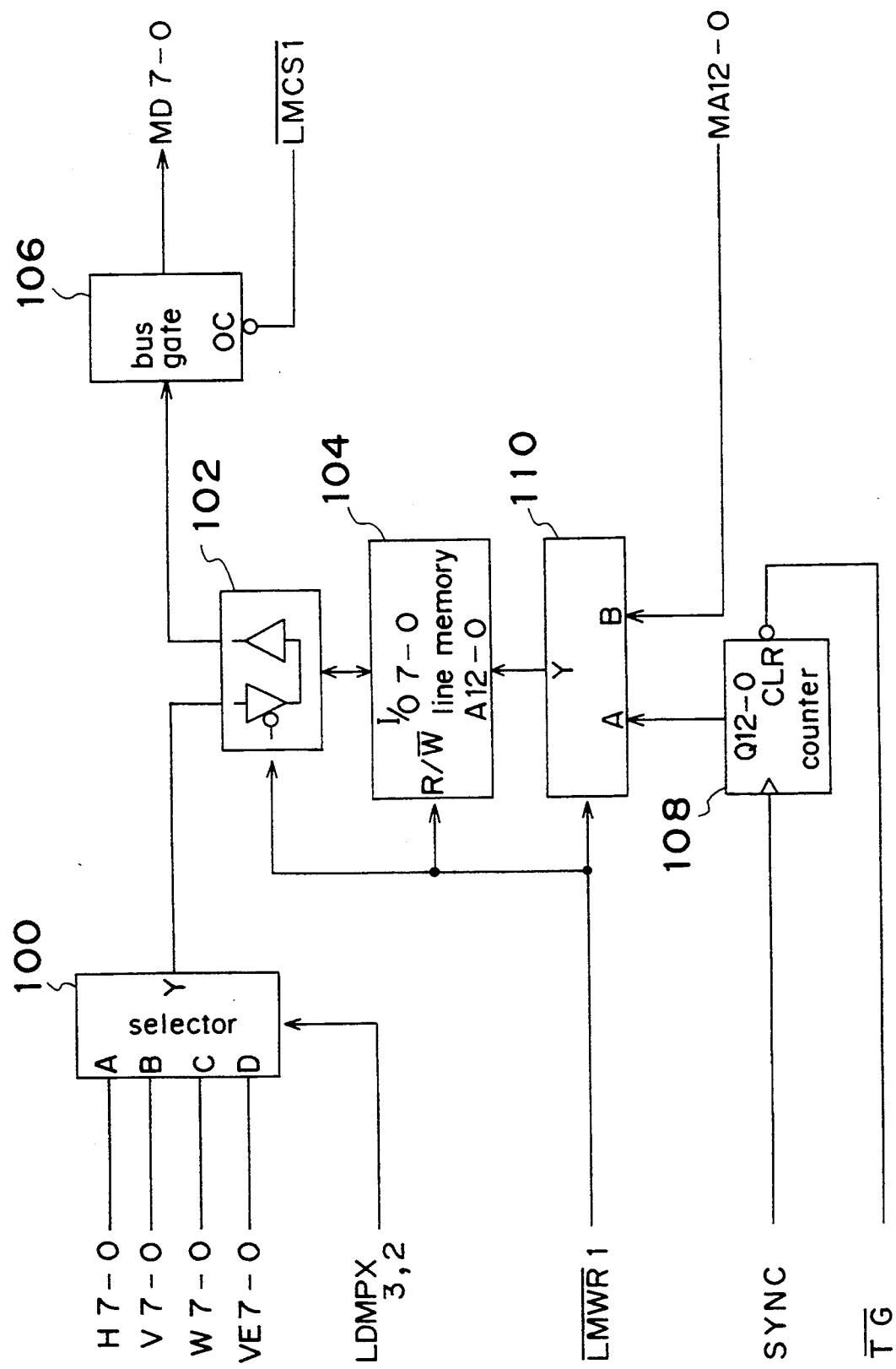
FIG. 7 is a circuit diagram of an HVC line memory interface.

FIG. 7 shows a circuit diagram of the HVC line memory interface 66. The image data $V_{7-0}$, $W_{7-0}$ and $H_{7-0}$ and an average value $V_E$ sent from the HVC converter 64 are stored in the H,V,C line memory 104 via a selector 100 and a bi-directional buffer 102, and are read via the bi-directional buffer 102 and a bus gate 106 by a CPU 140 (FIG. 9) which controls the image signal processor 20. As shown in Table 1, the kinds of write data and the address are controlled via an address counter 108 and a selector 110.

TABLE 1

| $\overline{LMWR1}$ | LDMPX 3,2 | write data into H, V, C, line memory |
|---|---|---|
| "L" | 0 | $H_{7-0}$ (hue) |
|  | 1 | $V_{7-0}$ (value) |
|  | 2 | $W_{7-0}$ (chroma) |
|  | 3 | $V_{E7-0}$ (change in value) |
| "H" | — | none |

Figure 8:
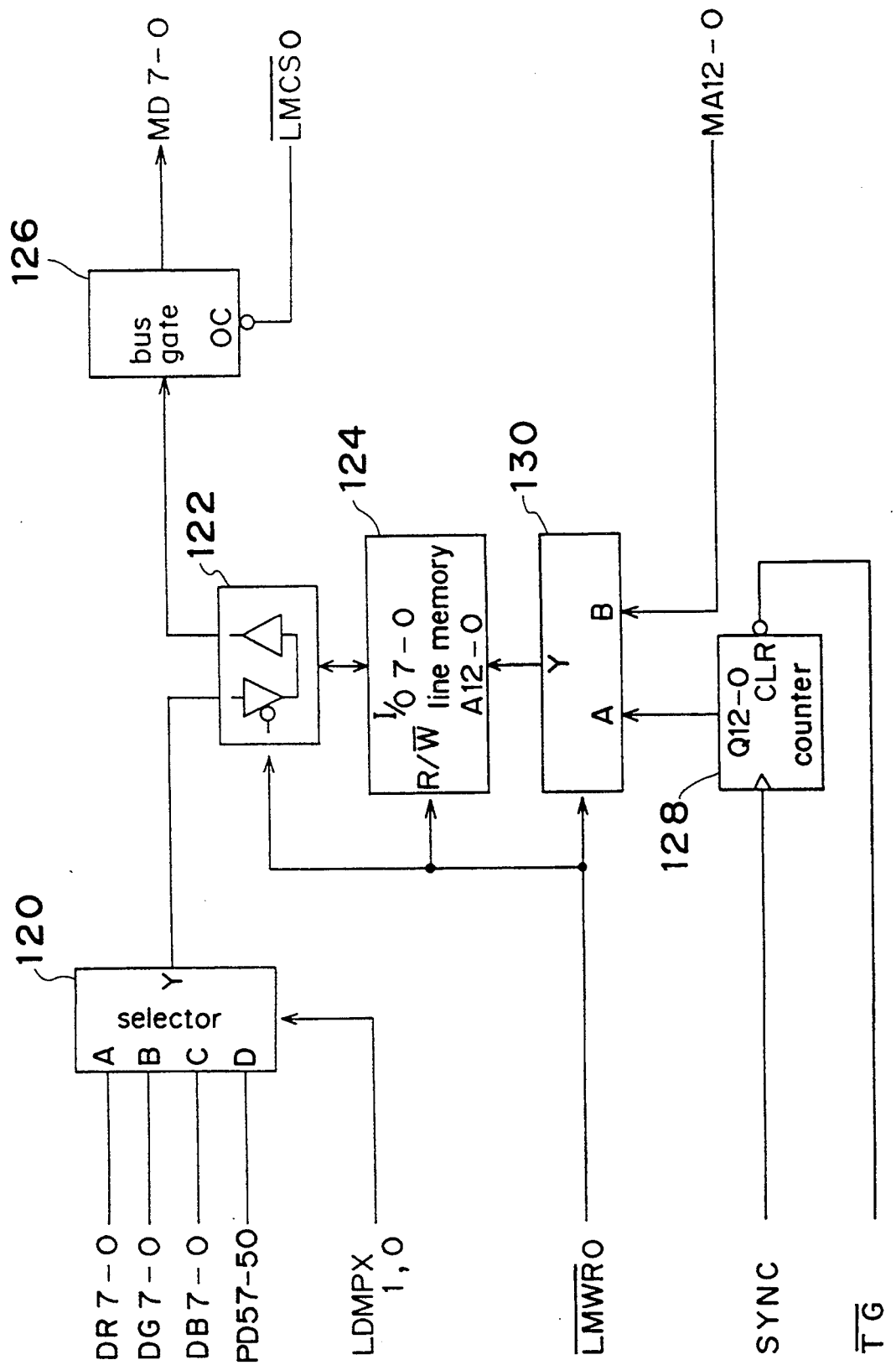
FIG. 8 is a circuit diagram of an RGB line memory interface.
Figure 9:
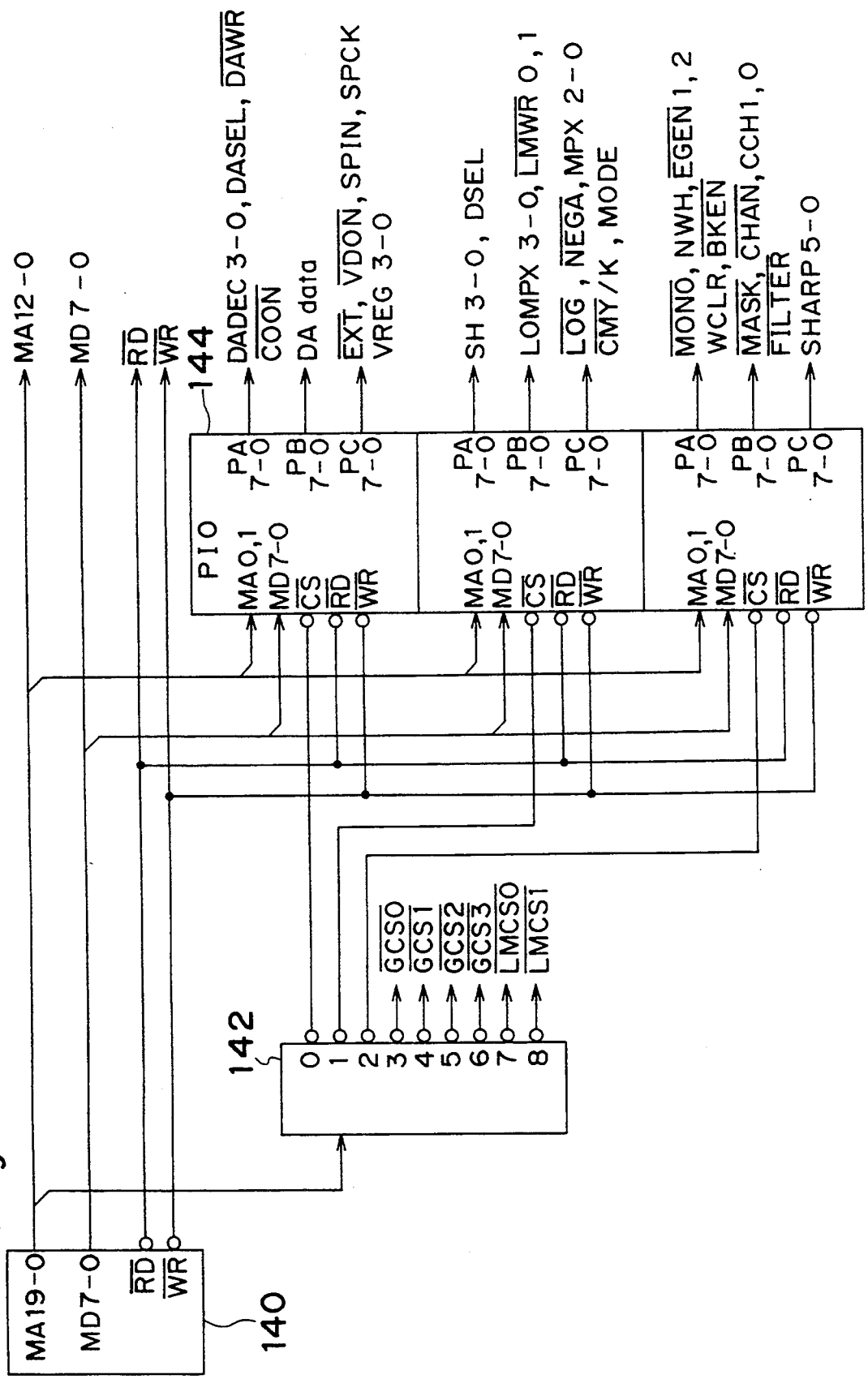
FIG. 9 is a diagram of the peripheral of CPU.

FIG. 8 shows a circuit diagram of the RBG line memory interface 70. Image data $DR_{7-0}$, $DG_{7-0}$ and $DB_{7-0}$ sent from the density conversion section 68 are stored in the RGB line memory 124 via a selector 120 and a bi-directional buffer 122, and are read via the bi-directional buffer 122 and a bus gate 126 by the CPU 140 (FIG. 9). As shown in Table 2, the kinds of write data and the address are controlled via an address counter 128 and a selector 130.

TABLE 2

| $\overline{LMWR0}$ | LDMPX 1,0 | write data into R, G, B line memory |
|---|---|---|
| "L" | 0 | $DR_{7-0}$ (red) |
|  | 1 | $DG_{7-0}$ (green) |
|  | 2 | $DB_{7-0}$ (blue) |
|  | 3 | $PD_{57-50}$ (output data to printer) |
| "H" | — | none |

FIG. 9 shows a circuit diagram of a CPU peripheral circuit. The CPU 140 monitors image data via the HVC and RGB line memory interfaces 66, 70, and conducts the detection of document size, the detection of system anomaly and the automatic control of the signals of the CCD sensor 14. Further, the CPU 140 sets parameter signals according to read mode or edit mode of image processing. That is, various kinds of parameter signals are outputted via a decoder 142 through three parallel I/O circuits 144 to each component in the image signal processor 20.

(c) shading correction

Figure 10:
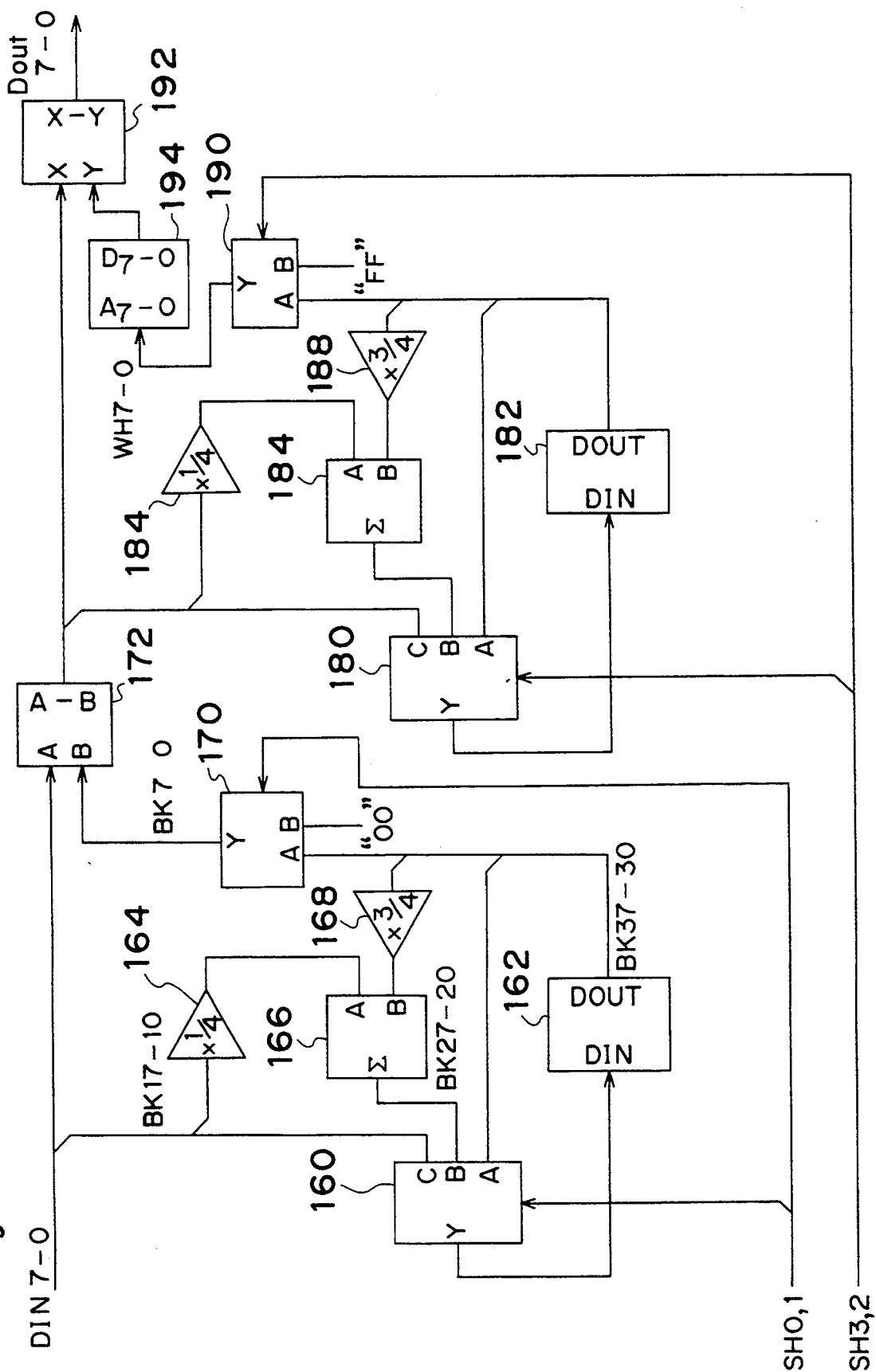
FIG. 10 is a circuit diagram of a shading correction section.

FIG. 10 shows the shading correction section 62 which will be explained later. The shading correction section 62 corrects the black and white levels on the image data read by the CCD sensor 14 and performs the normalization according to the following formula:

DOUT=(DIN—BK).255/WH, wherein DIN denotes the document read data r, g, b of the three primary colors, WH denotes the read data of the shading standard white plate 16 and BK denotes the black level data of the CCD sensor 14. The correction is performed independently for each of the color data r, g, b.

The black level correction corrects the scattering of background sensitivity level of each dot of the CCD sensor 14. Therefore, each of the read data r, g and b of the CCD sensor 14 are stored in a FIFO memory 162 which is a line memory of one line, when there is no incident light. Then, the data WH are subtracted from the document read data DIN. This processing also removes the offsets of the digital signals.

The standard read data for the black level correction may be obtained be reading the white standard plate 16

(FIG. 4) after turning off the exposure lamp 12. Moreover, the standard read data may also be obtained by reading the black standard plate 17 (FIG. 4).

On the other hand, the white level correction removes the nonuniformity of the sensitivity of the elements of the CCD sensor 14 and the scattering in the main scan direction of light distribution of the optical system. Then, the read data WH of the white standard plate 16 of shading correction are stored in the FIFO memory 182, and the document read data DIN are multiplied with the inverse of the read data WH for correction. This processing has a function to normalize the output of the CCD sensor 14 of the three primary color data. Therefore, it also performs the white balance correction in order to make the ratio of R, G, B data of a white document constant.

One of the problems of the shading correction is that when the standard data for shading correction is determined according to one line of sampling data and the sampling data include image noises, image noises always appears at the same pixel positions on the image data after the shading correction.

There are many factors which generate image noises such as power supply noises in the system or cross-talk noises in the clock system. If the dynamic range (reference voltage) of the A/D conversion is about 2.39 V and it is converted to an 8-bit data, 1 LSB corresponds to about 9.3 mV. The image noises worsen the S/N ratio for image data before the A/D conversion.

Then, if the standard data BK and WH for correction are determined with use of sampling data of a plurality of lines, image noises may be reduced.

One method of this type of the correction is to provide a memory for a plurality of lines to determine the standard data for correction. On the contrary, in this embodiment, the correction is performed by using a line memory of one line and by obtaining a cumulative average of the data of a plurality of lines.

In this embodiment, as shown in Tables 3 and 4, four mode are provided as to the corrections of the BK and WH levels: initial value mode, data generation mode, hold mode and correction mode. These modes are selected according to a mode selection signal $SH_{0-3}$ supplied by the CPU 140 (FIG. 9) for each of the corrections of the BK and WH levels.

TABLE 3

| $SH_{1,0}$ | BK level correction mode | selecter 160 | selecter 170 |
| --- | --- | --- | --- |
| 0 | initial value mode | C | B |
| 1 | data generation mode | B | B |
| 2 | hold mode | A | B |
| 3 | correction mode | A | A |

TABLE 4

| $SH_{3,2}$ | WH level correction mode | selecter 180 | selecter 190 |
| --- | --- | --- | --- |
| 0 | initial value mode | C | B |
| 1 | data generation | B | B |
| 2 | hold mode | A | B |
| 3 | correction mode | A | A |

In the initial value mode, initial values are stored in the FIFO memories 162, 182 of line memories for one line.

In the data generation mode, the data in the FIFO memory and the standard data received successively are averaged with weights, and the standard data for correction are generated at a high precision with a cumulative average technique.

In the correction mode, the standard data for correction obtained in the data generation mode are outputted and held at the same time to correct the BK and WH levels for the document image signals.

Further, in the hold mode, the generated standard data for correction is held while no correction is performed. This mode is used to access always the line memory which has a DRAM structure.

Next, the circuit of the shading correction section 62 shown in FIG. 10 will be explained. The shading correction is performed for a plurality of lines with use of the line memory of one line.

The image signal $DIN_{7-0}$ is sent via the C terminal (for the initial value mode) of a first selector 160 to the FIFO memory 162 for the BK level of DRAM structure, and the output signal of the FIFO memory 162 is sent to the A terminal (for the hold and correction modes) of the first selector 160. Further, the image signal $DIN_{7-0}$ is multiplied with $\frac{1}{4}$ in a multiplier 164 and the product is sent to an adder 166, while the output of the FIFO memory 162 is multiplied with $\frac{3}{4}$ in another multiplier 168 and the product is also sent to the adder 166. The adder 166 obtains the sum (weighted average) of the two values and sends it to the B terminal (for the data generation mode) of the first selector 160. The image signal $DIN_{7-0}$ is also received by a subtracter 172 while a second selector 170 selects either of the output of the FIFO memory 162 or "00" (correction mode) so as to be sent to a subtracter 172. The subtracter 172 outputs the image signal (DIN—BK) corrected by the black level BK to a third selector 180, to a multiplier 184 and to a multiplier 192 only in the correction mode.

The image signal (DIN—BK) corrected by the black level BK is sent via the C terminal (for the initial value mode) of the third selector 180 to the FIFO memory 182 of DRAM structure for the WH level, and the output signal of the FIFO memory 182 is sent to the A terminal (for the hold and correction modes) of the third selector 180. Further, the image signal is multiplied with $\frac{1}{4}$ in the multiplier 184 to be sent to an adder 186, while the output signal of the FIFO memory 182 is multiplied with $\frac{3}{4}$ in another multiplier 188 to be sent to the adder 186. The adder 186 obtains the sum (weighted average) of the two values and sends it to the B terminal (for the data generation mode) of the third selector 180. The image signal corrected by the BK level is received by a subtracter 192, as mentioned above, while a fourth selector 190 selects either of the output of the FIFO memory 182 or "FF" (except the correction mode) to be sent to an inverse table 194. The inverse table 194 outputs the inverse thereof (1/WH) to a multiplier 192. The multiplier 192 multiplies the inverse with the image signal (DIN—BK) to output a gradation signal DOUT corrected with the black level BK and with the white level WH.

The selection of each selector 160, 170, 180, 190 is performed according to the mode selection signal $SH_{1,0}$, $SH_{3,2}$ (refer Tables 3 and 4). For the black level correction, in the initial value mode ($SH_{1,0}=0$), the first selector 160 selects the input at the C level, while the third selector 170 selects the input at the B terminal ("00"). Therefore, the image signal $DIN_{7-0}$ as received are stored in the FIFO memory 162.

In the data generation mode ($SH_{1,0}=1$), the first selector 160 selects the input at the C terminal, while the third selector 170 selects the input at the B terminal ("00"). Therefore, the weight-average of the image data of a plurality of lines are stored in the FIFO memory 162 as the standard data for correction. In this embodiment, the data of the FIFO memory 162 to be inputted as initial values are averaged at a ratio of 3:1 with the standard data ($DIN_{7-0}=BK_{17-10}$) received successively. Therefore, the black level converges at the sixteenth line theoretically.

In the correction mode ($SH_{1,0}=3$), the first selector 160 selects the input at the A terminal, while the third selector 170 selects the input at the A terminal (a value of the black level). That is, the FIFO memory 162 holds the standard data for correction, while the subtracter 172 corrects the black level for document image signals.

In the hold mode ($SH_{1,0}=2$), the first selector 160 selects the input at the A terminal while the third selector 170 selects the input at the B terminal ("00"). Therefore, the FIFO memory 162 holds the standard data for correction, while the subtracter 172 does not perform the correction.

The correction of the white level is also performed similarly.

Because this circuit has two FIFO memories as line memories, the write and the read can be performed independently of each other.

Further, the circuits for the multipliers 164, 168, 184 and 188 become simpler if the weight averages of the data of a plurality of lines are set to be $\frac{1}{2}n$ (wherein $n=1, 2, \ldots$) for the standard data for the correction to be received successively.

Figure 11:
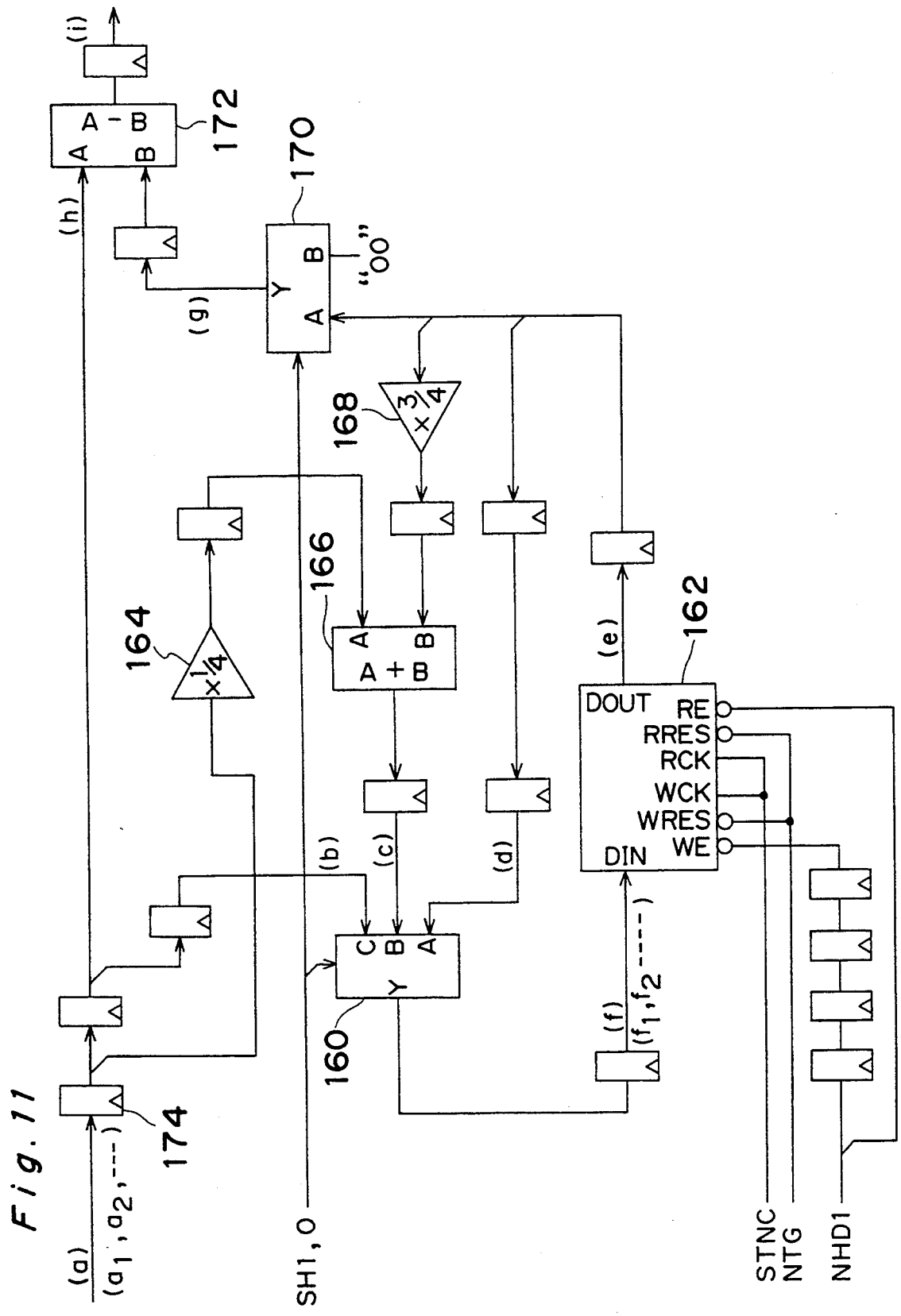
FIG. 11 is a diagram of a black correction block of the shading correction section.

FIG. 11 shows the black correction block of the shading correction section 62 in detail as well as flip-flops 174 and the FIFO memory 162. The flip-flops 174 are used to perform synchronization with use of clock to control the pixel position (for example by delaying a signal WE by four dots) when the weight-average and normalization correction are performed as to the line memory 162.

Figure 12:
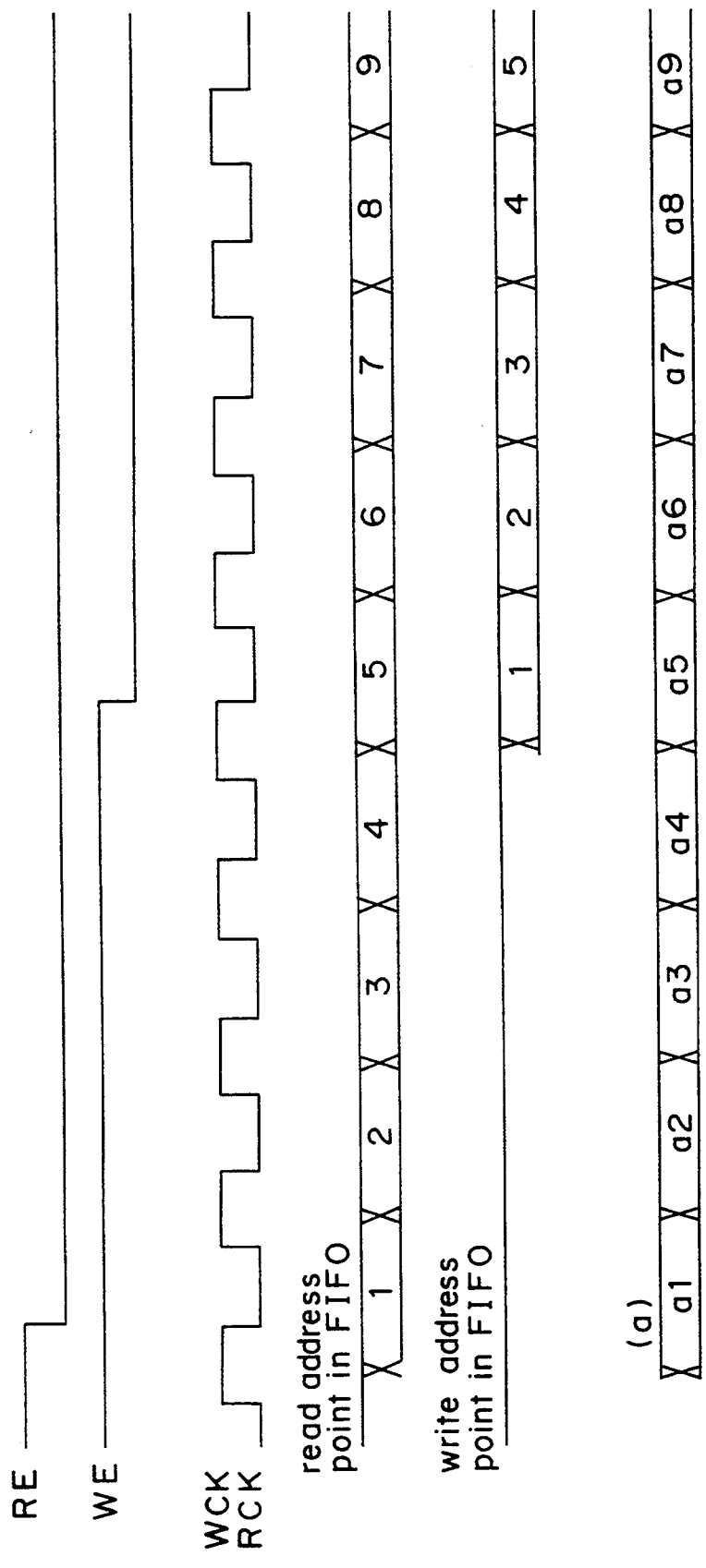
FIG. 12 is a part of a timing chart at positions (a)-(i)

FIGS. 12 and 13 shows a timing chart at the points (a)-(i) in FIG. 11, wherein a1, a2, a3, ... denote standard data received successively while f1, f2, f3, ... denote the output values of the first selector 160. Further, (c) denotes the weighted average and (i) denotes the correction value outputted by the subtracter 170.

In a modified example, an average of the standard data for the correction of one line may be stored beforehand in a line memory, and the CPU may read it to set as the initial values. In the flow to be explained later, the correction value (or the average) obtained in the last time is used as the initial values in the shading correction at the second time or later. Though the use of such initial values takes a little longer time for the conversion, similar results can be realized.

In another modified example, the magnification factor of the multiplier 168 can be set to be "1" and a simple average of standard data of a plurality of line for correction. Foe example, the magnification of the multiplier 164 is set to be 1/16 and standard data of sixteen lines for correction are added in a FIFO memory. Then, a standard data can be generated as an average of the standard data of the sixteen lines.

The shading correction circuit may be provided for each color resolution data of a document to be inputted. Then, red, green and blue can be corrected independently.

Further, the standard data may be corrected only at the white side or at the black side. For example, only the white side may be corrected for an achromatic image.

In the above-mentioned shading correction, both BK and WH levels are corrected independently, and each correction data are generated by using cumulative average of the data of a plurality of lines. Therefore, the correction can be performed at a high precision. However, the time needed to generate the correction data becomes longer due to the addition of the correction of the BK level and the addition of the cumulative average processing. Especially, in case of multi-scan (for example, four scans of cyan, magenta, yellow and black for a full color image or copies of two or more sheets), it need a long time for correction. The copy time is also affected by the rise characteristics of the exposure lamp. Then, these factors hinder the smooth copy operation.

Then, in a modified example to be explained next, the time for the correction is shortened by performing only the cumulative average processing of the correction data at the WH side in case of multi-scan. As to the BK level, the hold values obtained in the initialization when the power supply is turned on are used or the BK level is not updated because the BK level is not affected by the environmental conditions, but is mainly ascribed to the scattering of the characteristics of the elements in the CCD sensor 14. On the other hand, the WH level needs correction because the sensitivity of the CCD sensor 14 changes gradually due to the increase in temperature at the surroundings caused by the turning on and off of the exposure lamp in a multi-scan and this causes for example a fog. The correction in the example, the correction data at the WH level is updated for each scan to suppress the effect of the sensitivity change, while the corrected data obtained by the cumulative average is used always. Therefore, the shading correction can be performed at a high precision.

Figure 14:
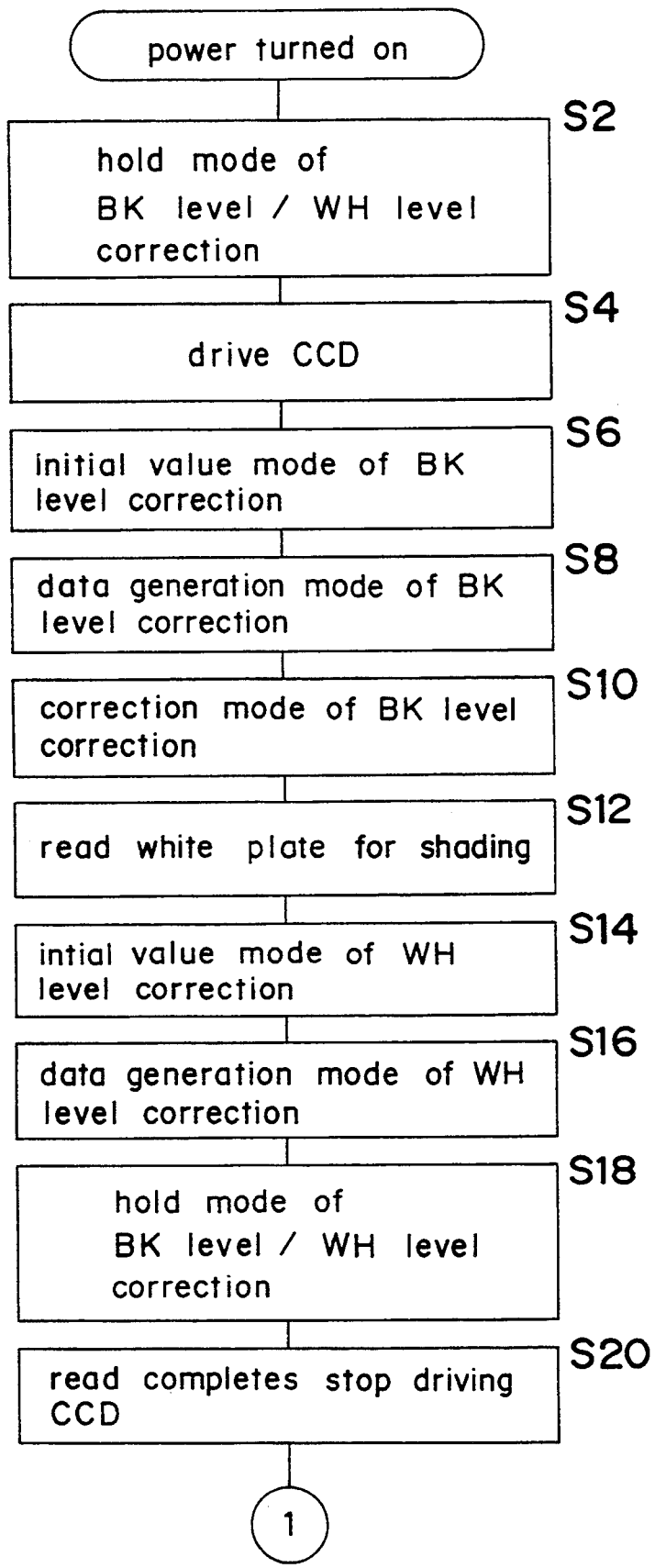
FIG. 14 is a part of a flowchart of shading correction.
Figure 15:
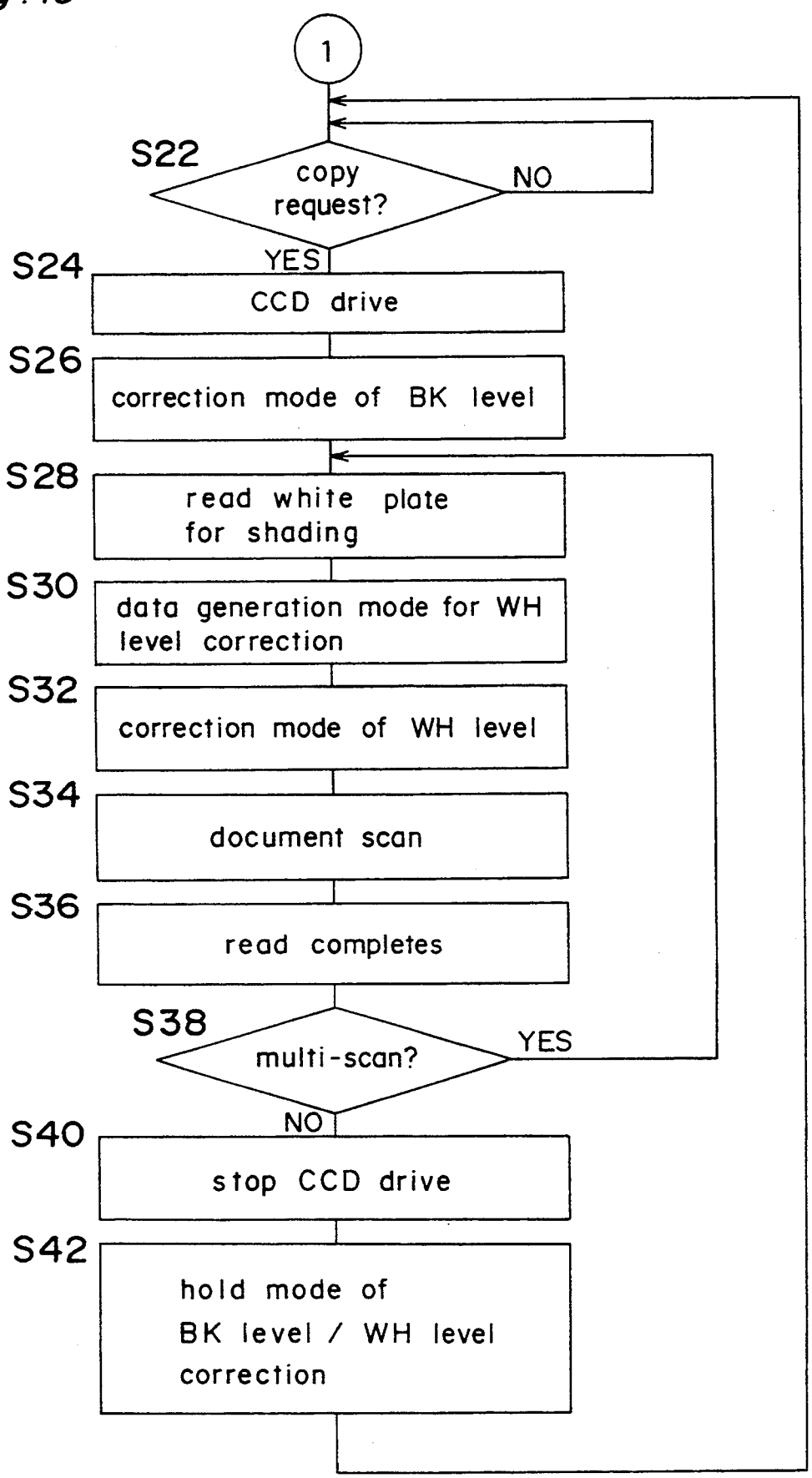
FIG. 15 is another part of the flowchart of shading correction.
Figure 16:
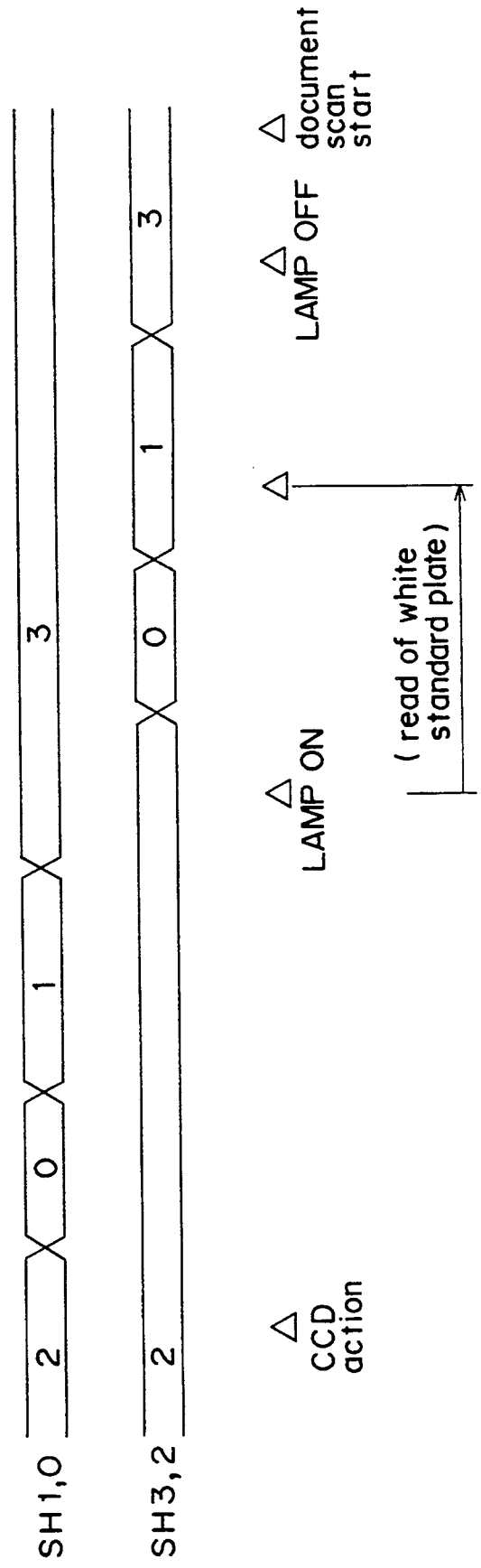
FIG. 16 is a diagram of the sequence of shading correction.

FIGS. 14 and 15 show a flow of the shading correction, and FIG. 16 shows a sequence for the shading correction.

In this flow, when the power supply is turned on, the hold mode is set as to the corrections of the BK and WH levels (step S2). Next, the CCD sensor 14 is driven (step S4), and the initial value mode is set as to the BK level correction, and the initial values are set in the FIFO memory 162 (step S6). Next, the data generation mode is set as the to BK level correction (step S8), and the standard data inputted successively are averaged cumulatively and the averages are stored again in the FIFO memory 162. When the averages are generated, the correction mode is set as to the BK level correction (step S10), and the standard data for the correction are sent for the correction of the WH level. Next, the exposure lamp 12 is turned on to illuminate the standard white plate 16 (step S12). Next, the initial value mode is set as to the WH level correction and the standard white plate 16 is read. Then, the read values are inputted as the initial values in the FIFO memory 182 (step S14). Further, the data generation mode is set as to the WH level correction (step S16), and the standard data inputted successively are averaged cumulatively with weights and the averages are stored again in the FIFO memory 182. When the averages are generated, the hold mode is set as to the BK and WH level corrections (step S18), and the corrected data are held. Then, the exposure lamp 12 is turned off when the read completes, and the CCD sensor 14 is stopped to be driven (step S20).

Then, a copy request is waited (step S22). If a copy is performed, the initial values obtained previously are used as to the BK level.

If a copy request is decided to be received (YES at step S22), the CCD sensor 14 is driven (step S24), the correction mode is set as to the BK level correction (step S26), and the data are outputted from the FIFO memory 162 as the standard data for the BK level correction. Then, the exposure lamp 12 is turned on to read the standard white plate 16 to be stored in the FIFO memory 162 (step S28). Next, the data generation mode is set as to the WH level correction (step S30), the standard data inputted successively are averaged cumulatively with weights and the averages are stored again in the FIFO memory 182. Then, the correction mode is set as to the WH level correction (step S32), and the data of the FIFO memory 182 are outputted as the standard data for the correction. Then, a document is scanned to read an image (step S34). At this time, the shading correction with use of the corrected BK and WH levels is performed. Then, the exposure lamp 12 is turned off, and the read completes (step S36).

Next, it is decided if multi-scan is performed or not (step S38). If the multi-scan is decided to be performed, the flow returns to step S28 and the WH level is corrected again, and then the document is read.

If multi-scan is decided not to be performed, the CCD sensor 14 is stopped to be driven (step S40), and the hold mode is set as to the BK and WH level corrections to hold the corrected BK and WH levels (step S42). Then, the flow returns to step S22, and a next copy request is waited.

As explained above, the standard data for the correction are generated by using a different sequence in a multi-scan from other cases. On the other hand, in order to shorten the copy time, the standard correction data of the black level correction may be used for example only after the second scan or later in a multi-scan.

(d) HVC conversion section

The read data r, g and b of red, green and blue are converted to hue H and chroma W in order to process the image data in the HVC conversion section 64.

(d-1) R, G, B read position correction

Figure 17:
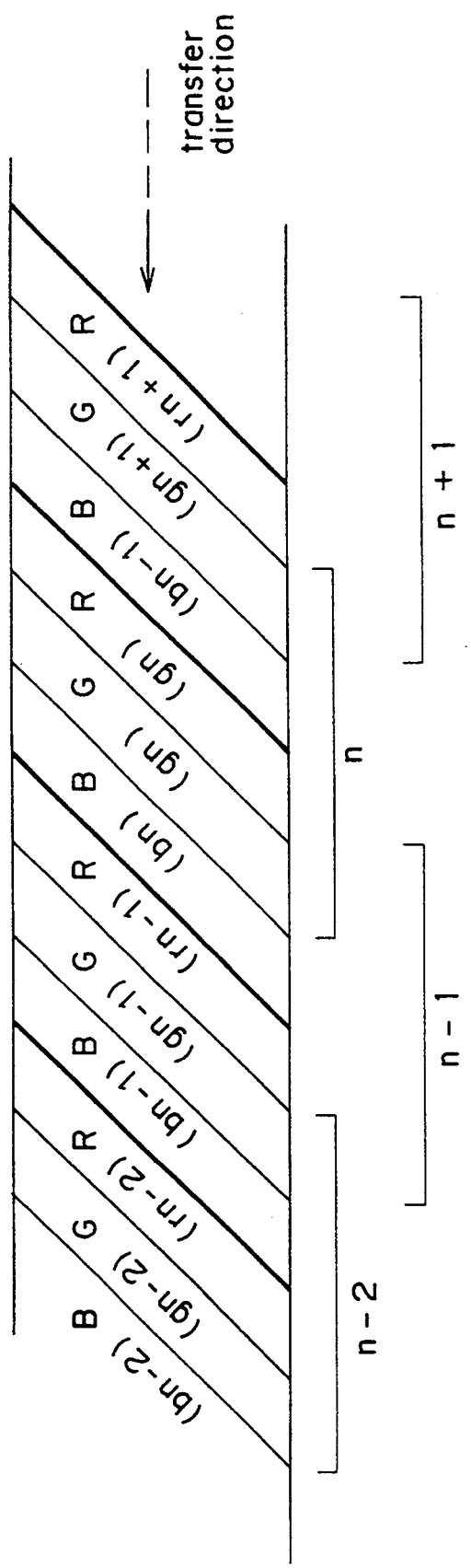
FIG. 17 is a plan view of a part of a CCD sensor.

FIG. 17 displays the CCD sensor 14 schematically. The CCD sensor 14 includes a linear, sequential array of pixels of red (denoted as R), green (denoted as G) and blue (denoted as B), and the directions of the pixels are inclined by 45° to reduce moire patterns. Then, at an edge portion of an image, the read position is different for each color of R, G and B. Therefore, the color difference signals ($W_R$, $W_B$) cannot be separated correctly. In order to reduce this phenomenon, the read position is corrected on the color resolution data after the shading correction by using G pixels as basis, as follows:

$$R_n = (\tfrac{1}{2})r_n + (\tfrac{1}{2})r_{n-1},$$

$$G_n = (\tfrac{1}{2})g_n + (\tfrac{1}{4})(g_{n-1} + g_{n+1}),$$

and $$B_n = (\tfrac{1}{2})b_n + (\tfrac{1}{2})b_{n+1},$$

wherein n denotes the pixel position in the transfer direction. (The read position correction is not needed for some kinds of CCD sensors. In the diagram of FIG. 5, the read position correction is omitted for simplicity, and the output data of the shading correction section 62 are represented as R, G, B.)

The color resolution signals R, G, B obtained as explained above are converted next to the data of H (hue), V (value) and W (chroma). This conversion is performed for precise image recognition processings to be conducted later such as color change, automatic control of the UCR/BP ratios, automatic MTF control and edge decision of achromatic color. The relative luminous factor has a large weight at green and it is generally approximated as a ratio of R:G:B=0.229:0.587:0.114 with C light source and 2° field. The color difference signals ($W_R$, $W_B$) are obtained from the color resolution data and the value signal (V) as $$W_B = B - V,$$

and $$W_R = R - V.$$

Therefore, V, $W_B$ and $W_R$ can be calculated as a matrix calculation.

$$\begin{pmatrix} V \\ W_R \\ W_B \end{pmatrix} = \begin{pmatrix} 0.299 & 0.587 & 0.114 \\ 1 & -0.837 & -0.163 \\ -0.337 & -0.663 & 1 \end{pmatrix} \times \begin{pmatrix} R \\ G \\ B \end{pmatrix}.$$

Figure 18A:
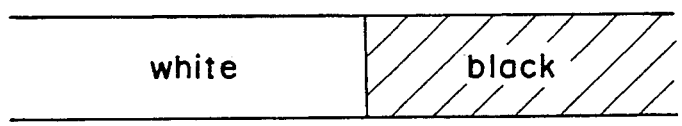
FIG. 18(a) is a diagram of an image of black and white.
Figure 18B:
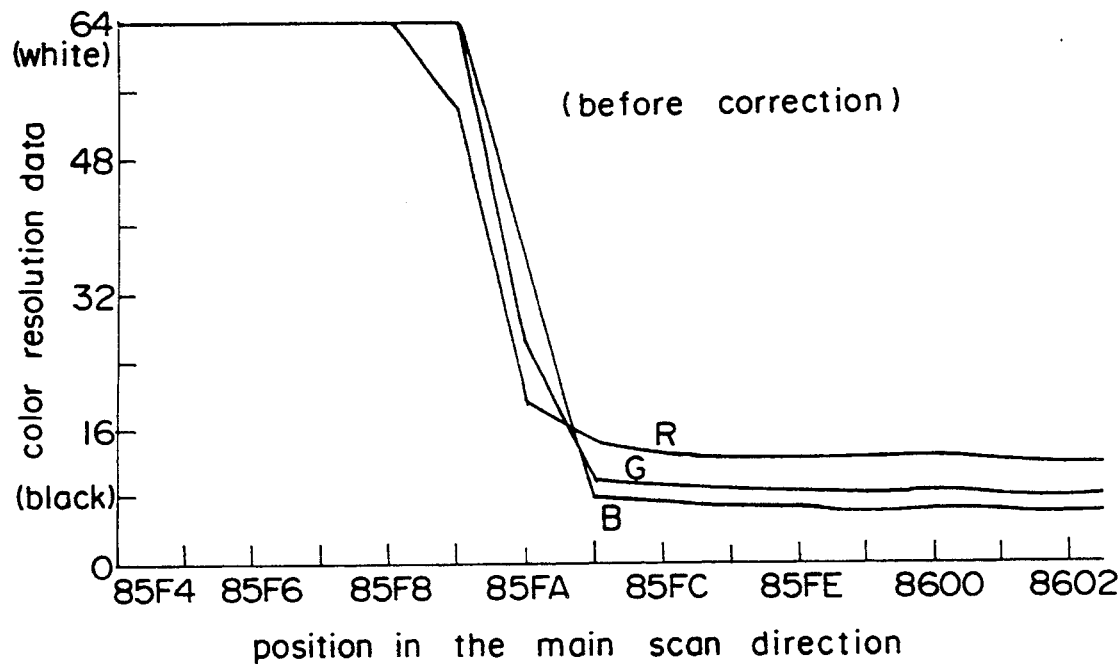
FIG. 18(b) is a graph of color resolution data of the image and FIG. 18(c) is a graph of a read data of the image after position correction.
Figure 18C:
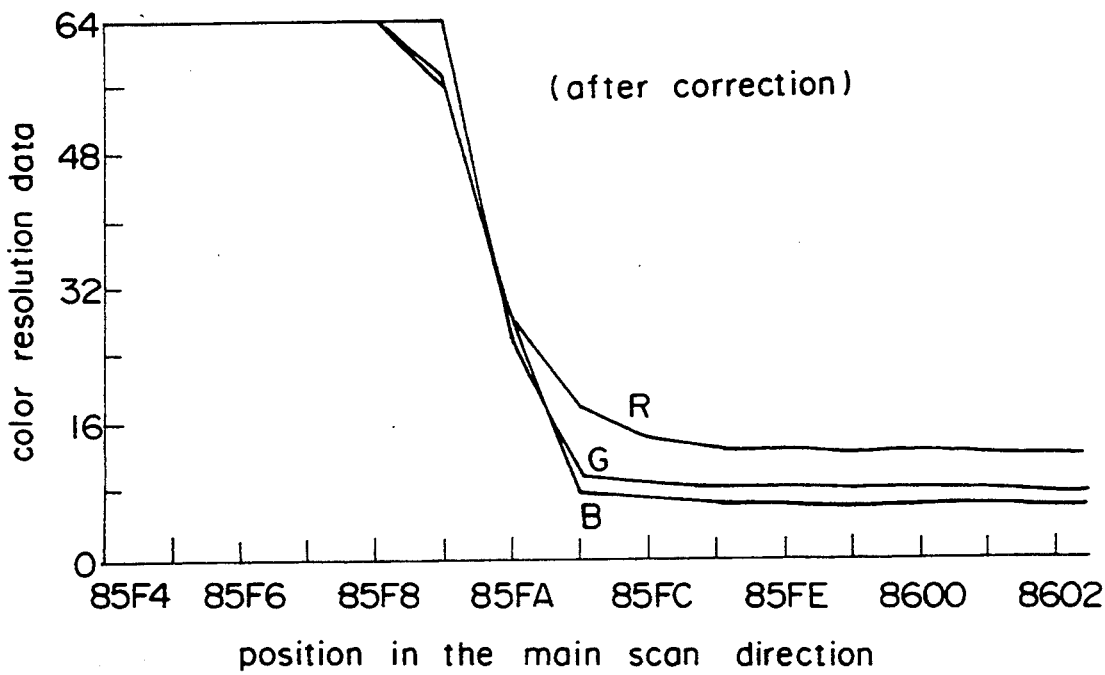

FIGS. 18(b) shows the read data of an image of black and white displayed in FIG. 18(a). If the corrected data displayed in FIG. 18(c) is compared with the as-read data of R, G and B displayed in FIG. 18(b), it is found that the change positions of the three colors agree to each other after the position correction. Then, color blur is also reduced as explained later.

(d-2) separation of chroma and hue

Figure 19:
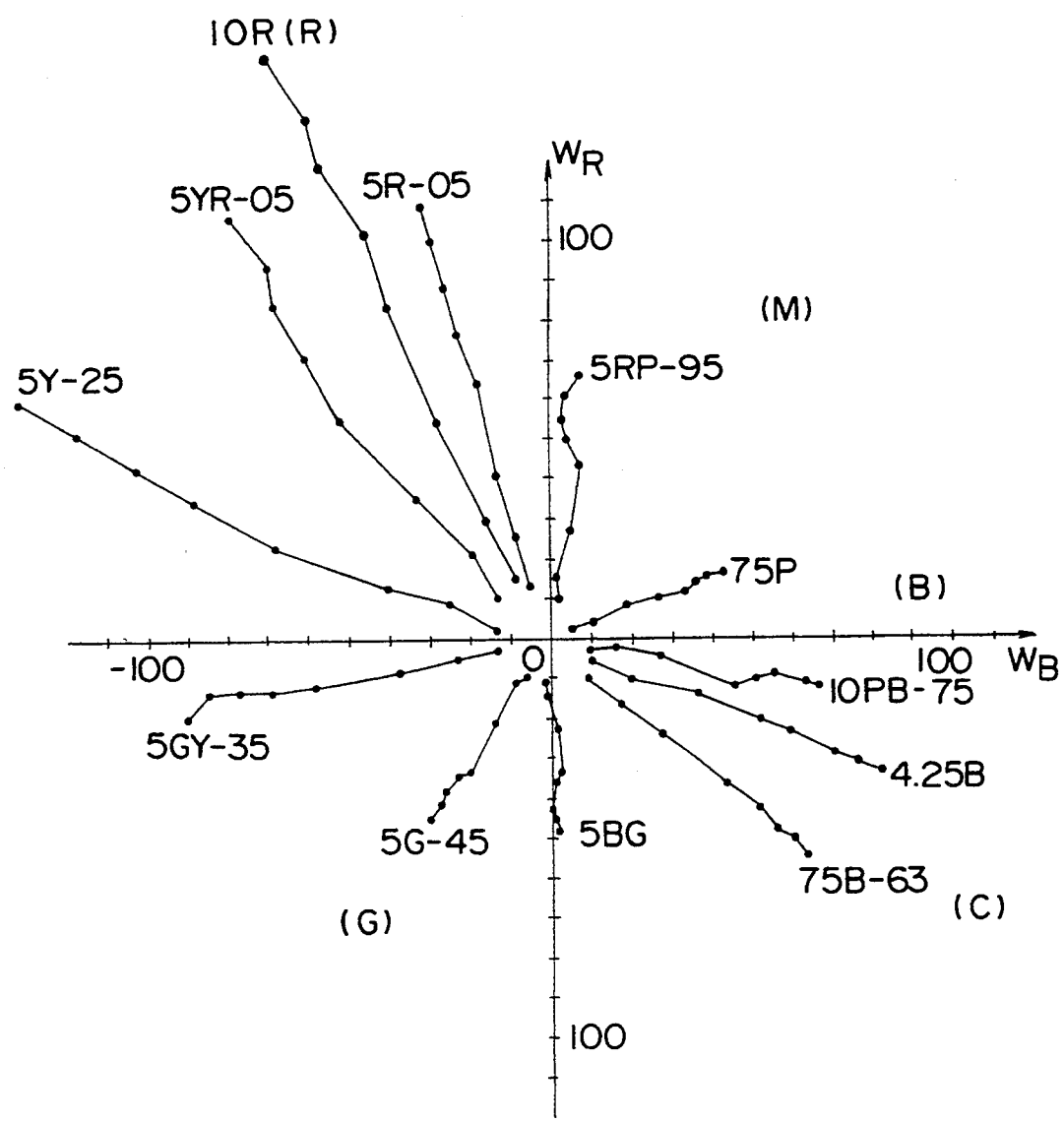
FIG. 19 is a diagram of the Munsell color system.

The two color difference signals WR and WB designate signals of the orthogonal coordinates in the hue plane in the color space. When these are transformed into the polar coordinates, as shown in the Munsell color diagram shown in FIG. 19, the hue can be separated well. The length of the vector of a data designates the chroma W (or the chroma decreases in the direction to the center), while the angle designates the hue H. Therefore, the chroma signal (W) and the hue signal (H) can be calculated as follows:

$$W = (W_R^2 + W_B^2)^{\frac{1}{2}} \text{ (however, } W = 255 \text{ if } W \geq 256\text{)}$$

and $$H = (256/360) \tan^{-1}(W_R/W_B).$$

(d-3) circuit of HVC conversion section

Figure 20:
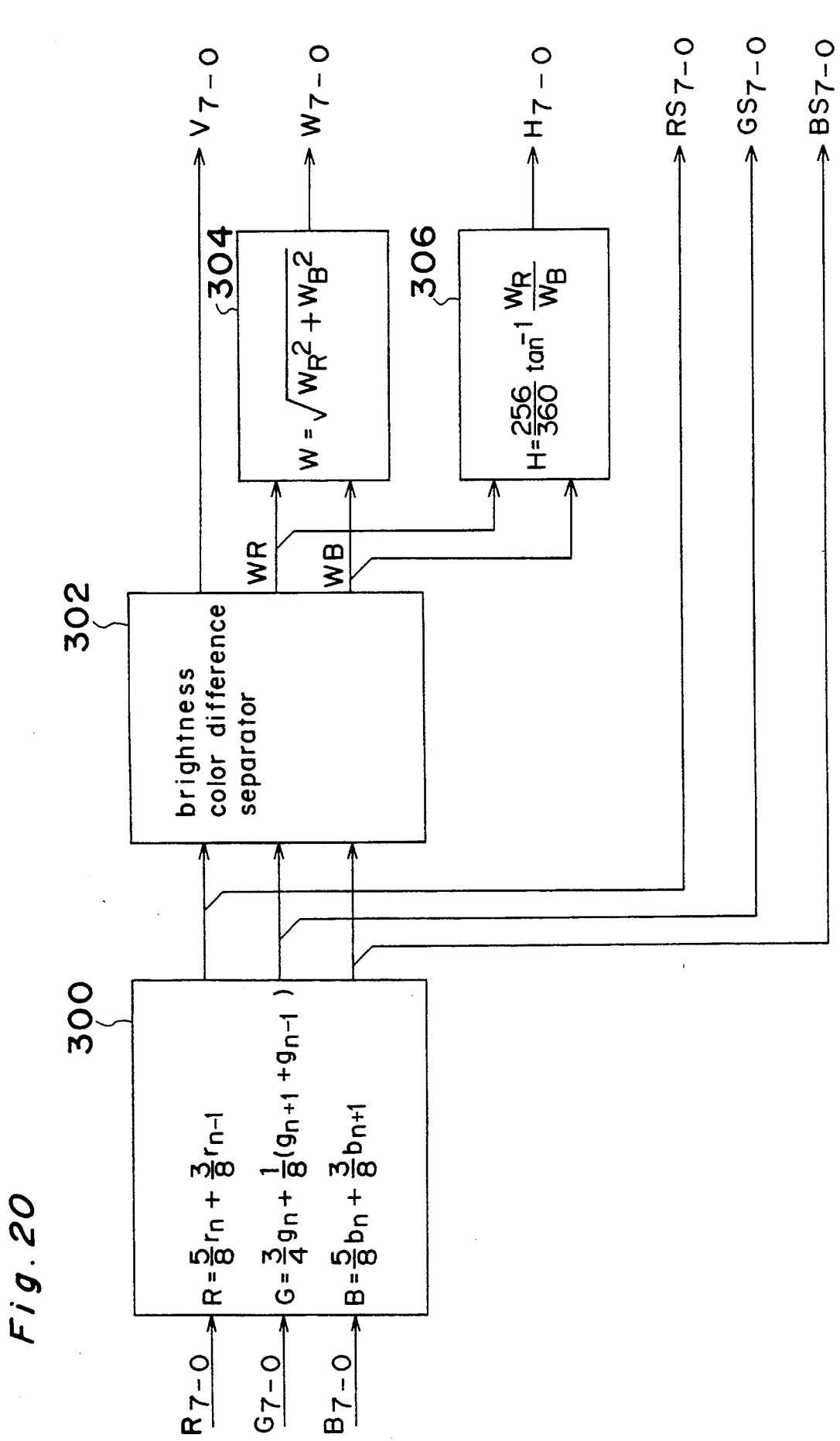
FIG. 20 is a block diagram of an HVC converter.

FIG. 20 shows a block diagram of the HVC conversion section 64. The position correction section 300 which is a table for the above-mentioned correction of the read position converts the read data r, g, b to the data RS, GS and BS of the three colors. The value/color difference separator 302 which is a table for the above-mentioned matrix calculation converts the data R, G, B to V and $W_R$, $W_B$. The signals $W_R$ and $W_B$ are converted to the chroma signal W in a chroma extraction circuit 304, while they are converted to the hue signal H in a hue extraction circuit 306.

Figure 21:
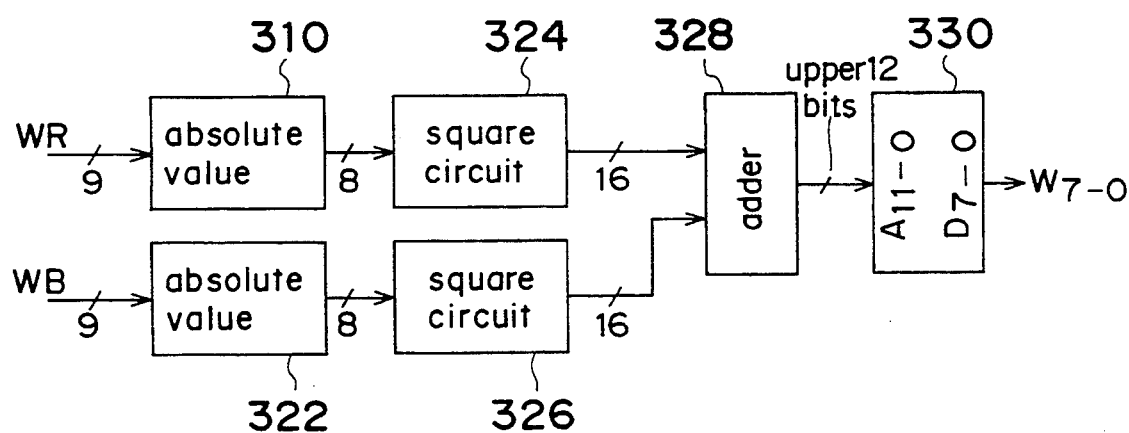
FIG. 21 is a block diagram of a chroma extraction circuit.

FIG. 21 shows a circuit diagram of the chroma extraction circuit 304. After the signals $W_R$ and $W_B$ are converted to absolute values in the absolute value circuits 320 and 322, they are squared by square circuits 324 and 326 and added in an adder 326, respectively. The sum is converted with a square table 330 to a root or the chroma W is outputted.

Figure 22:
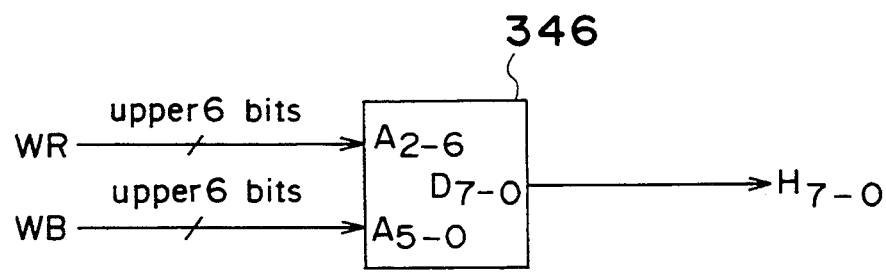
FIG. 22 is a block diagram of a hue extraction circuit.

FIG. 22 shows a diagram of the hue extraction circuit 306, wherein the signals $W_R$ and $W_B$ are converted to the hue signal H with a $\tan^{-1}$ table 346.

(e) density conversion

In the density conversion section 68, the output data of the CCD sensor 14 is converted to data which has a linear characteristic for the document density (OD) observed by human naked eyes. The output of the CCD sensor 14 has a linear characteristic for the incident intensity (=reflection ratio (OR) of document). On the other hand, the reflectance (OR) of document and the document density (OD) have a relation: -log OR=OD. Then, the nonlinear read characteristic of the CCD sensor 14 is converted to a linear characteristic with a reflectance/density conversion table 360.

Figure 23:
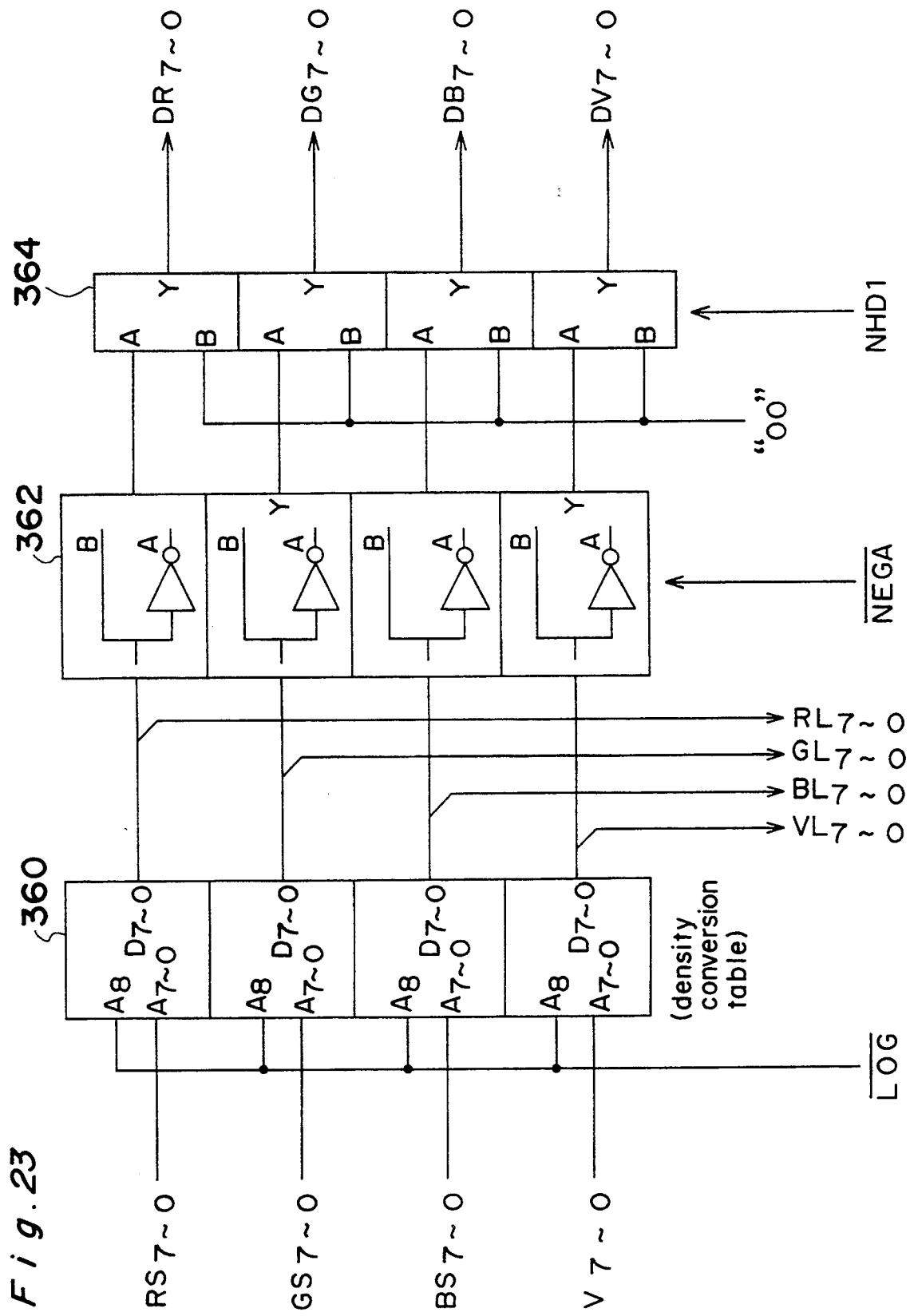
FIG. 23 is a circuit diagram of a density converter.

FIG. 23 shows the density conversion section 68. The image data RS, GS, BS and the value signal V are first converted with a density conversion table 360 to density data RL, GL, BL and VL when a $\overline{\text{LOG}}$ signal is received.

After the density conversion, in a negative/positive reversal circuit 362, a negative or positive output is selected to send the data DR, DG and DB. The selection is performed according to a control signal $\overline{\text{NEGA}}$ which denotes the output of the as-received density data (B output) at the high level or the inverted density data (A output) at the low level. If the A output is selected, the circuit 362 reverses the input data. Further, the output of the negative/positive reversal circuit 362 and "00" are selected by a selector 364 according to an effective document area signal NHD1. That is, outside the area for reading a document, the output is set to be white ("00") irrespective of the negative/positive output.

Further, the value data V is converted to a monochromatic color density data DV.

(f) region discrimination

As will be explained later, the color correction section 72 controls the black reproducibility and the brightness of colors and also bordering processing. Further, the MTF correction section 78 performs edge emphasis processing. These processing have to be controlled according to the nature of an image. Then, by using the data obtained on the HVC conversion, the region discrimination section 74 performs the automatic UCR/BP ratios control according to the chroma data, the automatic edge amount control according to the value change and the setting and the region discrimination on special processing (color blur correction) at an achromatic color edge portion.

Figure 24:
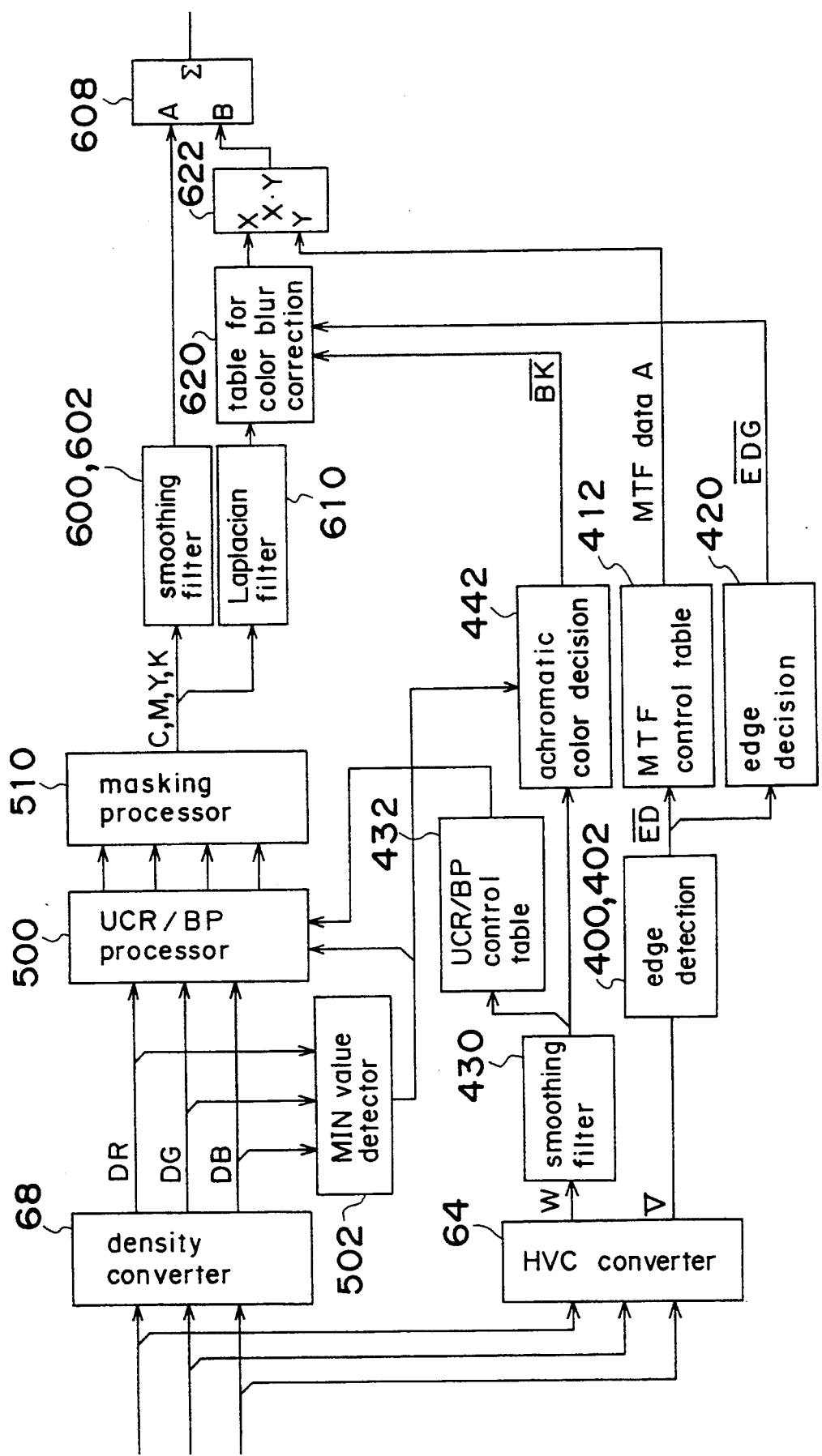
FIG. 24 is a schematic block diagram of a region discrimination section in the image signal processor.

FIG. 24 shows a block diagram of a section 94 related to the region discrimination in the image signal processor 20. The image data are converted to the density data DR, DG, DB of red, green, blue in the density conversion section 68 and are converted to the value V and chroma W in the HVC conversion section 64. The value signal V is used to detect an edge in an edge detection section 400, 402, 420, and the result is sent to the color blur correction table 620. Further, the edge amount $\overline{\text{EG}}$ is converted in an MTF control table 412 to MTF data A which is sent to a multiplier 622.

The MIN value of the density data detected by an MIN detector 502 is sent to the UCR/BP processor 500(72). On the other hand, after the signal W is smoothed by a smoothing filter 430, the UCR/BP ratios determined according to the result are sent by the UCR/BP control table 432 to the UCR/BP processor 500(72). By using the UCR/BP ratios determined as explained above, the density data DR, DG and DB of red, green and blue are converted to the signals C, M, Y and K of cyan, magenta, yellow and black in the masking processor 510.

On the other hand, the MIN value is also sent to an achromatic color decision section 442 to decide an achromatic color or not on the smoothed chroma signal W, and the result is sent to the color blur correction table 620.

In the color blur correction table 620, the secondary derivative of the signals C, M, Y and K obtained with a Laplacian filter 610 is corrected according to the decisions of the achromatic color and of the edge, and the corrected value is multiplied with the output of the MTF control table 412. Further, the obtained value is added by an adder 608 with the smoothed signal C, M, Y and K, and the sum is outputted.

Figure 25:
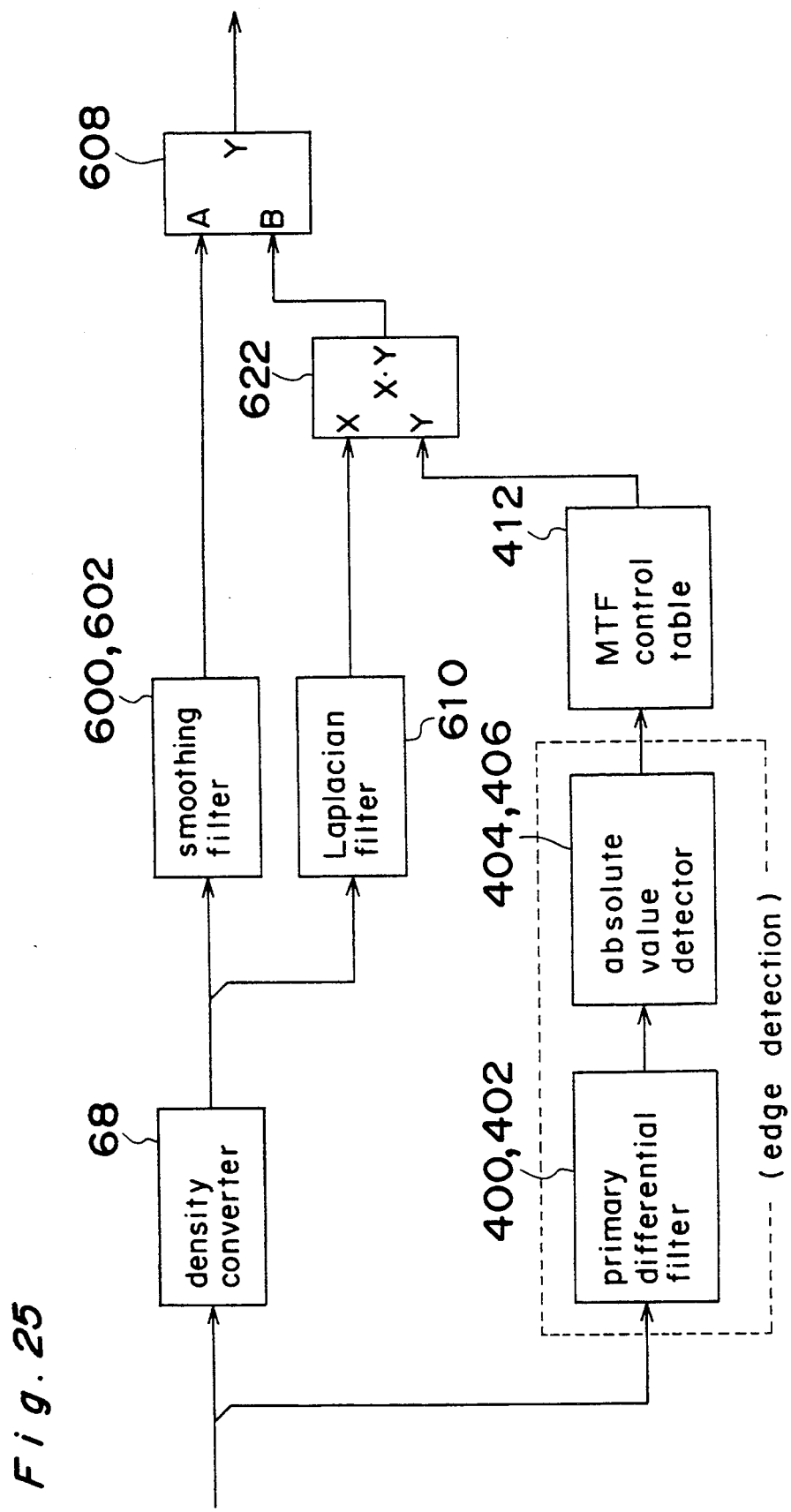
FIG. 25 is a schematic block diagram of a region discrimination section for MTF automatic control in the monochromatic mode.

FIG. 25 shows a block diagram for concisely showing portions related to the region discrimination for the automatic MTF correction in the monochromatic mode. An edge component of the read data of red, green and blue is detected with primary differential filters 400, 402 and absolute value detectors 404, 406, and the detected value is converted by the MTF control table 412 to the MTF data A.

(f-1) circuit of region discrimination section

Figure 26:
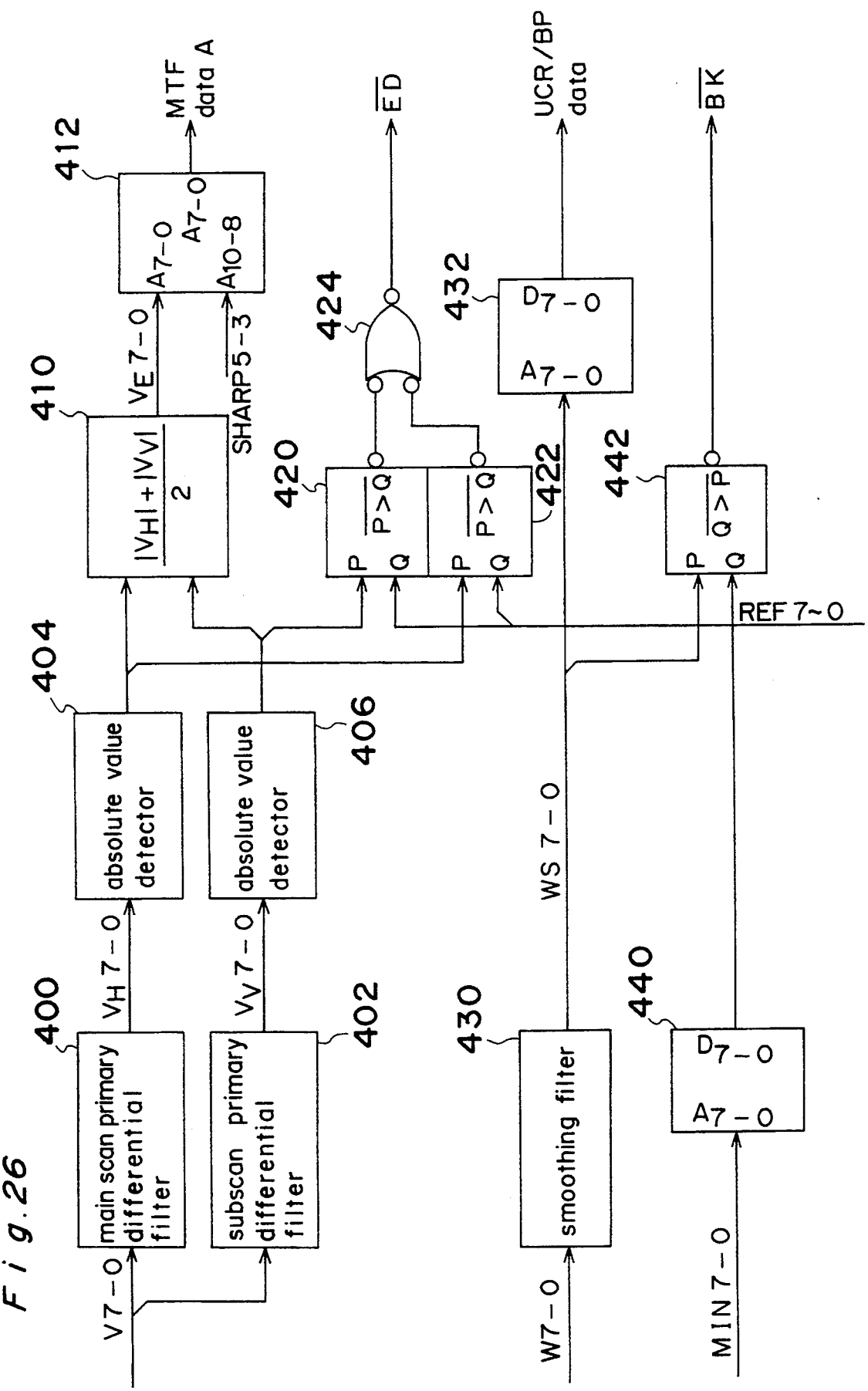
FIG. 26 is a part of a circuit diagram of a region discrimination section.
Figure 27:
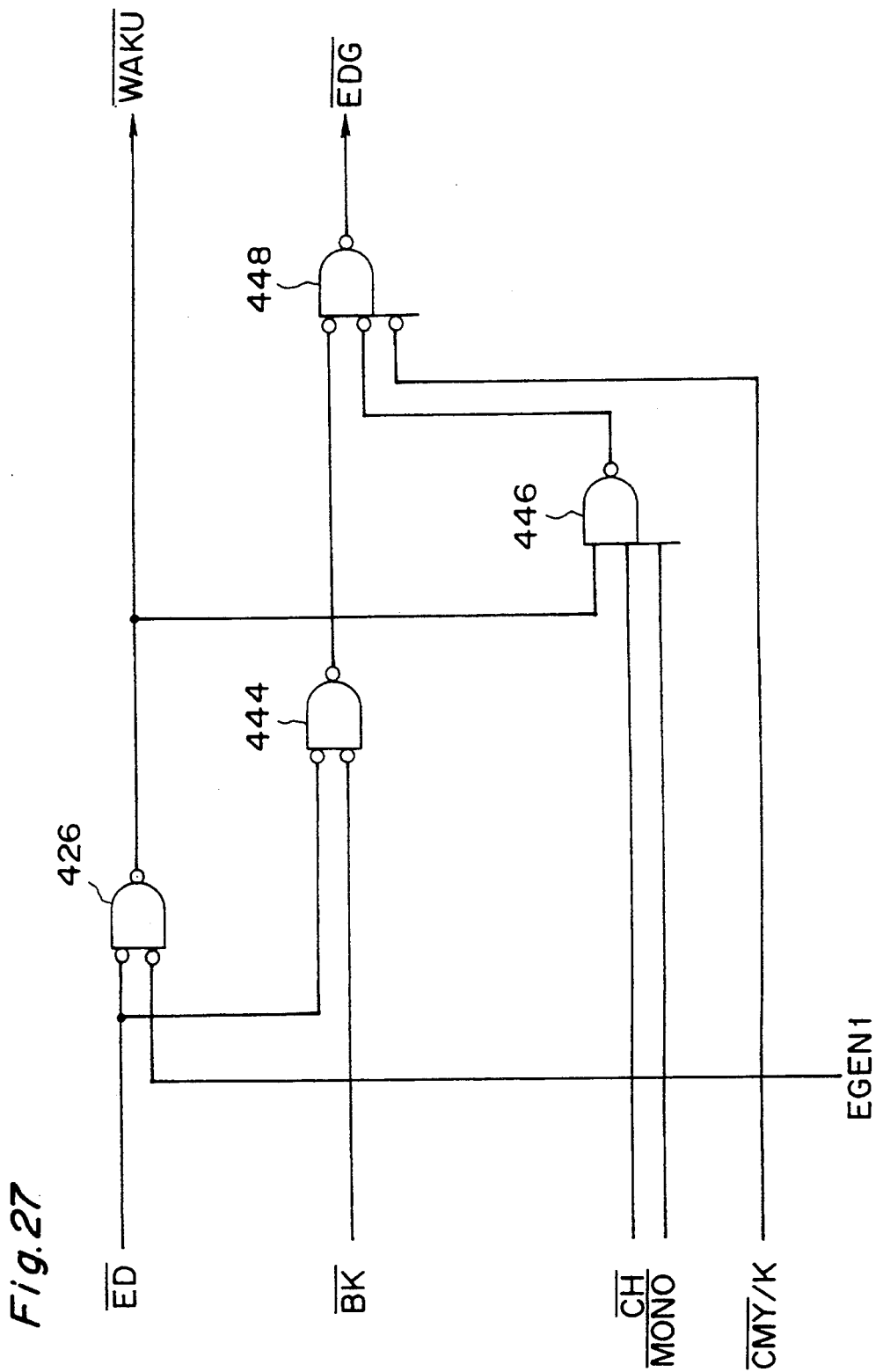
FIG. 27 is another part of the circuit diagram of a region discrimination section.

FIGS. 26 and 27 show circuit diagrams of the region discrimination section 94. Edge components are detected from the value data V received from the density conversion section 68 by using a primary differential filter 400 in the main scan direction and a primary differential filter 402 in the subscan direction, and the absolute value detectors 404 and 406 send the absolute values of the edge components, respectively. Further, an average circuit 410 averages the absolute values to generate an average $V_E$. The average $V_E$ and the sharpness setting values SHARP$_{5-3}$ are converted by the MTF control table 412 to the MTF data A.

The two absolute values are also received by comparators 420 and 422, and they are compared with a threshold value REF. If either of the absolute values is larger than the threshold value REF, an edge signal $\overline{\text{ED}}$ is outputted via an OR gate 424 to an AND gate 426, which sends a $\overline{\text{WAKU}}$ signal if an $\overline{\text{EGEN1}}$ signal is received.

Further, the chroma signal W is smoothed through a smoothing filter 430 which outputs a signal WS, which is next converted to UCR/BP data by a UCR/BP control table 432.

Further, the minimum data MIN received from the color correction section 72 is converted to the BK level (D) by a BK level reference table 440 and the BK level is compared with the smoothed signal WS received from the smoothing filter 430 by a comparator (achromatic decision section) 442, which sends a signal $\overline{\text{BK}}$ to an AND gate 444 if the BK level is larger or there is a black edge. The signal $\overline{\text{BK}}$ is further outputted from the AND gate 444 to an AND gate 448 if the edge signal $\overline{\text{EG}}$ is outputted from the OR gate 424. When the $\overline{\text{WAKU}}$ signal (bordering edition area), the $\overline{\text{CH}}$ signal (color change edition area) or the MON signal (monochromatic color edition area) is not generated, the NAND gate 446 outputs the $\overline{\text{ED}}$ signal. Further, when the color mode signal $\overline{\text{CMY}}/\text{K}$ is outputted, the AND gate 448 sends an achromatic color edge decision signal $\overline{\text{EDG}}$.

Figure 28:
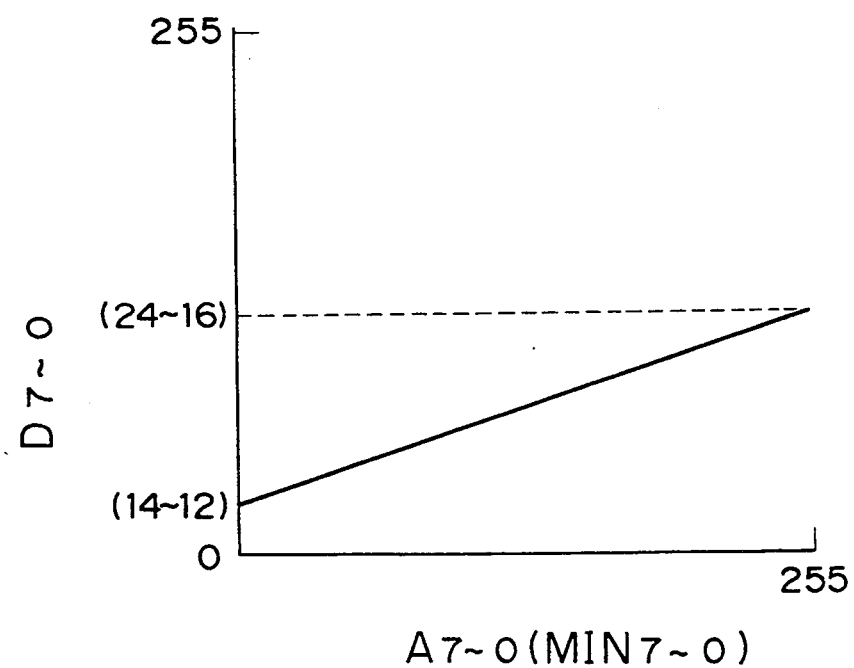
FIG. 28 is a graph of the BK level (D) plotted against a minimum value (MIN)

The BK level reference table 440 determines the threshold level for binarizing the WS signal as shown in FIG. 28, when the minimum value of DR, DG and DB is received. Because the focus depths of the incident light R, G and B are different from each other due to the chromatic aberration of lens, the color difference signals $W_R$ and $W_B$ of an achromatic color document having higher spatial frequencies becomes larger than usual. Therefore, the bi-level threshold value is controlled according to the minimum MIN of the black level output.

Figure 29:
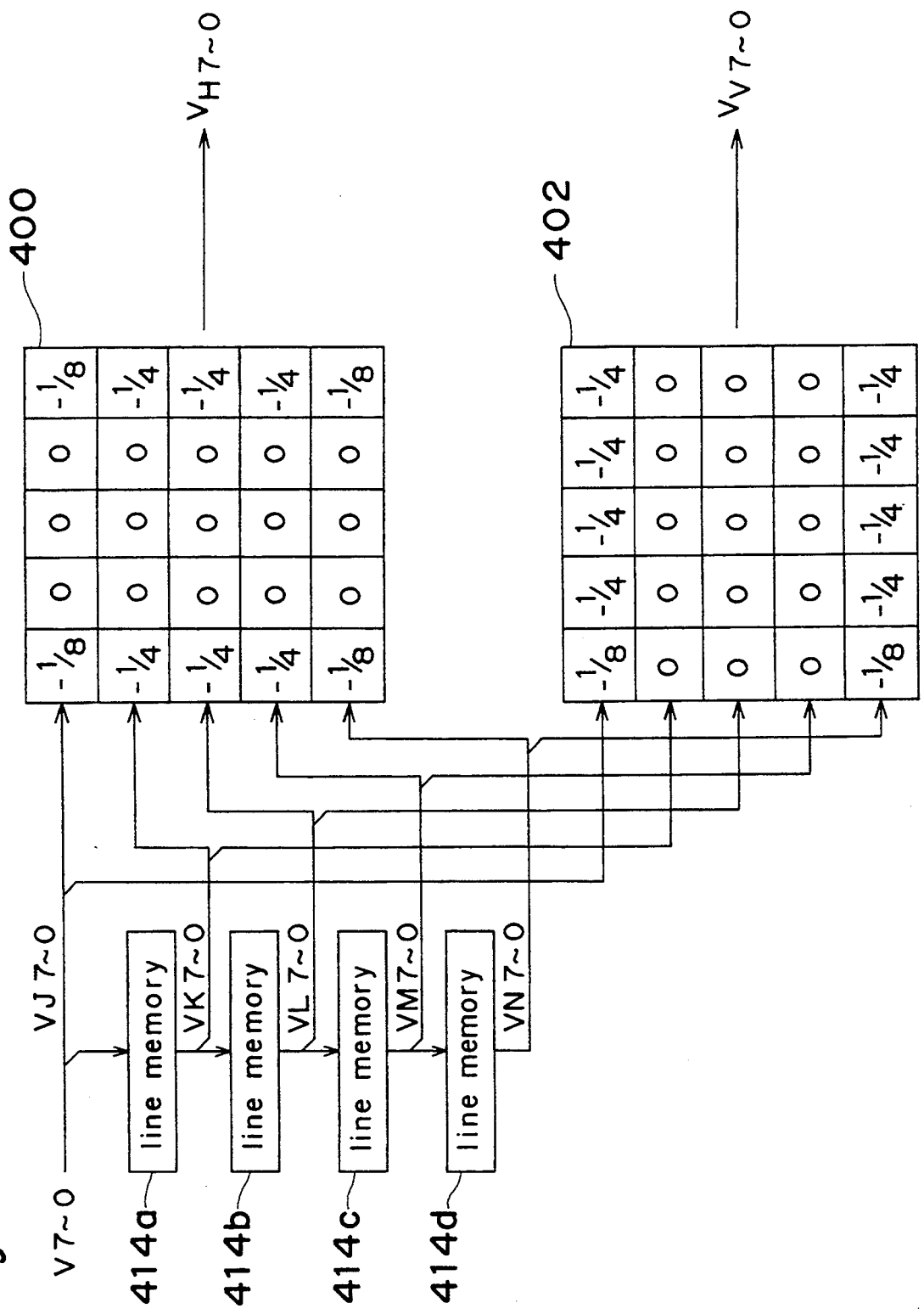
FIG. 29 is a diagram of primary differential filters.

The above-mentioned primary differential filters 400 and 402 have structures shown in FIG. 29. That is, the data of four successive lines are stored successively in line memories 414a, 414b, 414c and 414d. Further, when the data of a fifth line is received, the calculations of the primary differential filters 400 and 402 are conducted on the data of the (5×5) pixels. In the filter 400 for the main scan direction, the values displayed in the filter is multiplied with the input data only at the two ends in the main scan direction, and the products are summed. Then, as to the pixel at the center of the 5×5 pixels, the value $V_H$ of the primary derivative (edge amount) is obtained in the main scan direction. As to the other filter 402, a similar calculation is conducted to obtain an edge amount $V_V$ in the subscan direction.

Figure 30:
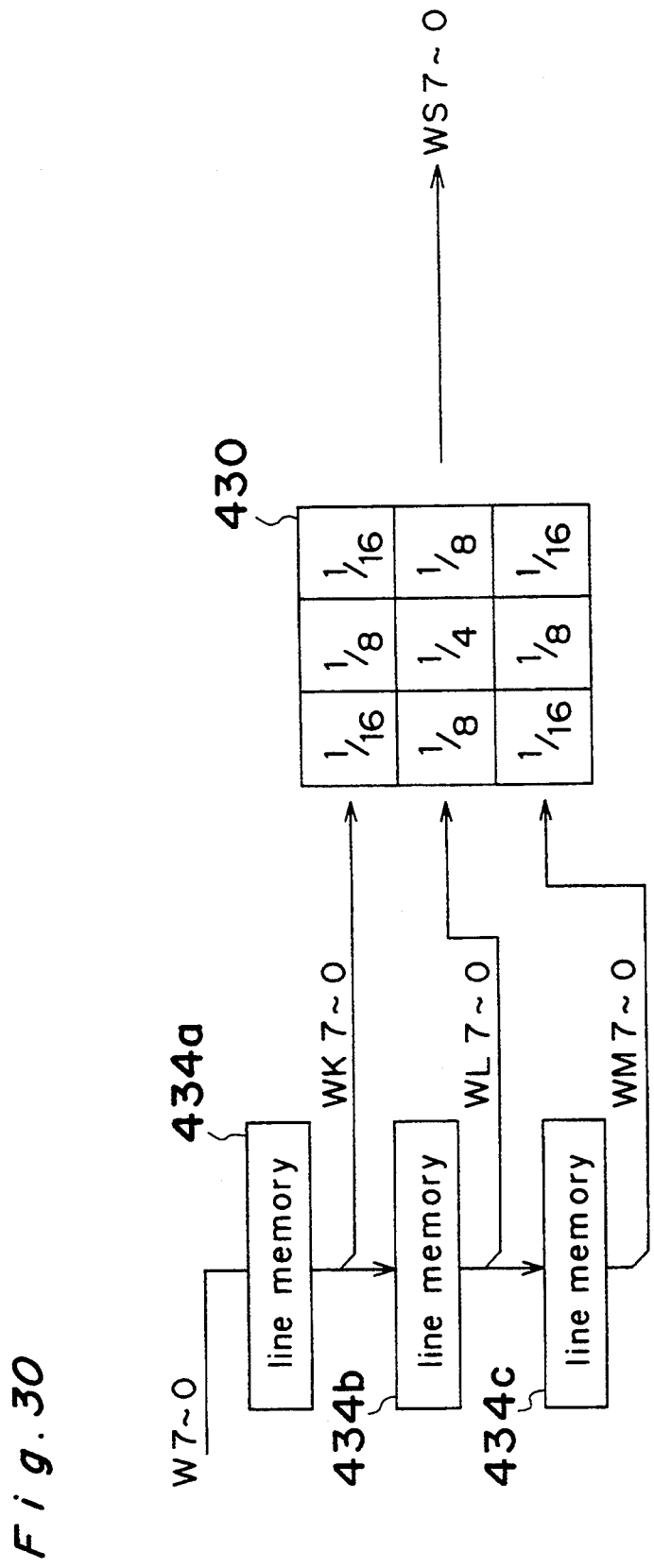
FIG. 30 is a diagram of a smoothing filter.

On the other hand, FIG. 30 shows a structure of the smoothing filter 430 for smoothing the W signal received from the color correction section 72. That is, the data of three successive lines are stored successively in line memories 434a, 434b and 434c. Then, the calculation of the smoothing filter 430 is conducted on the data of the (3×3) pixels. The values displayed in the filter is multiplied with the input data, and the products are summed. Then, as to the pixel at the center of the 3×3 pixels, the smoothed value WS is obtained.

(f-2) automatic control of under color remove/black painting

As will be explained later in detail, the color correction section 72 detects K'=MIN(DR, DG, DB) as the black data K'. Then, the density data DR, DG and DB of the three colors are subtracted by $\alpha \cdot K'$ (under color remove amount), while $\beta \cdot K'$ (black paint amount) is sent as the K amount used to generate the black data. "$\alpha$" represents the UCR ratio used for decreasing the color data, while "$\beta$" represents the BP ratio used for determining the black amount. The UCR/BP ratios affect the chroma of the chromatic colors and the pureness of achromatic color.

The UCR/BP ratios have a trade-off relation with the color reproducibility. That is, the reproducibility of black is improved by increasing each of UCR/BP ratios ($-\alpha/\beta$) because black is reproduced by using pure black K'. On the contrary, the brightness of chromatic colors are deteriorated because the output ratio of K' increases. As the UCR/BP ratios increase to 100%, the change in the amplitude of the image data DR, DG and DB after the under color is removed becomes extremely small. Then, the signal errors cannot be neglected and the image noises of chromatic colors cannot be neglected also. Therefore, it is desirable to control the UCR/BP ratios according to the chroma so that the UCR/BP ratios decreased to 0% for a document of chromatic colors and increases to 100% for a document of achromatic color. Then, an ideal color reproduction processing can be performed or the pureness of achromatic color and the chroma of chromatic colors are not improved at the same time.

However, as to a color image, such a processing does not necessarily operated well if the UCR/BP ratios are determined only from the black amount K', because the image density changes according to a change in hue or in value. For example, when the color of an image changes from white to red, an edge can be emphasized. On the other hand, when the color of an image changes from red to cyan, the hue changes anomalously at the edge. Therefore, it is better not to emphasize the edge. For example, an image such as the skin in a human face is affected especially largely. Therefore, only the change in the value of an image has to be subtracted well for the automatic control. Then, in the present embodiment, the UCR/BP processing is conducted by using the chroma data.

Figure 31:
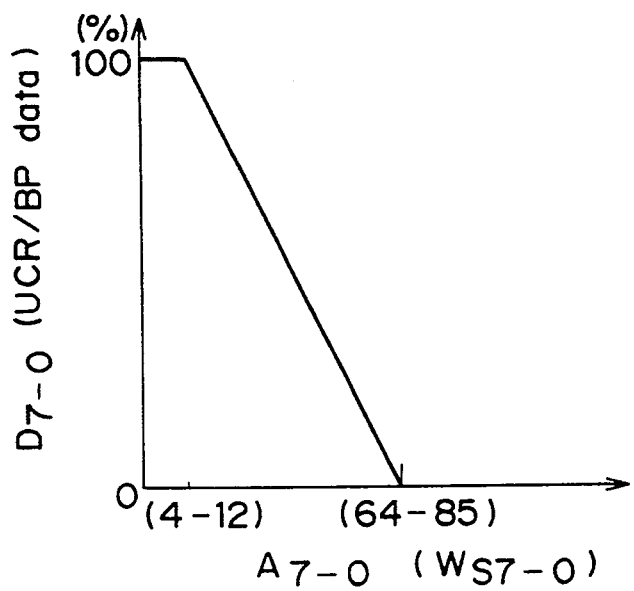
FIG. 31 is a graph of the conversion of a UCR/BP control table.

The chroma signal W is sent to a 3×3 smoothing filter for smoothing in order to suppress an extreme data change at an edge portion. Next, the smoothed chroma signal WS is converted to UCR/BP data $DB_{7-0}$ with the UCR/BP control table 432, as shown in FIG. 31, and the data is sent to the color correction section 72. In other words, the UCR/BP data D is changed linearly between 0% to 100% against the amplitude of the chroma signal WS, except near 0%.

In the color correction section 72, the automatic UCR/BP processing as well as the masking processing are performed, as will be explained later.

(f-3) automatic control of edge emphasis

The human sense on the density of image has the -log characteristic against the incident light amplitude. However, in an edge portion of an image, the sense responds to a change not in density, but in value. Therefore, when the edge emphasis is processing on the data after the density conversion, following problems arise: As to an edge portion of a character or a narrow line, the data changes more smoothly than before the density conversion, and sufficient edge emphasis is not performed. Further, the data change at the high density side is large so that an edge is easily detected at the high density side and even image noises are emphasized. This is ascribable to that the slope of the -log characteristic is small at the low density side and large at the high density side. As to a full color image, the hue changes if the edge emphasis is performed on the data after the color correction.

Therefore, in order to reduce the above-mentioned problems, the change in the value component of an image is detected, and the edge emphasis amount is controlled according to the detected value.

Figure 32:
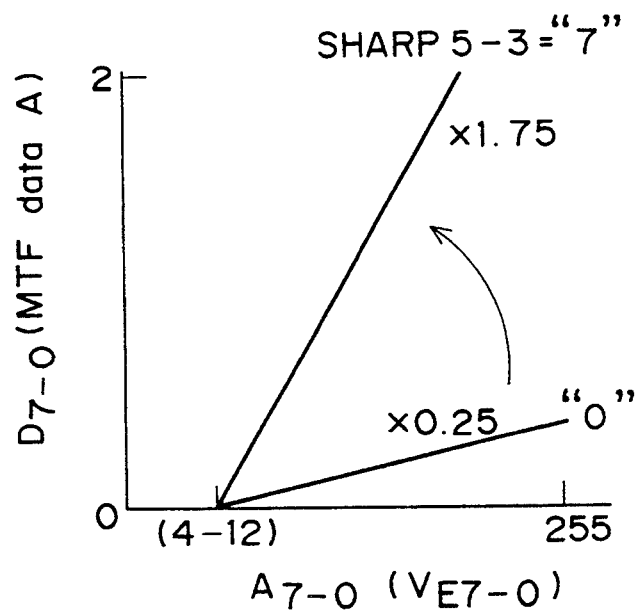
FIG. 32 is a graph of a change of an emphasis amount of an MTF control table.

Then, first, the read data R, G, B are converted to the value V and the value data $V_{7-0}$ is sent to the primary differential filters 400 and 402 for the main scan direction and for the subscan direction, respectively, in order to extract the changes in each direction. Then, an average $V_{E7-0}$ of the absolute values of the changes is obtained. The result is converted with the MTF control table 412, as shown in FIG. 32, to the MTF data A ($D_{7-0}$) which is sent to the MTF correction section 78. In FIG. 32, the signal $SHARP_{5-3}$ denotes the BANK number of the table, and the emphasis amount ($D_{7-0}$) is adjusted according to the sharpness signal. FIG. 32 shows an example wherein the emphasis is performed with a factor 1.75 when the SHARP="7" and with a factor 0.25 when the SHARP="0". That is, the average $V_E$ of the absolute values of edge amounts is converted linearly to the MTF data A except near zero of the signal $V_E$.

Figure 33:
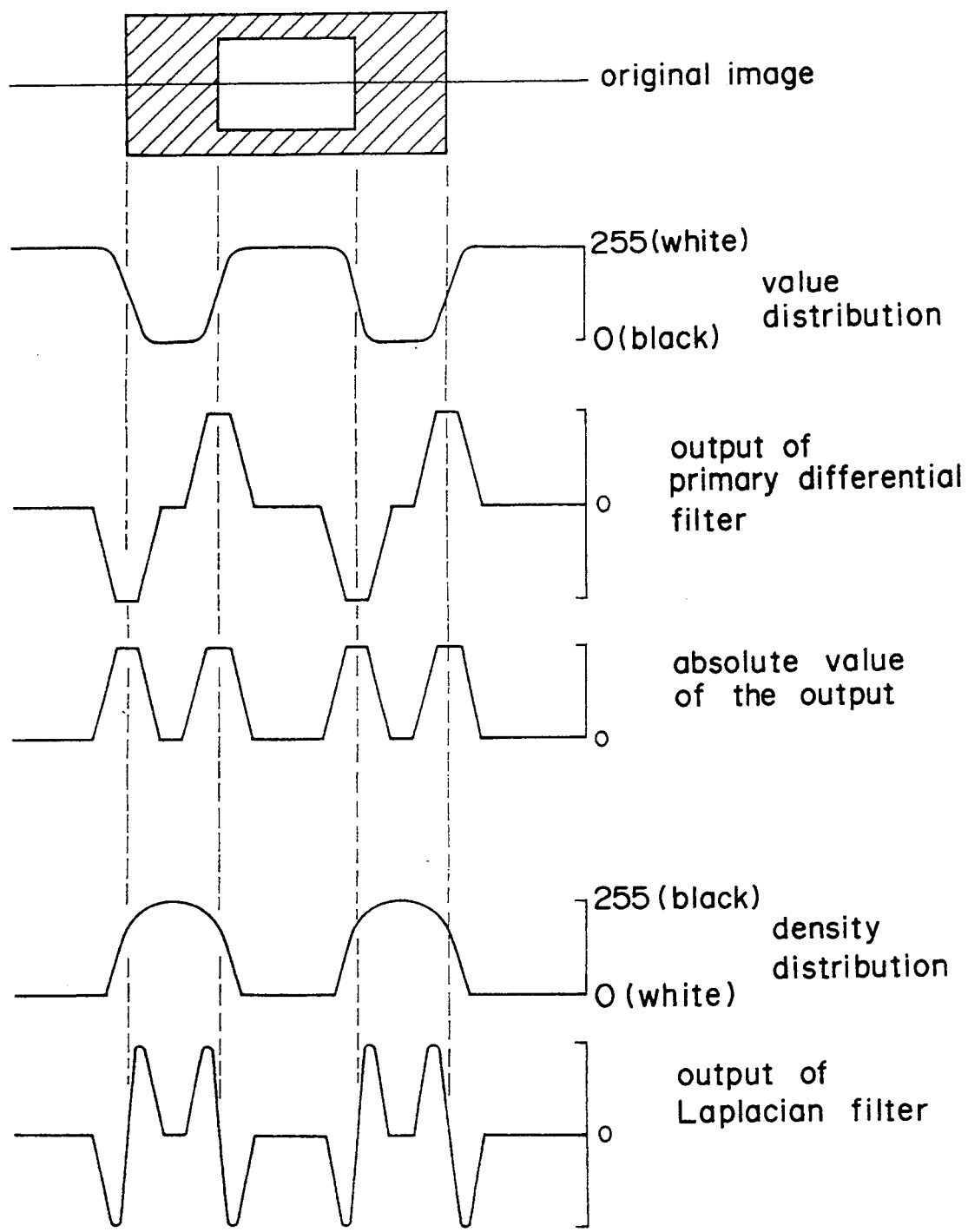
FIG. 33 is a diagram of read data of an image shown above and the processing thereof.

FIG. 33 shows the value distribution, the output of the primary differential filter 502 in correspondence to the value distribution and the absolute value thereof detected by the absolute value detector 404 when an original image shown at the top is read at the central line. The absolute value is averaged and is converted to the MTF data A in response to the appropriate SHARP setting value. The result is next sent to the MTF correction section 78 wherein it is multiplied for edge emphasis with the output of a Laplacian filter 610 of the density PD of C, M and Y.

(f-4) decision of achromatic edge portion

In order to improve the reproducibility of a black character or a black narrow line in a full color image, it is better to prevent the color blur at an achromatic edge portion. The color blur can be prevented by removing the C, M, Y data and by performing the edge emphasis only for the K data in an achromatic edge portion.

First, the absolute values, $|VH_{7\text{-}0}|$ and $|V_{V7\text{-}0}|$, are converted to bi-level data with the threshold value REF, and the edge emphasis is decided with the comparators 420 and 422 in either of the main scan and subscan directions (FIG. 26). If an edge is detected, $\overline{ED}$ is set to be "L".

Second, the signal WS is compared by the comparator 442 with the output of the BK level reference table 440 by the comparator 442 or is binarized in order to decide if the image has an achromatic color or not. If it is decided to have an achromatic color, $\overline{BK}$ is set to be "L".

Third, only when $\overline{ED}$="L" and $\overline{BK}$="L", an achromatic edge decision signal $\overline{EDG}$="L" is outputted via the AND gate 444 in order to conduct a special processing (color blur correction) in the MTF correction section 78.

In the case of either of the monochromatic color edition area ($\overline{MONO}$="L"), the color change edition area ($\overline{CH}$="L"), and the bordering edition area ($\overline{WAKU}$="L"), the achromatic edge decision signal $\overline{EDG}$ is made invalid through the NAND gate 446 and the AND gate 448. This is performed in order to prevent the effect of the color blur correction in such edition areas.

As will be explained later, in the color blur correction in the MTF correction section 78, if the color resolution data for reproduction in the MTF correction section 78 is black K, the achromatic edge decision signal $\overline{EDG}$ is made valid only when the color signal $\overline{CMY/K}$ signal is "L". This is because the usual area emphasis processing is performed. ($\overline{ED}$="L" is a signal which shows an edge portion of an image, and $\overline{WAKU}$ is outputted as the bordering edition area signal, wherein the signal $\overline{EGEN1}$ is a signal for the permission of the bordering edition.)

(g) color correction

Each color data C', M', Y' and K' of cyan, magenta, yellow and black necessary for reproducing a full color image is generated for each scan in the plane-at-a-time scheme, and a full color image is reproduced with four successive scans. The printing of black is performed because the overlay of cyan, magenta and yellow is difficult to reproduce black because the reproduction of pure black is hard due to the spectral characteristic of each toner. Then, in the full-color printer, the reproducibility is improved in a full color image by using the subtractive mixing of the data C', M' and Y' and the black paint of the data K'.

(g-1) automatic UCR/BP processing

Figure 34:
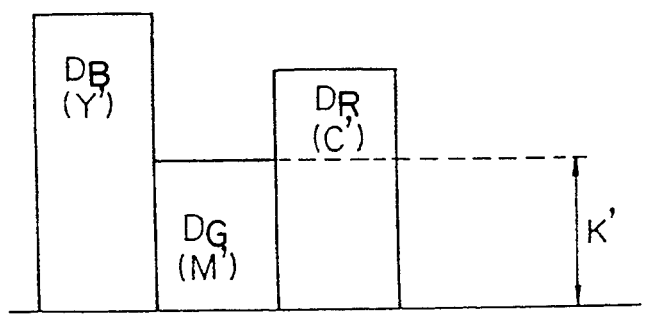
FIG. 34 is a graph of black data.

The black amount K is obtained in the color correction section 72 from the red, green and blue components DR, DG and DB which express the brightness on a document. Because the data DR, DG and DB received from the density conversion section 68 are the density data of the R, G and B components, the they agree with the C', M' and Y' components of cyan, magenta and yellow which are complementary colors of red, green and blue. Therefore, as shown in FIG. 34, the minimum of DR, DG and DB are the component wherein the C', M' and Y' on the document are overlayed, and the minimum of DR, DG and DB can be taken as the black data K'. Then, in the color correction section 72, the black data K'=MIN(DR, DG, DB) is detected.

When the reproduction color data C', M'and Y' are generated, the data K' is used to subtract $\alpha \cdot K'$ (under color remove amount) from the data C', M' and Y' and to generate the black data K as $\beta \cdot K'$ (black paint amount). As explained before, $\alpha$ denotes the UCR (under color remove) ratio, while $\beta$ denotes the BP (black paint) ratio, and these ratios are set in the region discrimination section 74 not directly from the density data DR, DG and DB of red, green and blue, but from the chroma data WS obtained by the HVC conversion of these data (refer FIGS. 26 and 31).

Further, in order to improve the brightness at the low density side in the UCR/BP processing, certain levels $d_1$ and $d_2$ (K cut-off data) are subtracted from the MIN (DR, DG, DB) before the multiplication with $\alpha$ and $\beta$, as will be explained later.

(g-2) masking processing

Figure 35:
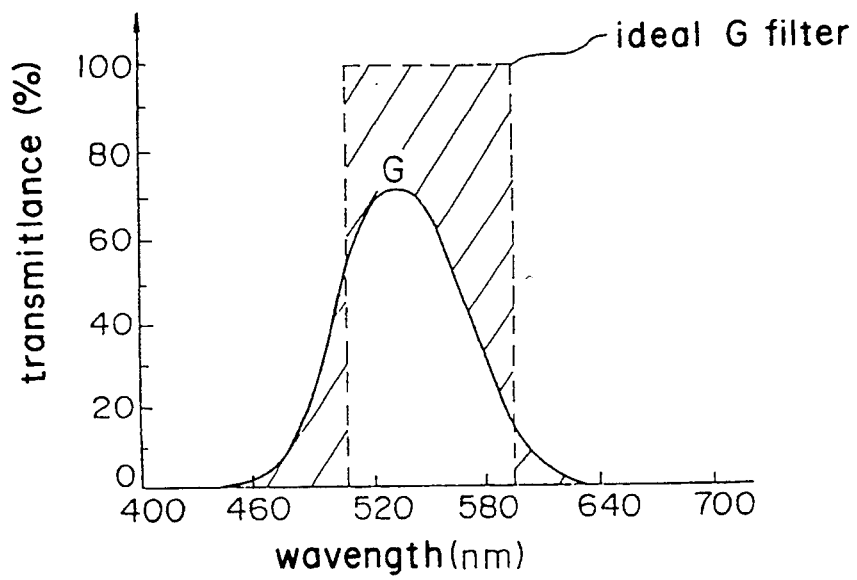
FIG. 35 is a graph of the characteristic of a green filter.
Figure 36:
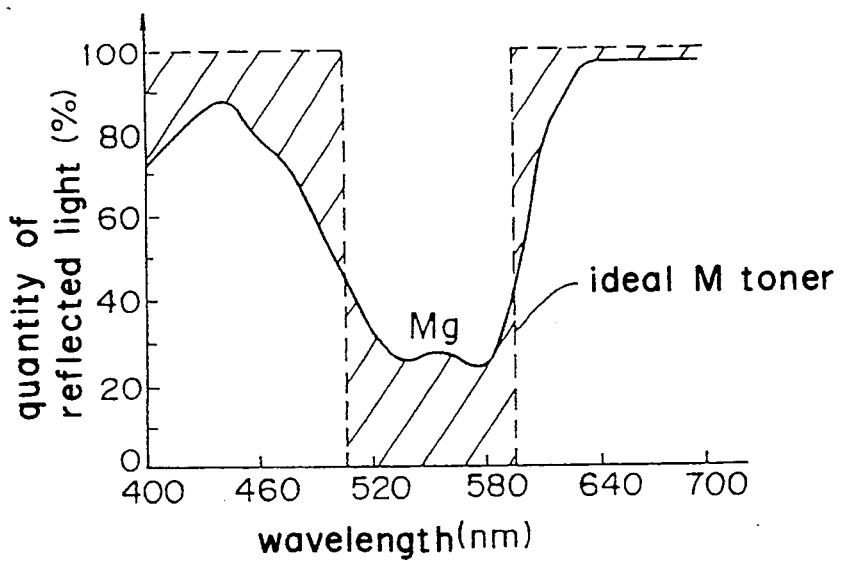
FIG. 36 is a graph of the characteristic of magenta toners.

Further, the color correction section 72 corrects the transmission characteristics of each filter R, G, B provided in the CCD sensor 14 and the reflection characteristics of each toner of cyan, magenta and yellow for the development in order to make matching with the ideal color reproduction characteristics. As shown for example in the transmission characteristics of a green filter in FIG. 35 and in the reflection characteristics of a magenta toner in FIG. 36, each characteristic has a nonideal wavelength region as displayed with oblique lines. Then, in order to correct this characteristics as well as to perform the above-mentioned UCR/BP processing, the linear masking correction is conducted.

That is, the MTF correction section 78 performs the masking calculation in order to reproduce an image from the full color input data. The masking coefficients ($A_{c,m,y}$, $B_{c,m,y}$ and $C_{c,m,y}$) are set so that the average color difference becomes minimum over the almost all color reproduction region. As the printing is repeated for each of the four reproduction colors successively, the masking equation is carried out by one line at one time.

$$\begin{pmatrix} C \\ M \\ Y \end{pmatrix} =$$

-continued $$\begin{pmatrix} A_c & A_m & A_y \\ B_c & B_m & B_y \\ C_c & C_m & C_y \end{pmatrix} \times \begin{pmatrix} DR - \alpha[MIN(DR,DG,DB)] - d_1] \\ DG - \alpha[MIN(DR,DG,DB)] - d_1] \\ DB - \alpha[MIN(DR,DG,DB)] - d_1] \end{pmatrix}.$$

$$K = \beta \cdot \{MIN(DR, DG, DB) - d_2\}$$

(g-3) examples of automatic UCR/BP processing

Figure 37:
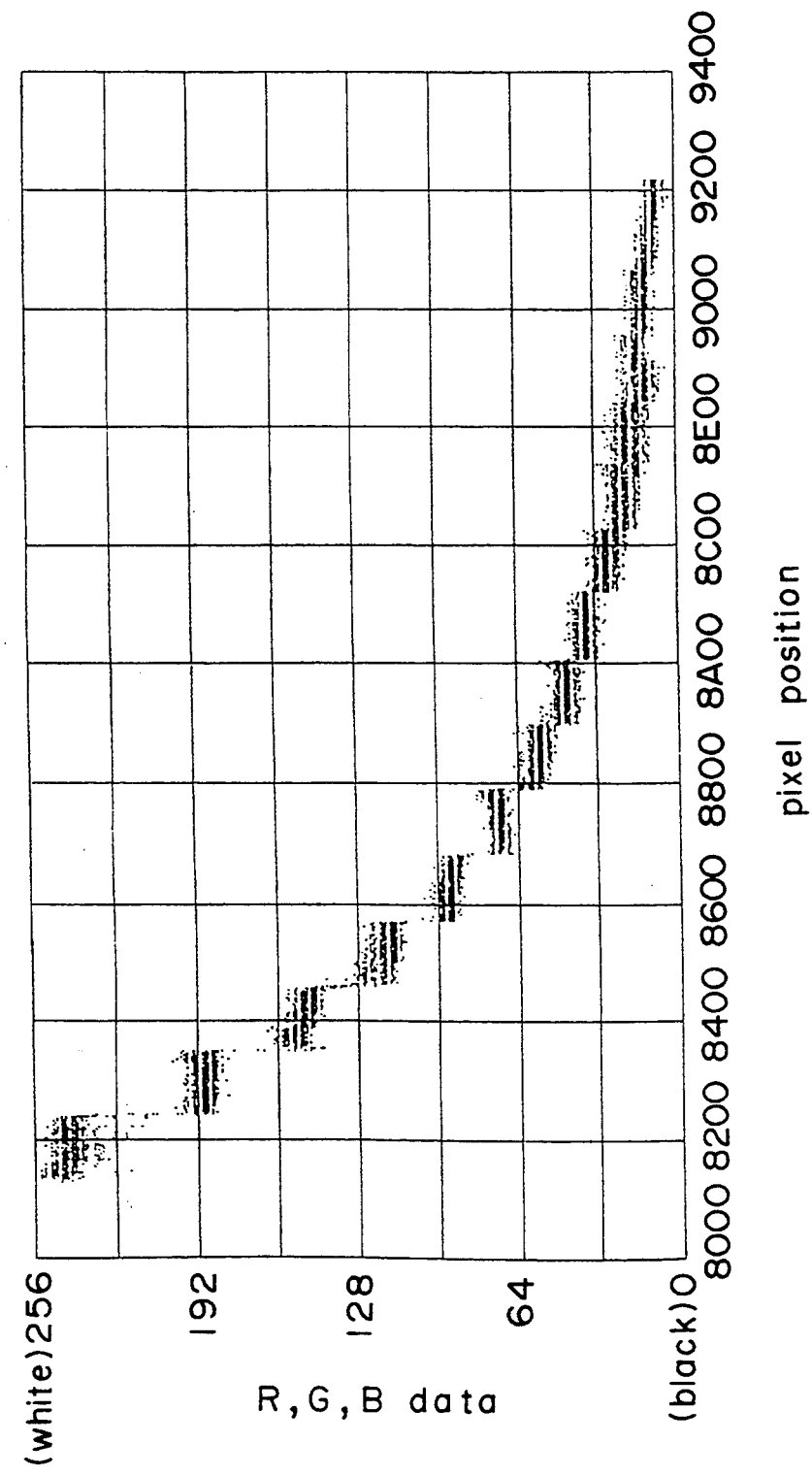
FIG. 37 is a graph of read data of a gray scale.

FIG. 37 shows an example of R, G and B data along one line in a grey scale, while FIG. 38 displays a part of the results of the UCR/BP processing on the data shown in FIG. 37. In FIG. 37, the obtained data R, G and B of the three colors are of about the same order. The density of the grey scale changes from left (black) to right (white) gradually. However, since the chroma WS of the grey scale is zero, the UCR/BP ratios are 100%. After the masking calculation, as shown in FIG. 38, the outputs of C, M and Y become zero, and the density change of the grey scale can be expressed almost only with K. Thus, the color reproducibility of the grey scale is improved.

Figure 39A:
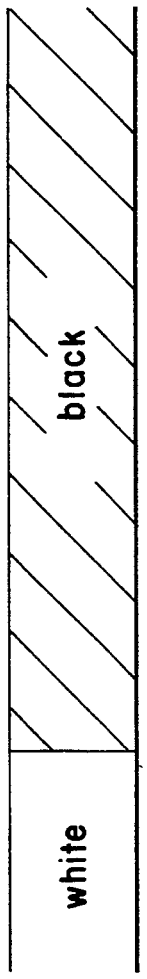
FIG. 39 is a graph of read data of an image of black and white with use of each element of a CCD sensor (the abscissa denotes the address)
Figure 39B:
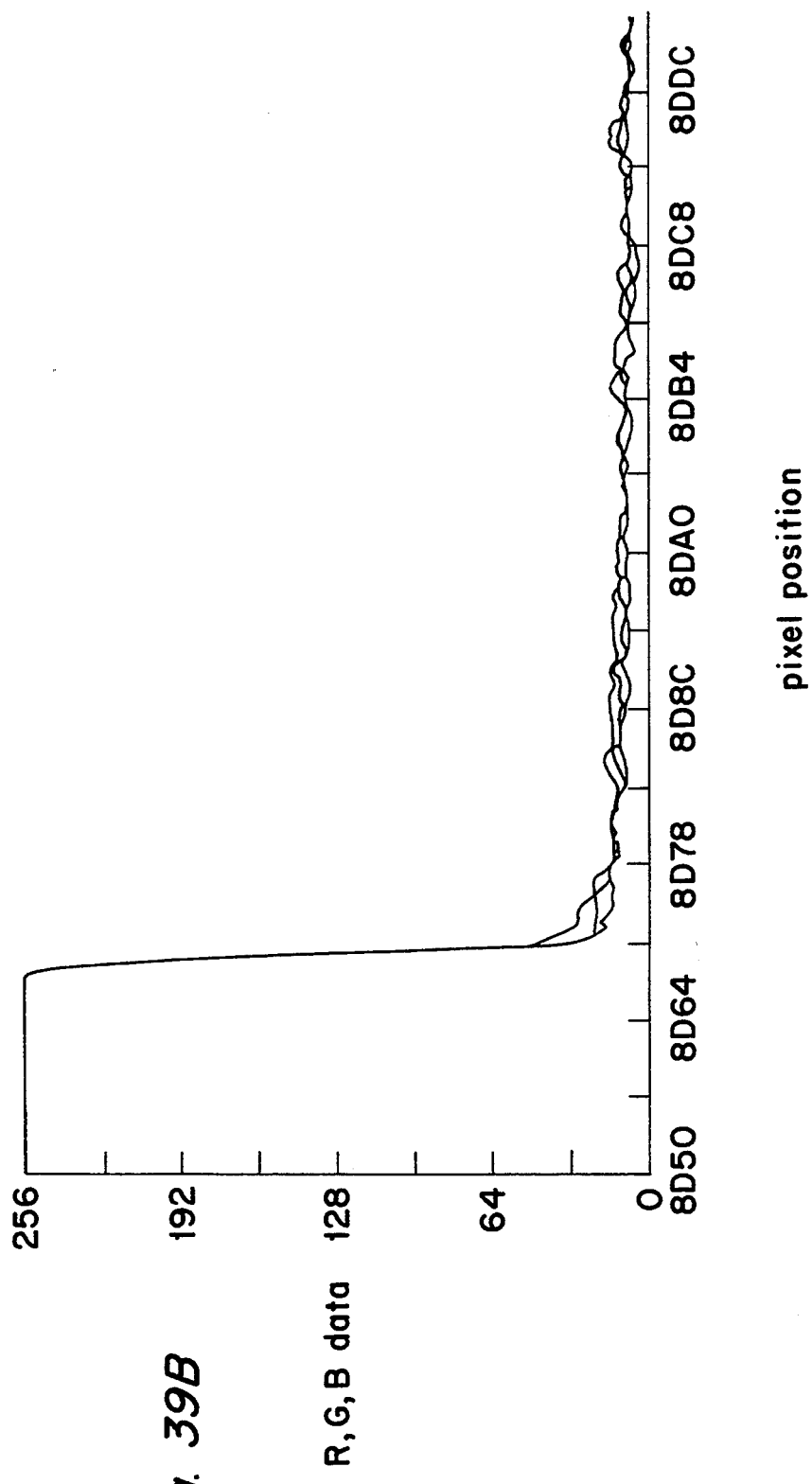
Figure 40:
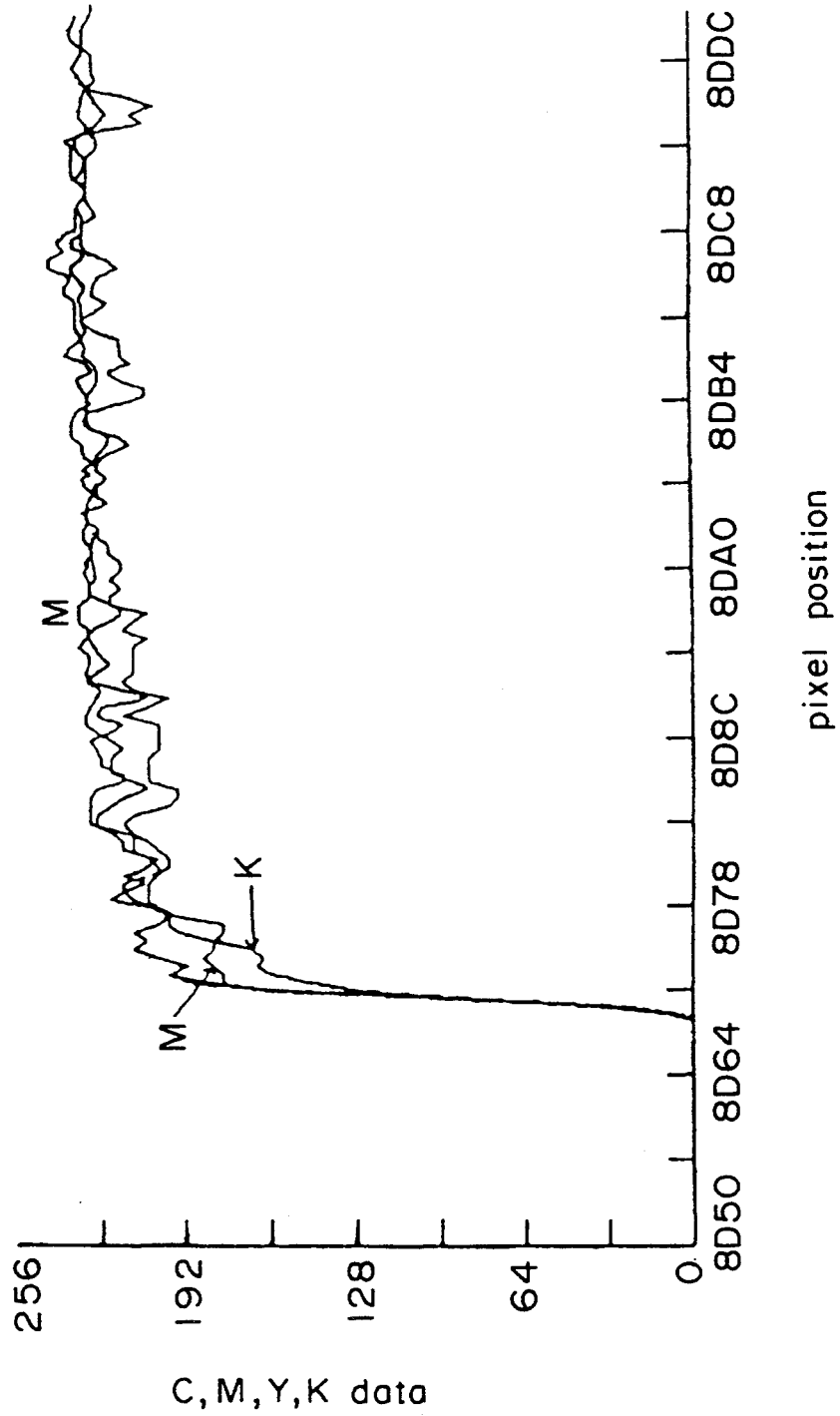
FIG. 40 is a graph of density converted from the data of FIG. 39.
Figure 41:
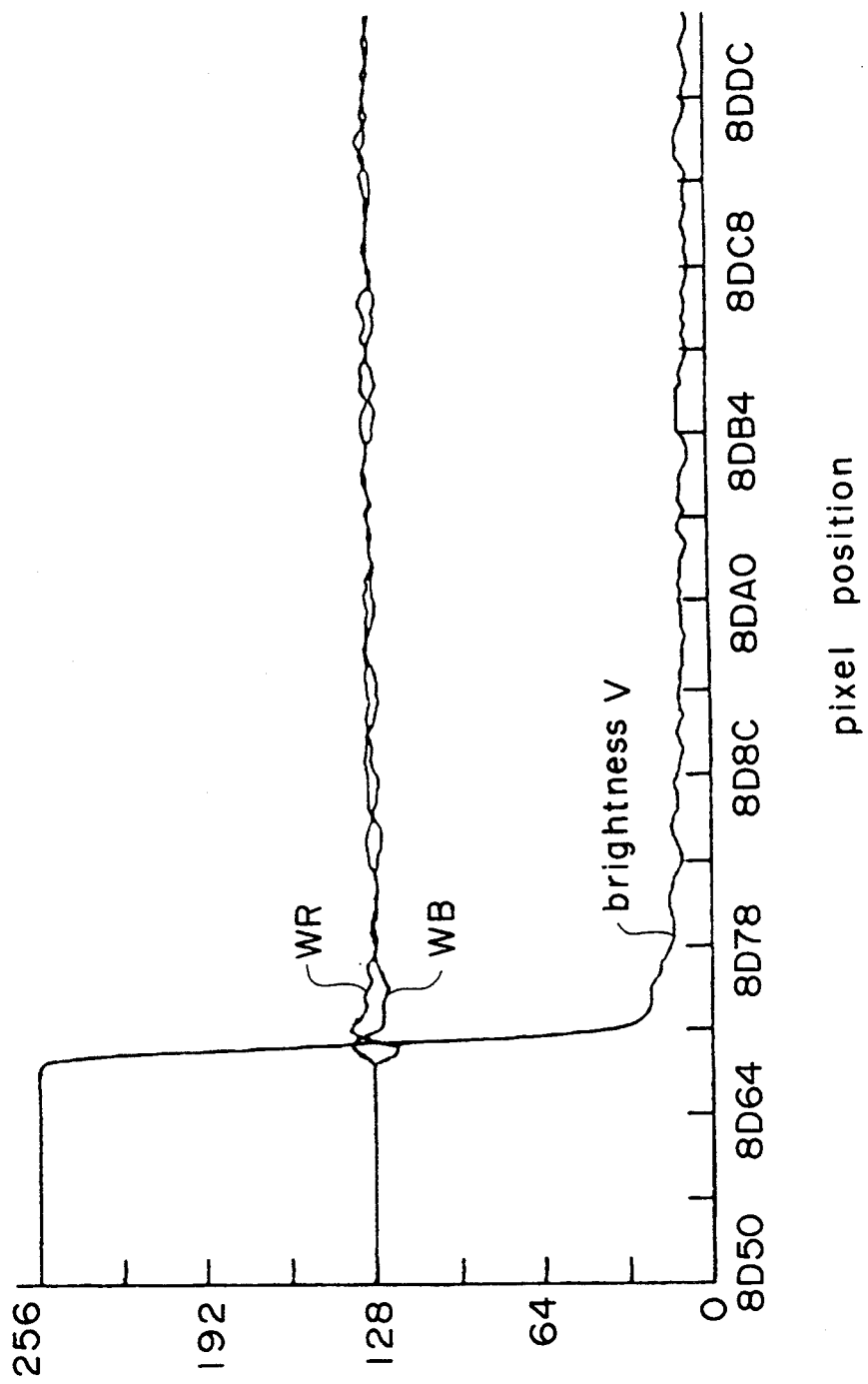
FIG. 41 is a graph of HVC conversion of the data of FIG. 39.
Figure 42:
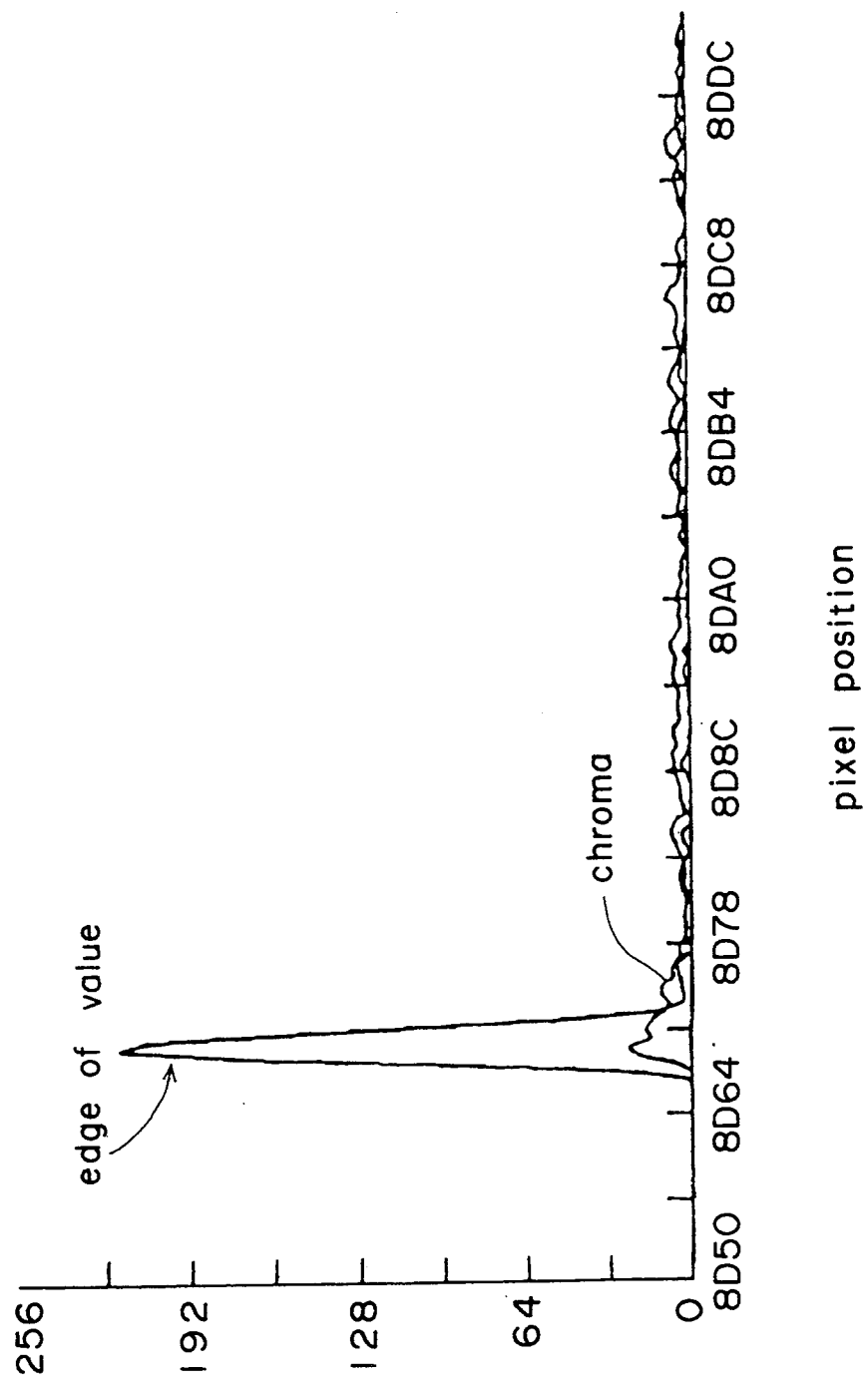
FIG. 42 is a graph of the edge of value and of chroma of the data of FIG. 41.

Further, FIG. 39 shows an example of the R, G and B data along one line in an image of black and white shown in the upper portion of FIG. 39. FIG. 40 shows the density conversion data of the read data, and FIGS. 41 and 42 show the results of the HVC conversion. As shown in FIG. 40, the C, M and Y values are large in the white portion of the image, while as shown in FIG. 42, the chroma of the image is small. Therefore, the UCR/BP ratios becomes almost 100%, and as shown in the results of the UCR/BP processing in FIG. 43, the C, M and Y outputs become small and the image can be expressed almost only with K. Therefore, the black reproducibility of an achromatic image can be improved.

Figures 44A, 44B:
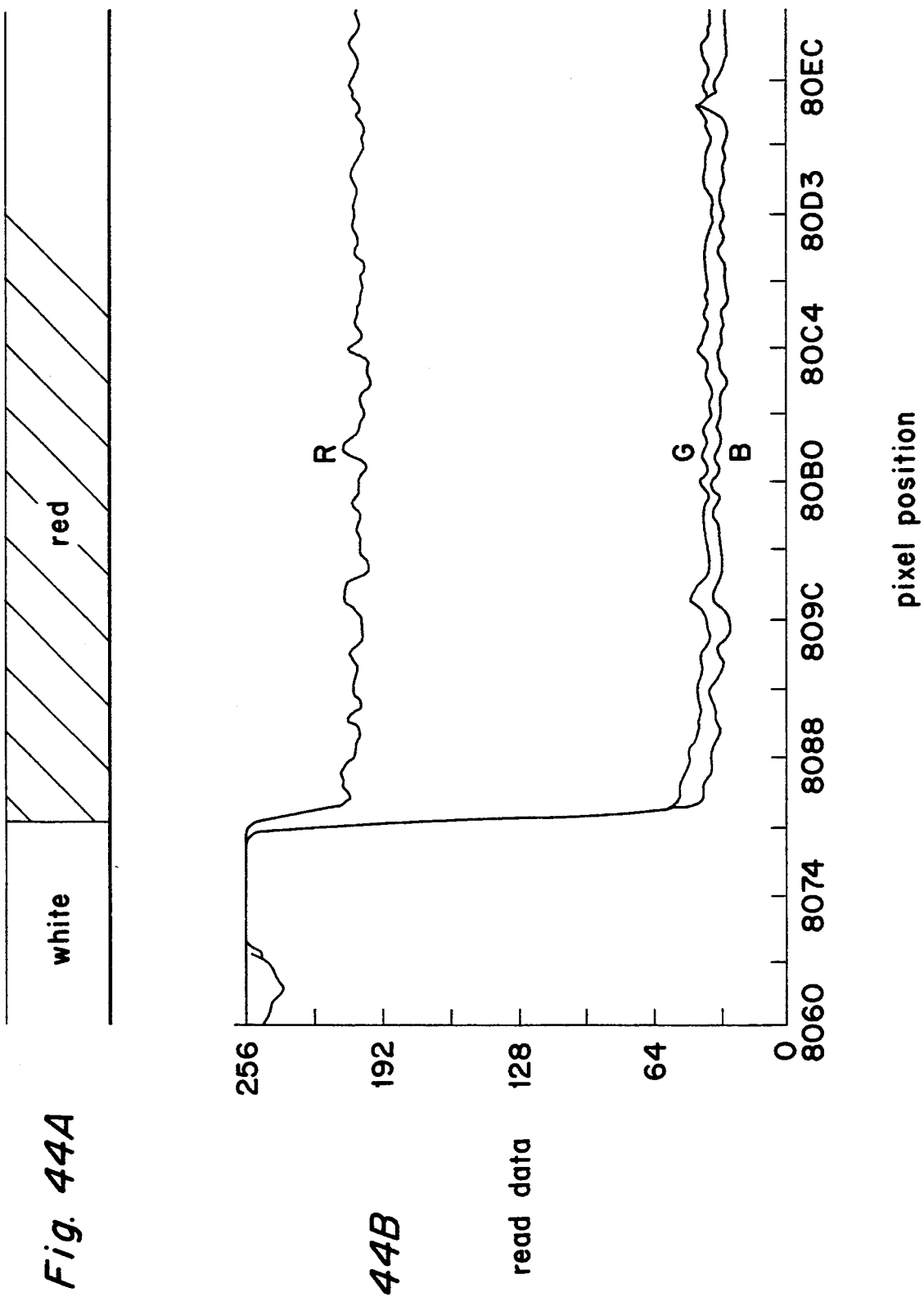
FIG. 44 is a graph of read data of an image of red and white with use of each element of a CCD sensor (the abscissa denotes the address)
Figure 45:
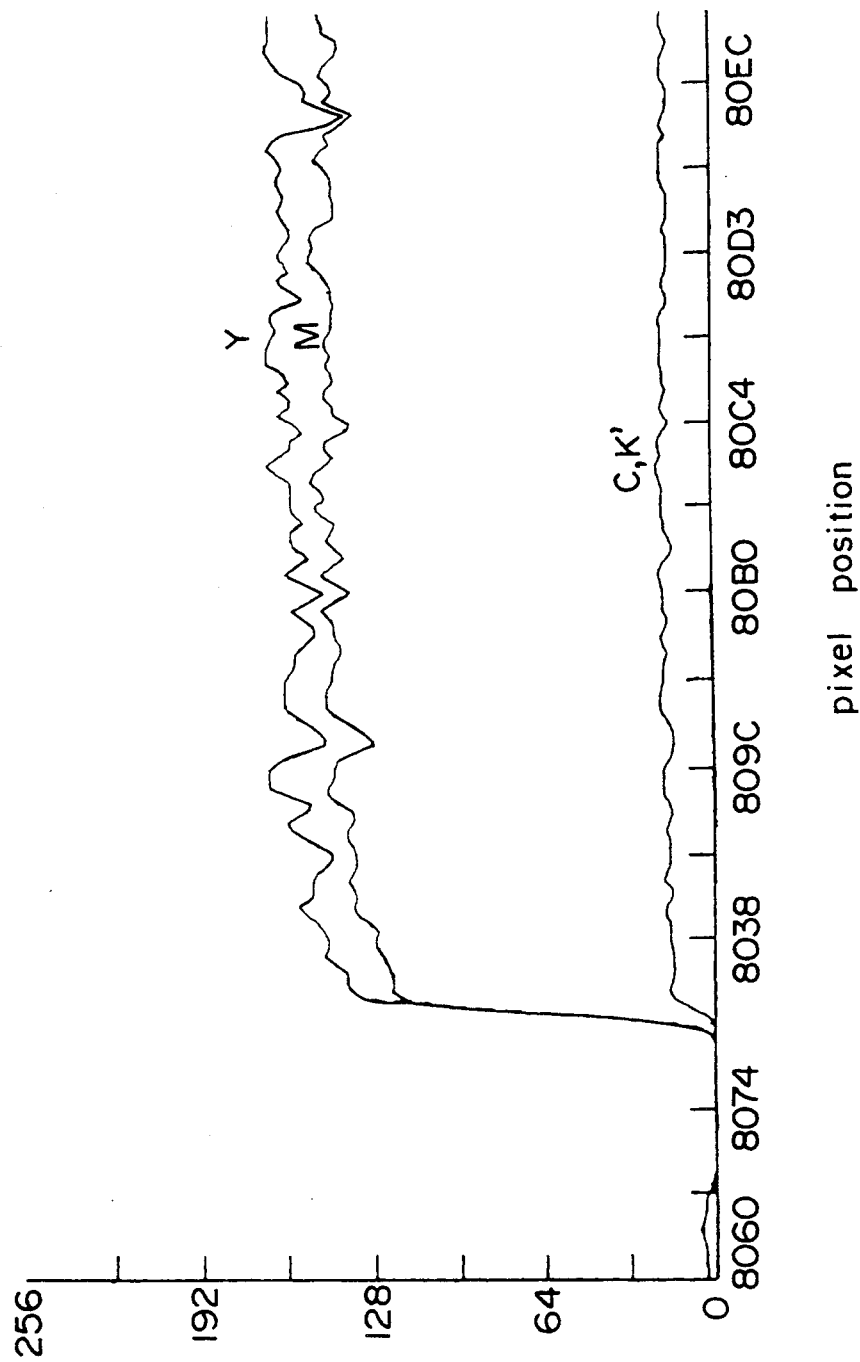
FIG. 45 is a graph of density converted from the data of FIG. 44.
Figure 46:
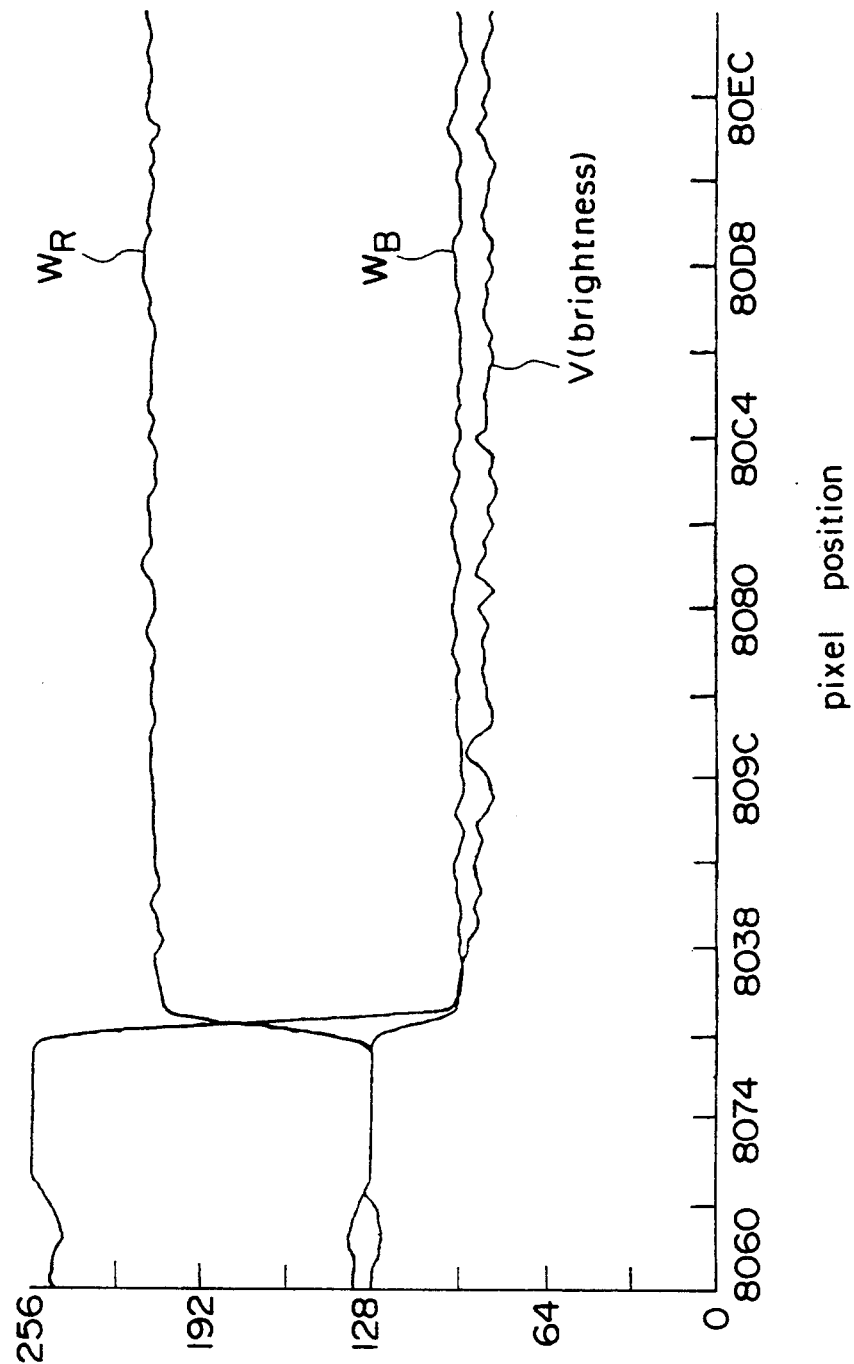
FIG. 46 is a graph of HVC conversion of the data of FIG. 44.
Figure 47:
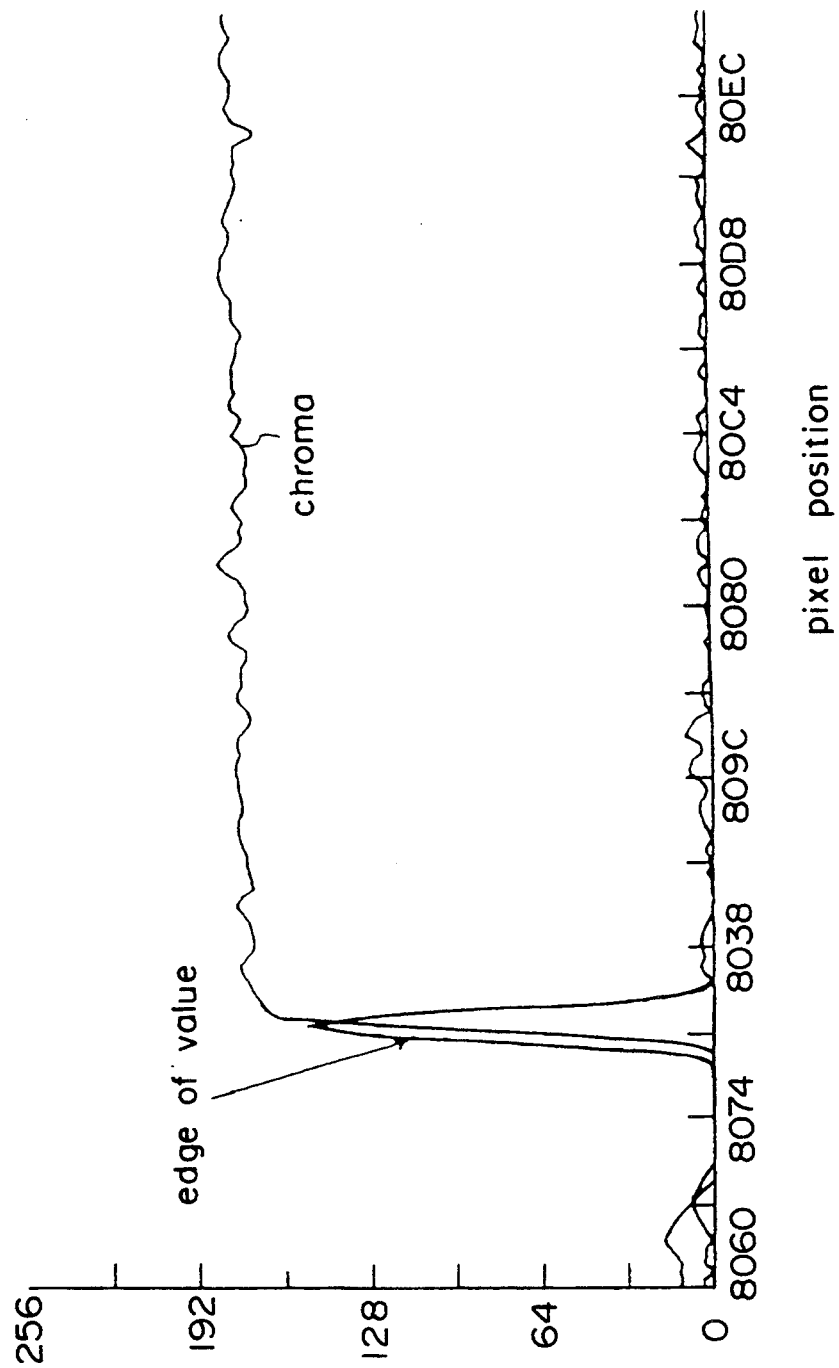
FIG. 47 is a graph of the edge of value and of chroma of the data of FIG. 46.
Figure 48:
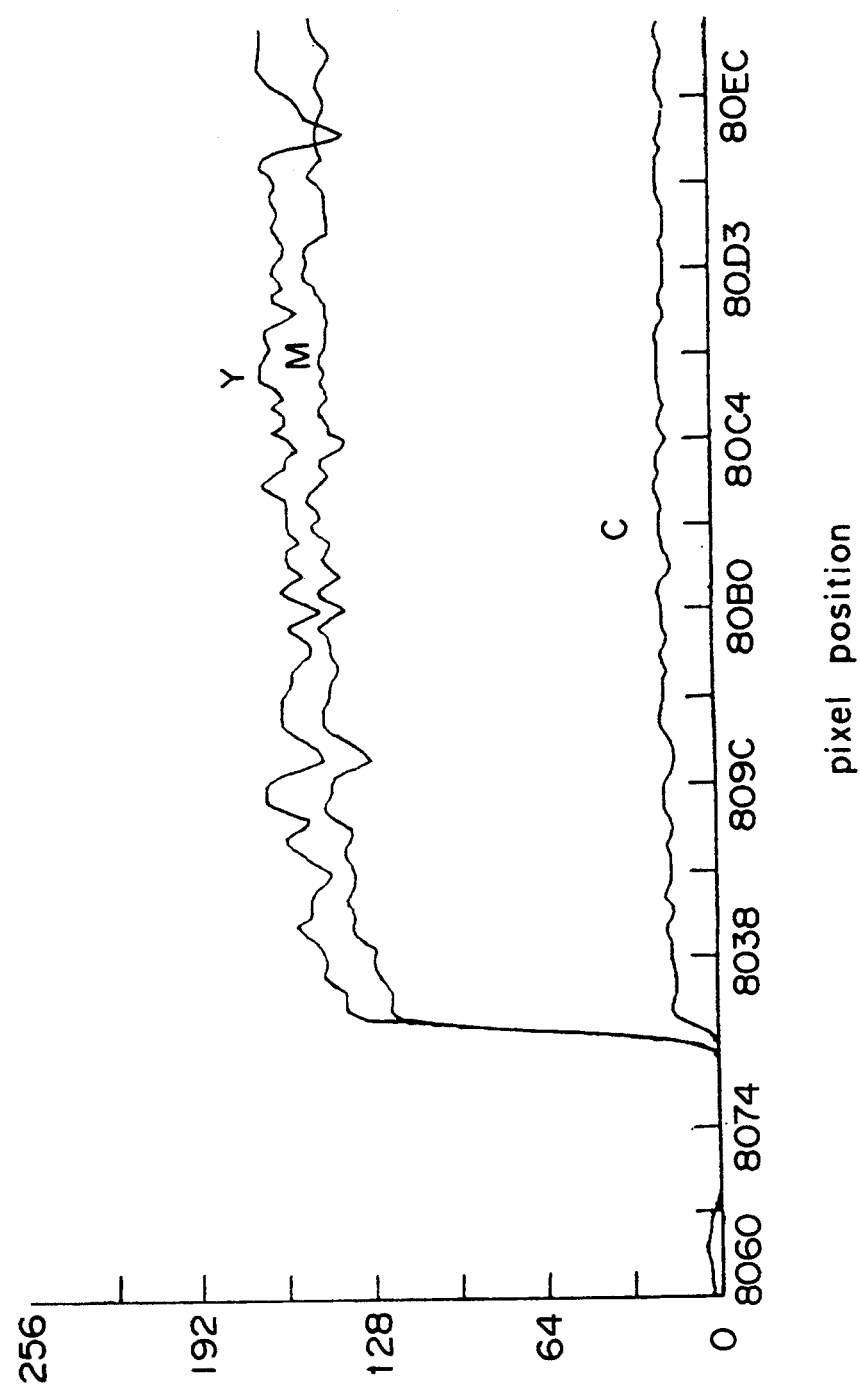
FIG. 48 is a diagram of the result of automatic UCR/BP processing of the data of FIG. 44.

Still further, FIG. 44 shows an example of the R, G and B data along one line in an image of red and white shown in the upper portion of FIG. 44. FIG. 45 shows the density conversion data of the read data, and FIGS. 46 and 47 show the results of the HVC conversion. As shown in FIG. 45, in the white portion of the image, the C, M and Y values are large, while in the red portion of the image, the C and K' values are large and the M and Y data are also not small. As shown in FIG. 47, the chroma in the red portion is large. In the UCR/BP processing in this example, the UCR/BP ratios are set to be 0% if WS$\geq$85 and 100(1-W/85) % if WS<85. Therefore, as shown in the results of the UCR/BP processing in FIG. 48, the K output vanishes and the image can be expressed only with chromatic colors almost of cyan. Therefore, the brightness of a chromatic image can be improved.

(g-4) monochromatic color mode and color change mode

The color reproduced in the monochromatic color mode can be selected among red (R), green (G), blue (B), cyan (C), magenta (M), yellow (Y) and black (K). As shown in Table 5, the reproduction color is determined by the state (C, M, Y, K) of the color resolution data to be sent to the printer and the logic signal of WH, to generate the final data (MONO$_{7-0}$) in the monochromatic mode. That is, if $\overline{WH}$="L", "00" is selected, while if $\overline{WH}$="H", DV$_{7-0}$ is selected.

TABLE 5

| | | state of color resolution data | | | |
|---|---|---|---|---|---|
| | | C | M | Y | K |
| reproduction data of monochromatic color data | C | $\overline{WH}$ = "H" | "L" | "L" | "L" |
| | M | "L" | "H" | "L" | "L" |
| | Y | "L" | "L" | "H" | "L" |
| | K | "L" | "L" | "L" | "H" |
| | R | "L" | "H" | "H" | "L" |
| | G | "H" | "L" | "H" | "L" |
| | B | "H" | "H" | "L" | "L" |

The data for color change is also selected at the same time, and the full color data (PD$_{7-0}$) can also be selected.

The full color data (PD$_{7-0}$), the monochromatic color data (MONO$_{7-0}$) and the color change data are controlled according to the signals $\overline{CHAN}$, $\overline{CCS}$ and $\overline{MONO}$, as shown in Table 6.

TABLE 6

| $\overline{CHAN}$ | $\overline{CCS}$ | $\overline{MONO}$ | selected data |
|---|---|---|---|
| "L" | "L" | — | change data |
| | "H" | "L" | data of monochromatic data (MONO$_{7-0}$) |
| | | "H" | data of full color (PD$_{7-0}$) |
| "H" | — | "L" | data of monochromatic data (MONO$_{7-0}$) |
| | | "H" | data of full color (PD$_{7-0}$) |

The selections of Tables 5 and 6 are performed in the color decision section 76 with use of a table (not shown).

(g-5) bordering processing

Figure 49:
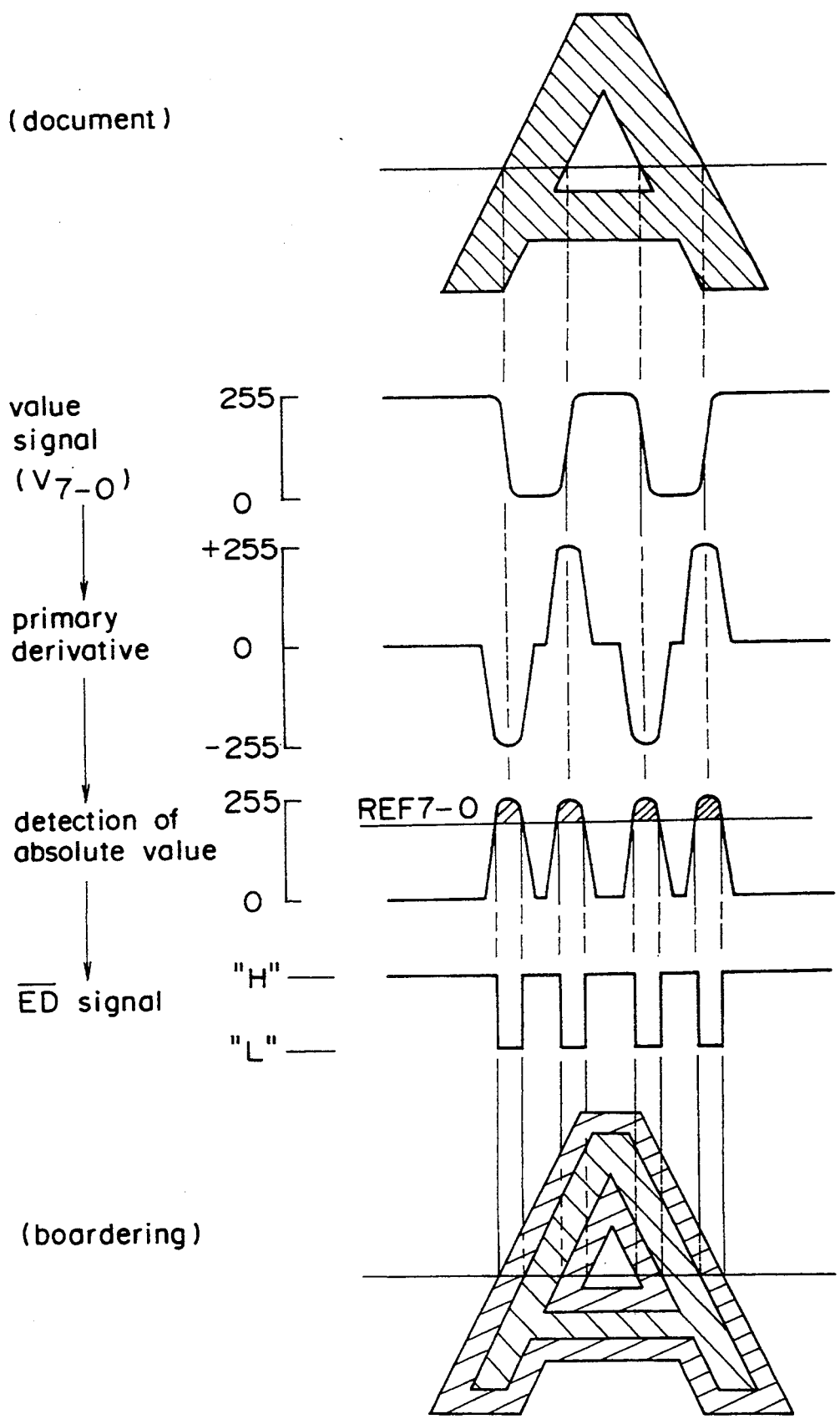
FIG. 49 is a diagram of an example of the data processing for bordering in a bordering mode.

In the bordering mode, as shown in FIG. 49, the bordering of an image is performed. As to an example of the read data of a document image (a large character "A") shown at the top portion in FIG. 49, the primary derivative (edge amount) of the value signal V is obtained, and the absolute value thereof is detected. The edge signal $\overline{ED}$ is outputted if the absolute value is larger than a threshold value REF, and a bordered image is outputted according the edge signal $\overline{ED}$. That is, a finite width of image is outputted around the edge portion (contour) of an image, and the size of the original image in the bordered image becomes smaller a little.

If $\overline{EDGE1}$="L", the edge signal $\overline{ED}$ is permitted, and the bordering mode designation signal ($\overline{WAKU}$) is generated.

The color for bordering can be chosen among the seven colors, C, M, Y, R, G, B and K. The print color is determined according to the state (C, M, Y, K) of the color resolution data, as shown in Table 7, and the selector 532 sends the data according to the WCLR signal, the bordering edition permission signal $\overline{EGN1}$, the edge signal $\overline{ED}$ and the bordering mode designation signal $\overline{WAKU}$, as shown in Table 8.

Further, the width of the edge portion for changing the color may be changed by an operator by providing an input means for specifying the threshold value REF.

TABLE 7

| | | state of color resolution data | | | |
|---|---|---|---|---|---|
| | | C | M | Y | K |
| designated data | C | "FF" | 00 | 00 | 00 |
| | M | 00 | "FF" | 00 | 00 |

TABLE 7-continued

| | state of color resolution data | | | |
|---|---|---|---|---|
| | C | M | Y | K |
| Y | 00 | 00 | "FF" | 00 |
| K | 00 | 00 | 00 | "FF" |
| R | 00 | "FF" | "FF" | 00 |
| G | "FF" | 00 | "FF" | 00 |
| B | "FF" | "FF" | 00 | 00 |

TABLE 8

| $\overline{EGEN1}$ | $\overline{ED}$ | $\overline{WAKU}$ | WCLR | selector output |
|---|---|---|---|---|
| "H" | — | "H" | — | selector output |
| "L" | "H" | "H" | — | selector output |
| | "L" | "L" | "L" | "00" |
| | | | "H" | "FF" |

(g-6) circuit of color correction section

Figure 50:
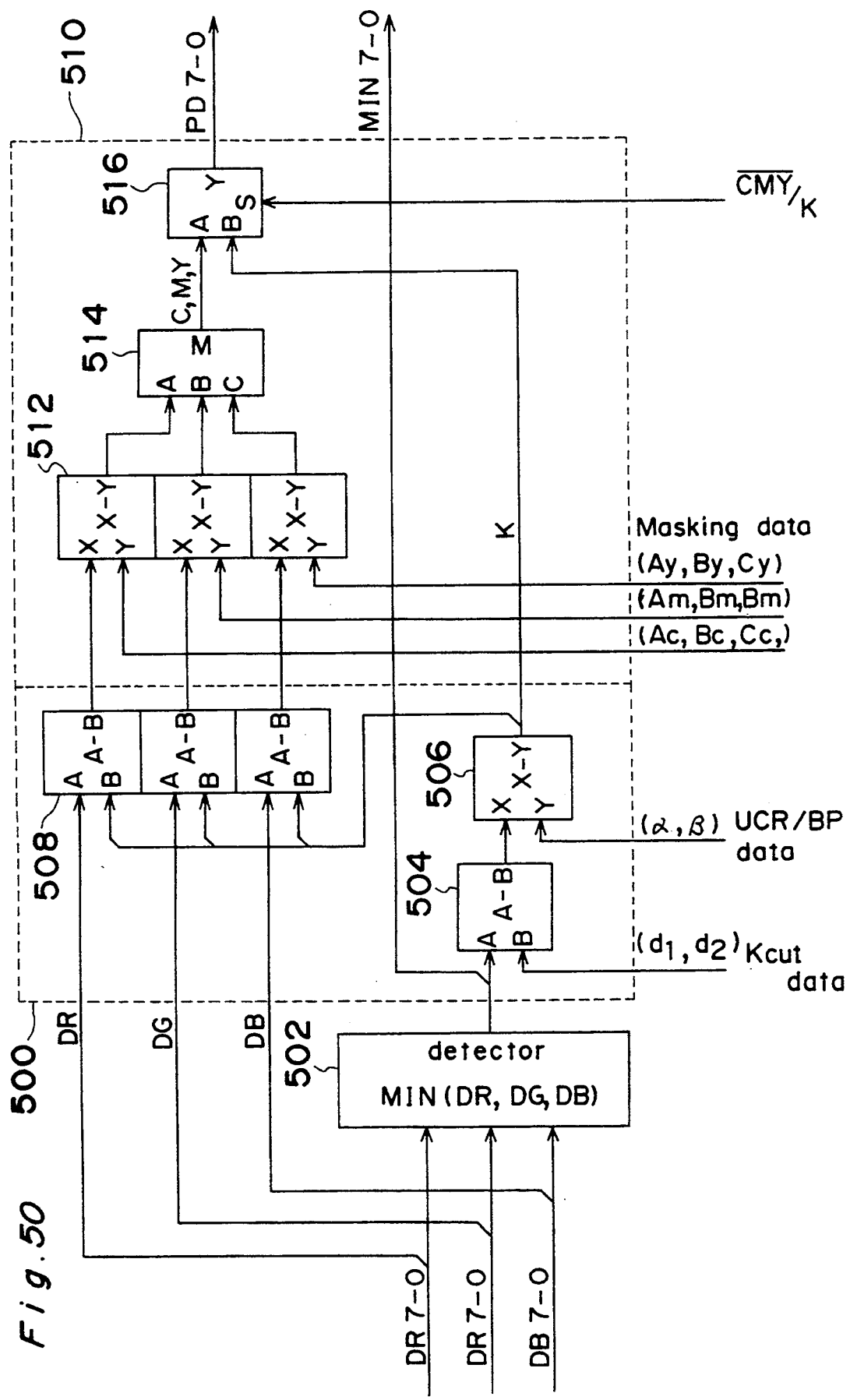
FIG. 50 is a part of a circuit diagram of color correction section.
Figure 51:
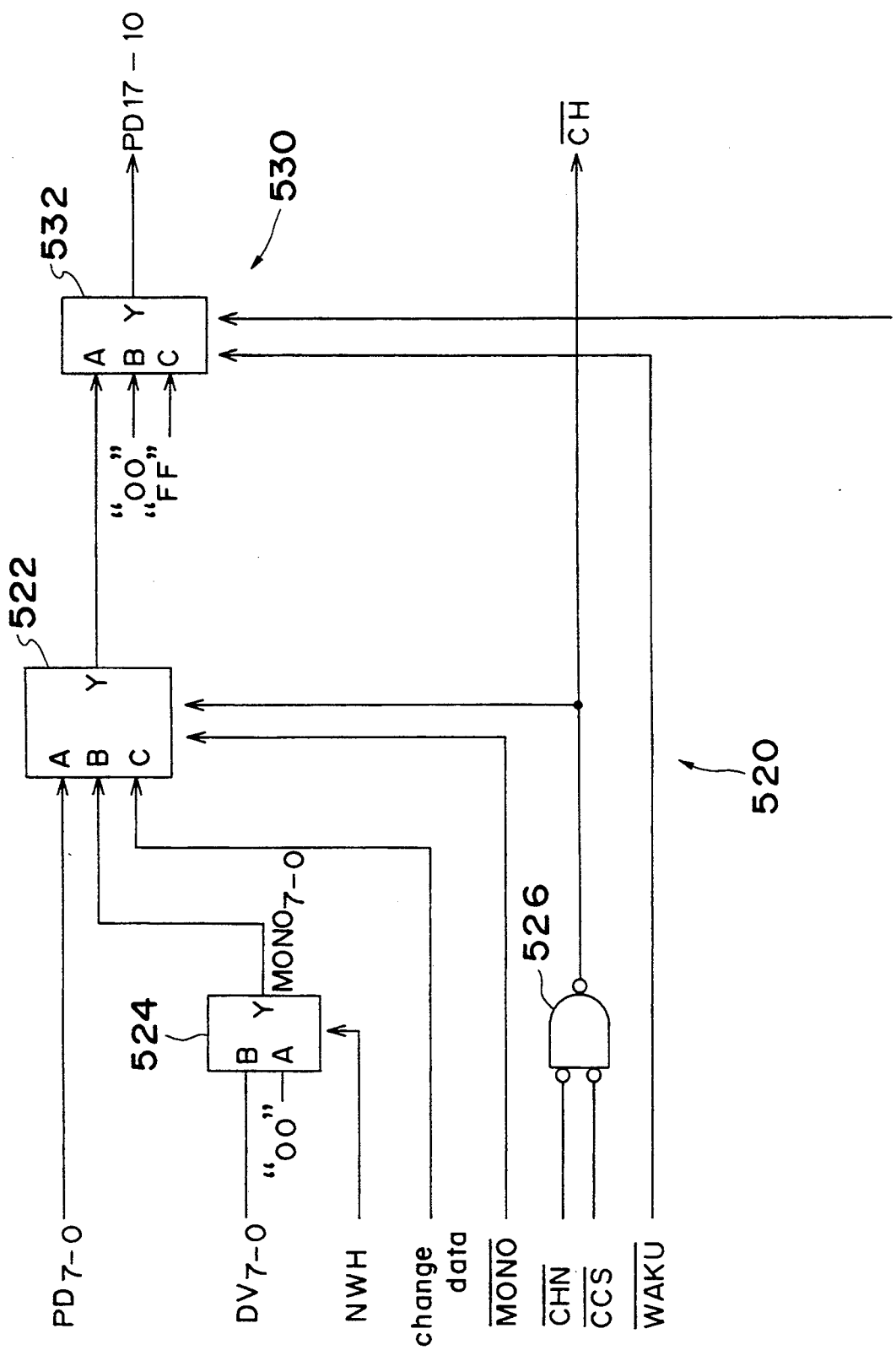
FIG. 51 is another part of the circuit diagram of color correction section.

FIGS. 50 and 51 display the circuit diagram of the color correction section 72. First, in the under color remove/black paint section 500, the minimum MIN(DR, DG and DB) is detected from the density signals DR, DG and DB received from the density conversion section 68 by the minimum detector 502. After the minimum is subtracted with a prescribed black cut-off data "d" by a subtracter 504, the difference is multiplied with the UCR/BP data $(\alpha/\beta)$ in a multiplier 506 to generate the black data K. Further, in a subtracter 508, the density data DR, DG, DB are subtracted with the black data K to remove the under color.

In the masking calculation section 510, the color data DR, DG and DB of the three colors received from the subtracter 508 are multiplied with the masking data $(A_{c,m,y}, B_{c,m,y}, C_{c,m,y})$ by a multiplier 512, and the result is added by an adder 514 to generate the data C, M and Y of cyan, magenta and yellow. Further, the data and the black data K from the multiplier 506 are selected by a selector 516 according to the color signal $\overline{CMY}/K$ to send a data PD.

Further, in the color change and monochromatic color selection section 520, the data PD is inputted to the A terminal of a selector 522. On the other hand, the value signal DV received from the density conversion section 68 and "00" are selected according to the signal $\overline{WH}$ in a selector 524 to send a monochromatic signal $\overline{MONO}$ to the B terminal in the selector 522. Further, the color change data is inputted to the C terminal of the selector 522. These signals are selected according to the signals $\overline{MONO}$ and $\overline{CH}$ by the selector 522. The signal $\overline{CH}$ is sent if both signals $\overline{CHN}$ and $\overline{CCS}$ are "L". In the bordering edition section 530, the input signals "00" and "FF" are selected according to the signals $\overline{WAKU}$ and WCLR to generate a signal $PD_{17-10}$.

Figure 52:
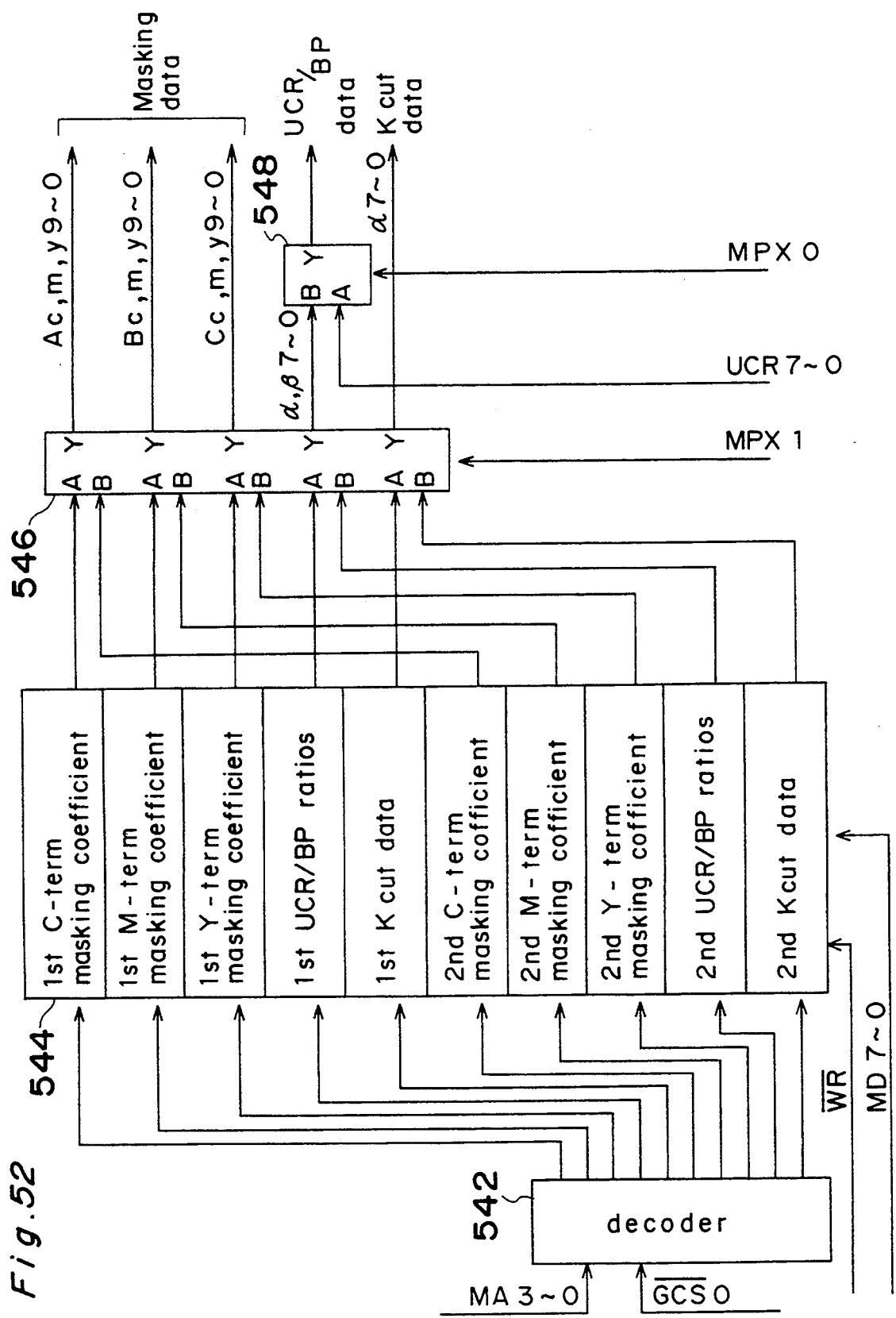
FIG. 52 is a circuit diagram of a register.

FIG. 52 shows a circuit diagram of the register section 540. In this embodiment, two kinds of data can be set for the above-mentioned UCR/BP data $(\alpha_{7-0}/\beta_{7-0})$, the masking data $(A_{c,m,y}, B_{c,m,y}, C_{c,m,y})$ and the black cut-off data $(d_{7-0})$. Then, when a $\overline{GCS0}$ signal is generated, a parameter $MA_{3-0}$ is decoded by a decoder 542, and when a signal $\overline{WR}$ is generated, the data sent by the CPU are stored in the register 544, as denoted in FIG. 52. These data are sent to a selector 546, and one of them is selected according to a selection signal MPX1 as masking data $(A_{c,m,y}, B_{c,m,y}, C_{c,m,y})$, UCR/BP data $(\alpha_{7-0}/\beta_{7-0})$ and black cut-off data $(d_{7-0})$.

As shown in Table 9, two kinds of these data, the masking data $(A_{c,m,y}, B_{c,m,y}, C_{c,m,y})$, the UCR/BP data $(\alpha_{7-0}/\beta_{7-0})$ and the black cut-off data $(d_{7-0})$, can be set in the register 544, in the address map of the CPU. If $\overline{GCS0}$="L", the data are set at the rising edge of the $\overline{WR}$ signal. If MPX1="L", the first kind of data are selected, otherwise the second kind of data are selected.

TABLE 9

| $HA_{3-0}$ | contents to be set in register | |
|---|---|---|
| 0 | first masking coefficient for C(DR) term | $A_{c,m,y\ 9-7} = MD_{2-0}$ |
| 1 | first masking coefficient for C(DR) term | $A_{c,m,y\ 6-0} = MD_{6-0}$ |
| 2 | first masking coefficient for M(DG) term | $B_{c,m,y\ 9-7} = MD_{2-0}$ |
| 3 | first masking coefficient for M(DG) term | $B_{c,m,y\ 6-0} = MD_{6-0}$ |
| 4 | first masking coefficient for Y(DB) term | $C_{c,m,y\ 9-7} = MD_{2-0}$ |
| 5 | first masking coefficient for Y(DB) term | $C_{c,m,y\ 6-0} = MD_{6-0}$ |
| 6 | first UCR/BP ratios | $\alpha, \beta_{7-0} = MD_{7-0}$ |
| 7 | first K cut data | $d_{7-0} = MD_{7-0}$ |
| 8 | second masking coefficient for C(DR) term | $A_{c,m,y\ 9-7} = MD_{2-0}$ |
| 9 | second masking coefficient for C(DR) term | $A_{c,m,y\ 6-0} = MD_{6-0}$ |
| 10 | second masking coefficient for M(DG) term | $B_{c,m,y\ 9-7} = MD_{2-0}$ |
| 11 | second masking coefficient for M(DG) term | $B_{c,m,y\ 6-10} = MD_{6-0}$ |
| 12 | second masking coefficient for Y(DB) term | $C_{c,m,y\ 9-7} = MD_{2-0}$ |
| 13 | second masking coefficient for Y(DB) term | $C_{c,m,y\ 6-0} = MD_{6-0}$ |
| 14 | second UCR/BP ratios | $\alpha, \beta_{7-0} = MD_{7-0}$ |
| 15 | second K cut data | $d_{7-0} = MD_{7-0}$ |

The output data of the UCR/BP data $(\alpha/\beta)$ of the register 544 and the $UCR_{7-0}$ are selected further in a selector 548 according to a selection signal MPX0 to send UCR/BP data. The data $UCR_{7-0}$ is the chroma data received from the region discrimination section 74.

Further, Tables 10 and 11 display the bit definition of the masking data and the UCR/BP data, respectively.

TABLE 10

| bit | 7 | 6 | 5 | 4 | 3 | 2 | 1 | 0 |
|---|---|---|---|---|---|---|---|---|
| digit | 1/2 | 1/4 | 1/8 | 1/16 | 1/32 | 1/64 | 1/128 | 1/256 |

TABLE 11

| bit | 7 | 6 | 5 | 4 | 3 | 2 | 1 | 0 |
|---|---|---|---|---|---|---|---|---|
| digit | 1 | 1/2 | 1/4 | 1/8 | 1/16 | 1/32 | 1/64 | 1/128 |

(h) MTF correction

The MTF correction section 78 performs smoothing processing, edge emphasis processing and color blur correction.

(h-1) circuit of MTF correction section

Figure 53:
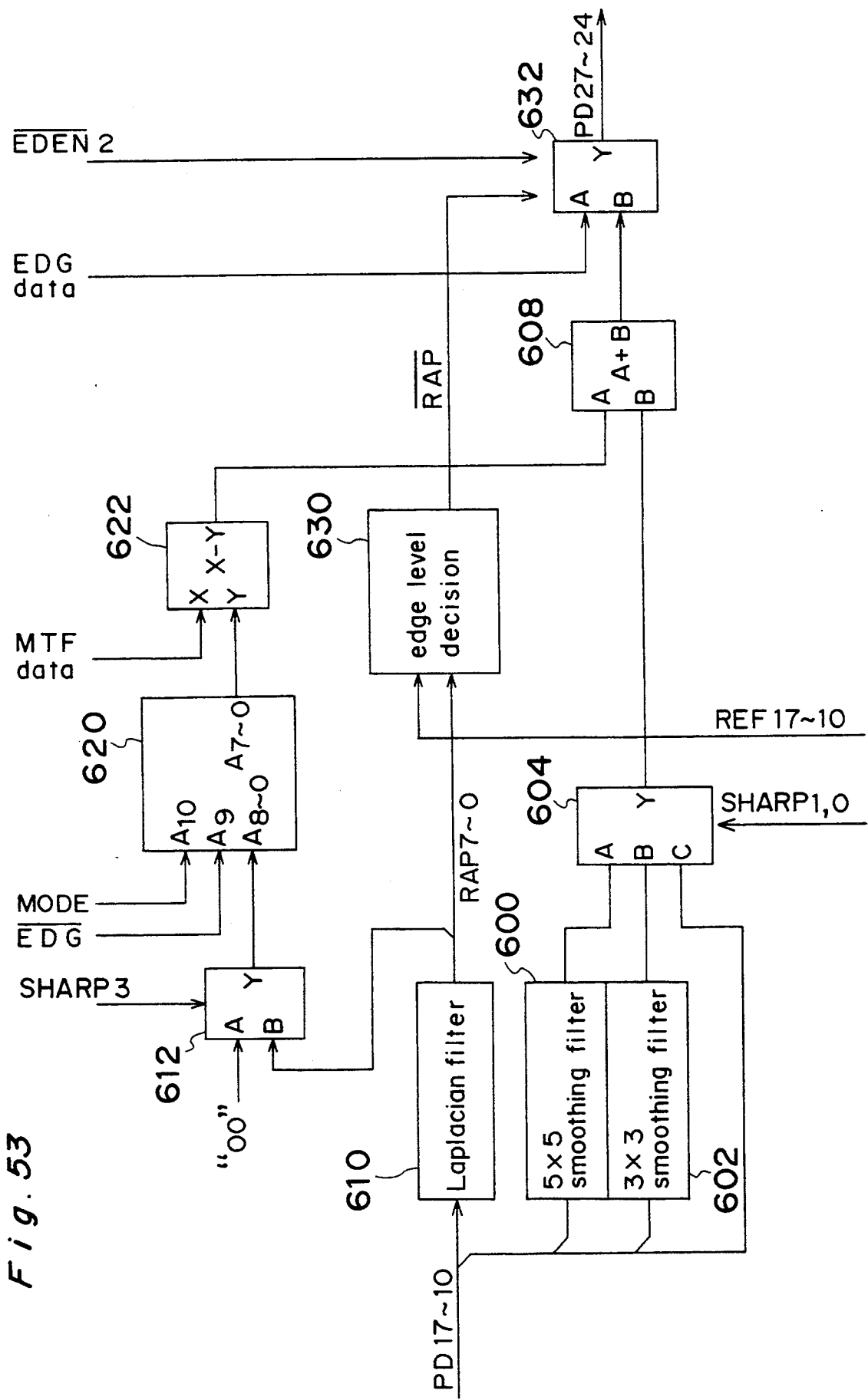
FIG. 53 is a circuit diagram of an MTF correction section.

FIG. 53 displays a circuit diagram of the MTF correction section 78. The outline of the image data processing can be understood with use of the block diagram of FIG. 24.

The signal PD received from the color correction section 72 is smoothed by performing the weight average of the central pixel and pixels around it with use of two kinds of two-dimensional FIR type digital filters 600 and 602. The output signals of the two filters and the signals not processed with the above-mentioned smoothing are received by a selector 604, and are selected according to the signal SHARP$_{1,0}$. Thus, the image noises are reduced and the smoothing of image data is performed.

The signal PD received from the color correction section 72 is also sent to a Laplacian filter 610, which is called also as a secondary differential filter and acts to extract an edge component of the input image.

Figure 57:
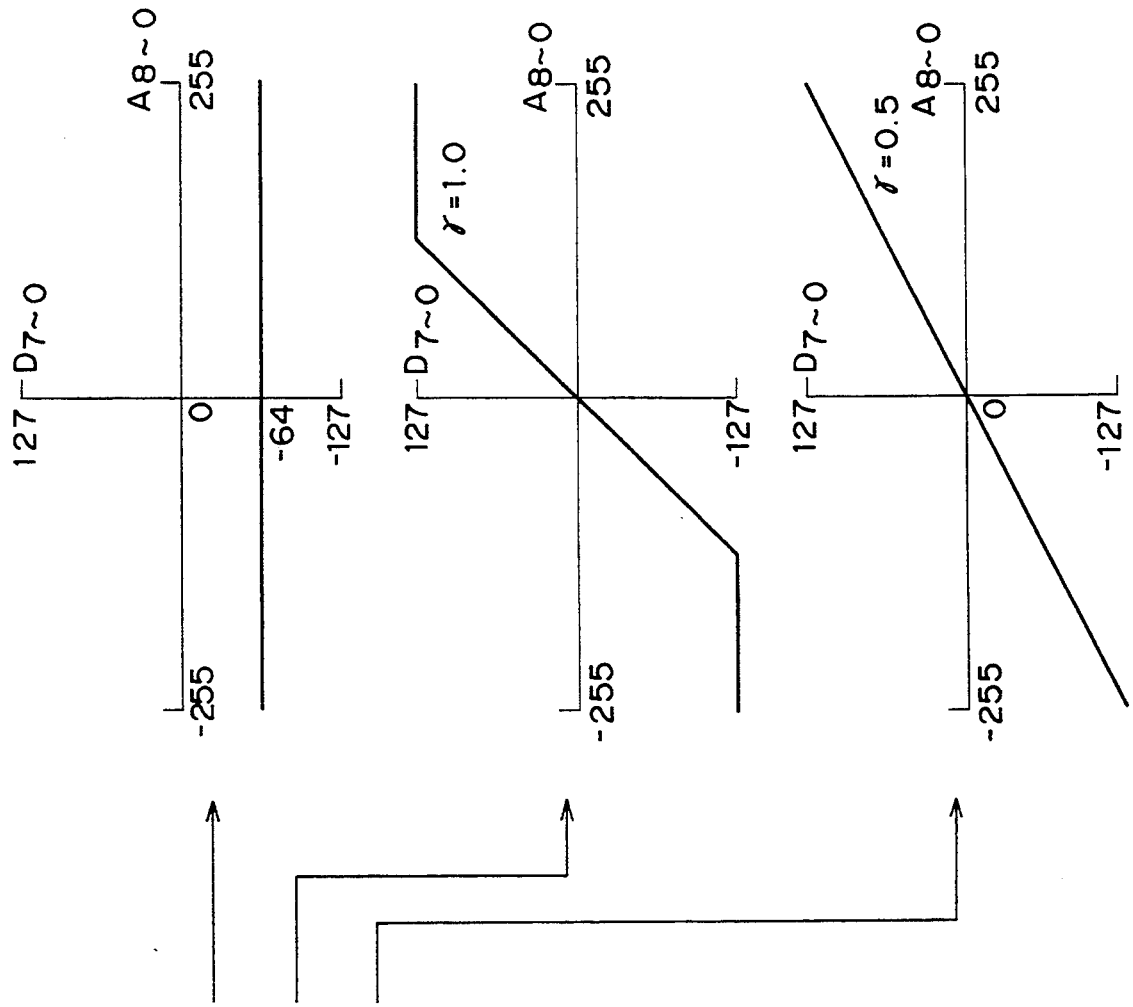
FIG. 57 is a diagram of the processing with use of a Laplacian table.

The output of the selector 612 is inputted in a Laplacian table (color blur correction table) 620 as well as the signal $\overline{\text{EDG}}$ for color blur correction table and the selection signal MODE of read mode (photograph/standard mode). Then, as shown in FIG. 57, the output D changes according to the input value. The color blur correction is performed if $\overline{\text{EDG}}$="L" and MODE="H".

The output of the Laplacian filter 620 is next multiplied by a multiplier 622 with the MTF data A for edge control generated according to the value data V in the region discrimination section 74, and then the product is sent to an adder 608. As shown in FIG. 32, the MTF data A is changed according to the edge amount detected by the primary differential filter.

Thus, an image data is outputted which has been subjected to the smoothing and the edge emphasis according to the edge amount detected in the edge image portion with the Laplacian filter. That is, in a flat portion of an image, the smoothing vanishes the unevenness of image, while in an edge image portion, the dullness of density change is prevented according to the edge detection amount with the Laplacian filter. Further, the correction at an edge is adjusted according to the magnitude of the edge of the value detected with the primary differential filter in the HVC conversion section 64. Examples of this automatic MTF correction will be explained in (h-7).

An edge level decision circuit 630 compares an edge detection signal RAP received from the Laplacian filter 610 with the threshold value REF to generate an image contour extraction signal RAP.

The image data and the EDG data are inputted to a selector 632, and the EDG data is selected if $\overline{\text{RAP}}$="L" and $\overline{\text{EGEN2}}$ (contour extraction signal)="L".

Figure 54:
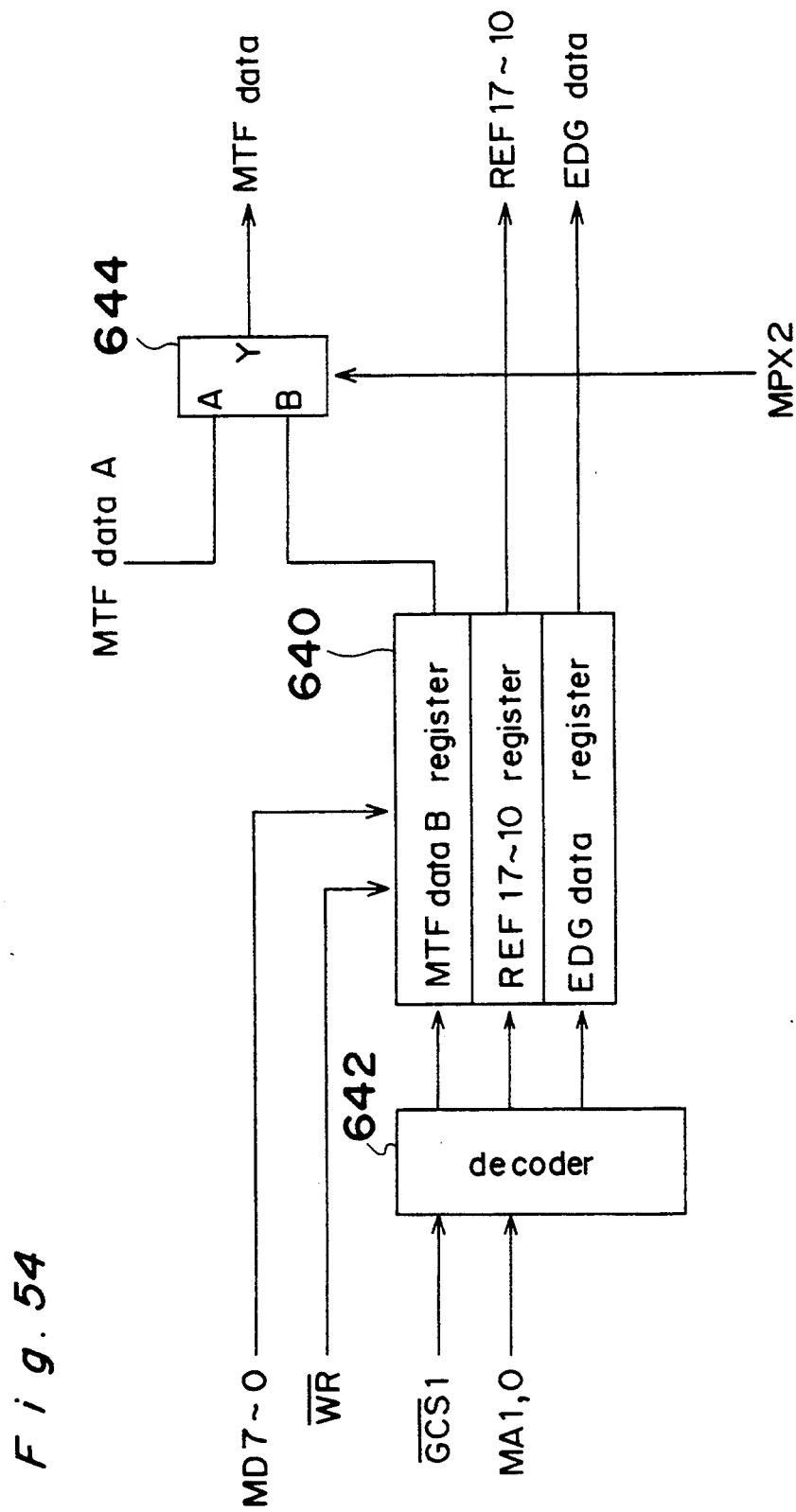
FIG. 54 is a circuit diagram of a register and the peripheral thereof.

FIG. 54 shows a register 640 which stores various control data and the peripheral thereof. The register 640 receives the data MD and the write signal $\overline{\text{WR}}$ from the CPU, the MTF data B, REF and EDG are stored according to the decoded signal by a decoder 642 from the $\overline{\text{GCS1}}$ and MA1,0 signals. The MTF data B stored in the register 640 and the MTF data A are received by a selector 644 and the selection is performed according to a MPX2 signal.

(h-2) smoothing

Figure 55:
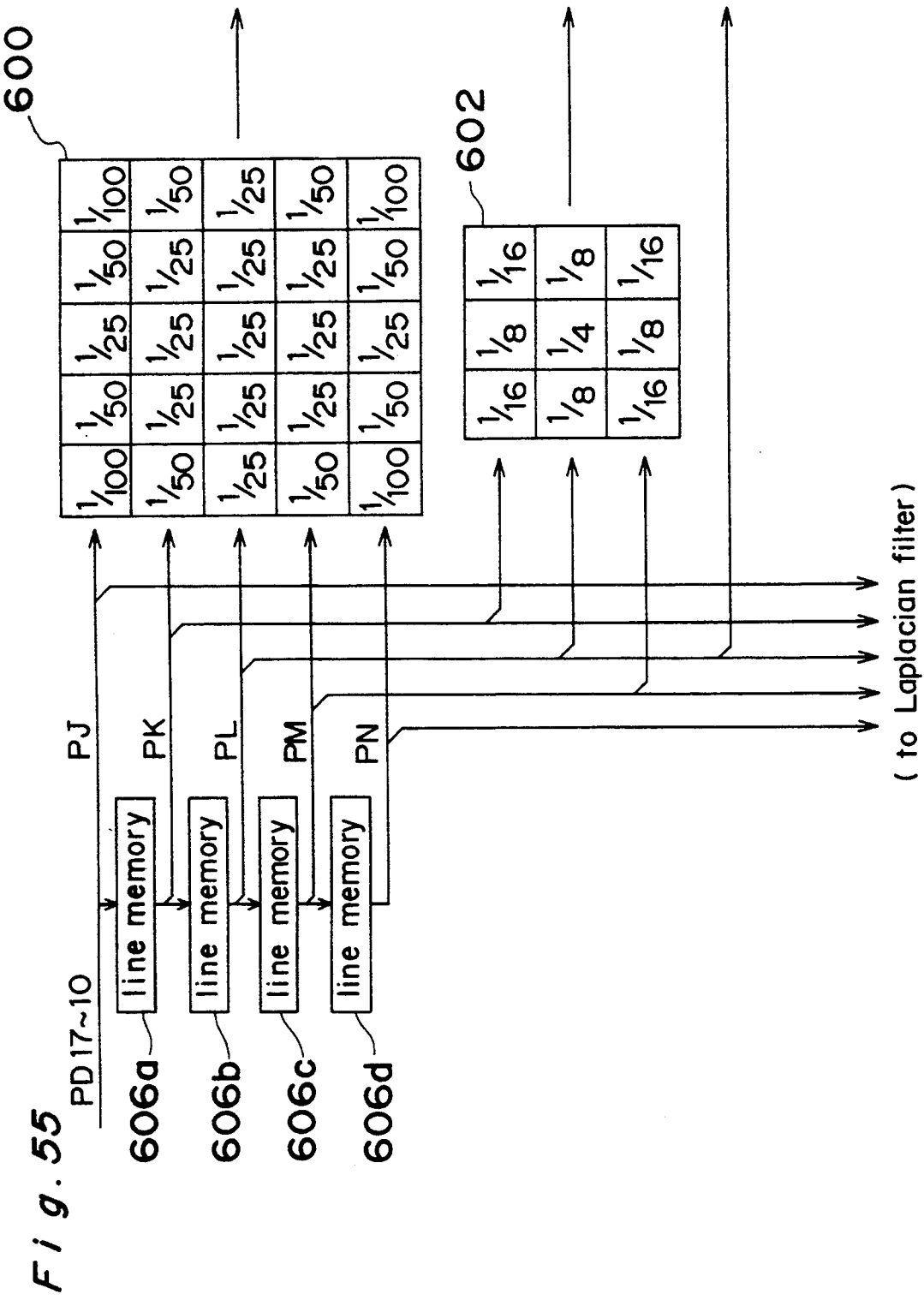
FIG. 55 is a diagram of a smoothing filter.

FIG. 55 shows the smoothing correction more concretely. As explained above, the signal PD received from the color correction section 72 is smoothed by performing the weight average of the central pixel and pixels around it with use of two kinds of two-dimensional FIR type digital filters 600 and 602. The output signals of the two filters and the signals not smoothed are received by a selector 604, and one of them is selected according to the signal SHARP$_{1,0}$. Thus, the image noises are reduced and the smoothing of image data is performed.

The data of four successive lines are stored successively in line memories 606a, 606b, 606c and 606d. Further, when the data of a fifth line is received, the calculation of the first smoothing filter 600 is conducted on the data of the (5×5) pixels, while the calculation of the second smoothing filter 602 is conducted on the data of the (3×3) pixels. In the calculations, the numerals displayed in the filters 600, 602 are multiplied with the input data, and the results are summed. Then, as to the pixel at the center of the 5×5 pixels, the smoothed value is obtained. Table 12 shows the selection of the selector 604 according to the selection signal SHARP$_{1,0}$.

TABLE 12

| SHARP$_{1,0}$ | output of selector 604 |
|---|---|
| 0 | 5 × 5 smoothing |
| 1 | 3 × 3 smoothing |
| 2,3 | none |

(h-3) edge emphasis

The signal PD from the color correction section 72 is also inputted to the Laplacian filter 610 which acts to extract an edge component of an input image. As will be explained later, the sharpening (edge emphasis) of image is performed by adding the result of the processing of the filter with the input image.

Figure 56:
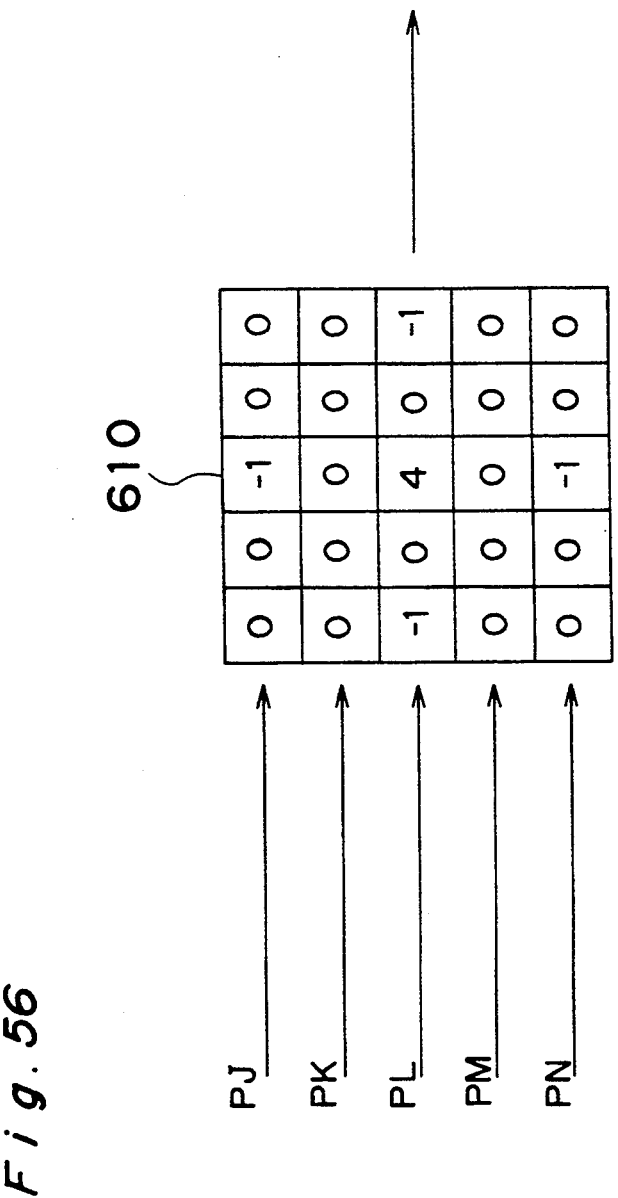
FIG. 56 is a diagram of a Laplacian filter.

FIG. 56 shows the Laplacian filter 610. The filter is a 5×5 filter, and in the calculation, the numerals displayed in the filter 610 is multiplied with the corresponding data and the products are summed.

The output of the Laplacian filter 610 is forced to be cleared by selecting "00" of the SHARP signal in a selector 612 (FIG. 53) if the edge emphasis is not needed.

(h-4) edge emphasis and sharpness mode

As shown in FIG. 57, the output of the selector 612 is inputted to the Laplacian table 620 as well as the $\overline{\text{EEG}}$ signal for color blur correction and the selection signal MODE for read mode (photograph/standard), and the filter output D is changed according to the input.

As shown in FIG. 57, in the photograph mode (MODE="L"), the output D is proportional to the input A. On the other hand, in the standard mode (MODE="H"), the output D is always −64 if $\overline{\text{EDG}}$="L" (black edge emphasis) while the ordinary edge emphasis of the output D is performed if $\overline{\text{EDG}}$="H" or the output D is constant at large and small values of the input A.

Figure 58:
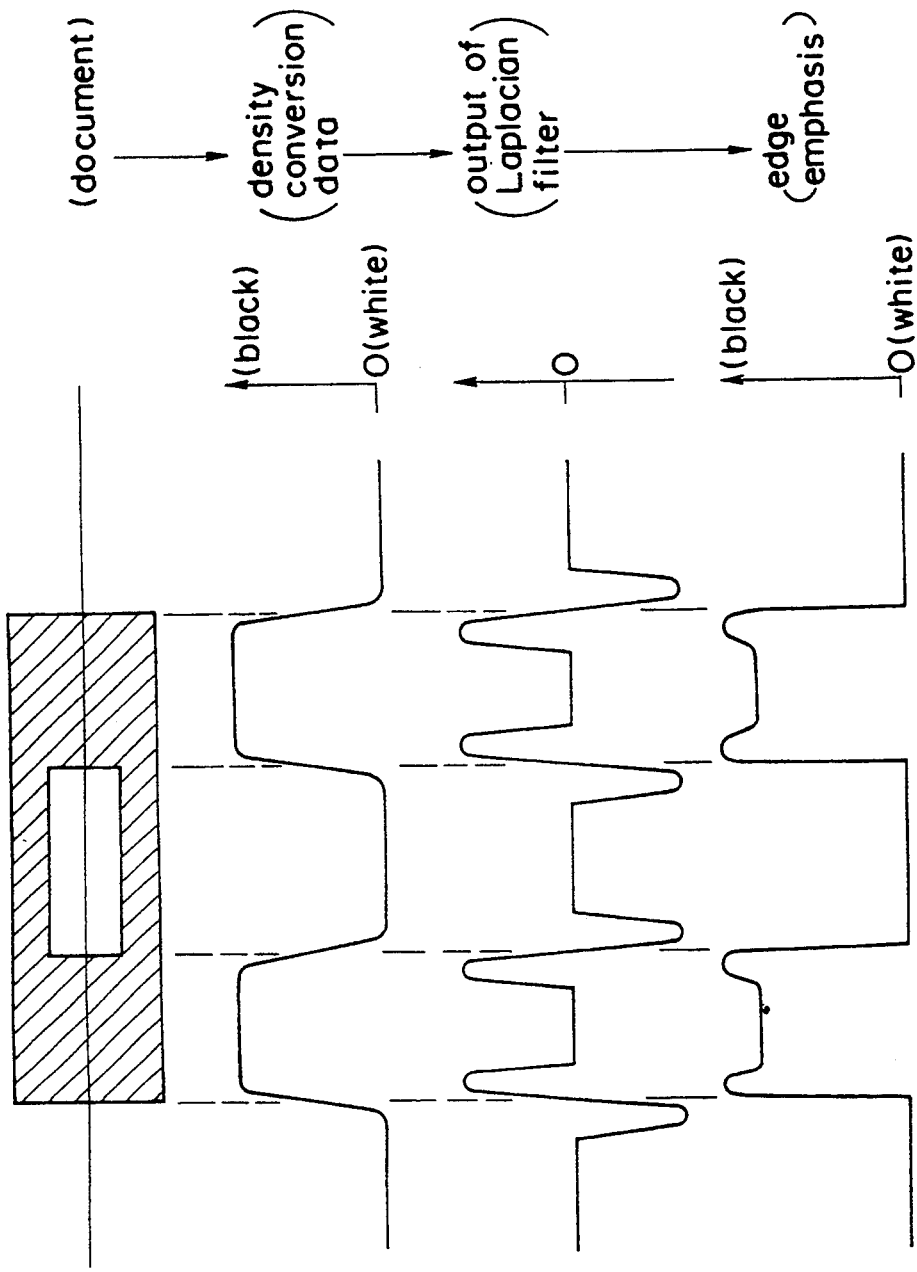
FIG. 58 is a diagram of edge emphasis with use of a Laplacian filter.

The output D of the Laplacian table 620 (FIG. 53) is further multiplied in the multiplier 622 with the MTF data for the edge control generated from the value data V in the region discrimination section 74, and the product as well as the smoothing data of the original image from the selector 604 is inputted to the adder 608. Then, the smoothing data and the edge amount are added and an image data processed for the edge emphasis can be outputted. FIG. 58 shows the density conversion data of an image shown at the top portion of FIG. 58 and the result of the processing of the data with use of the Laplacian filter 610. The addition of the two values by the adder 608 causes the value at the edge portion larger than the real value or the edge can be emphasized.

As displayed in Table 13, the SHARP$_{5,0}$ controls the bank of the MTF control table in the region discrimination section 74, the selection of the smoothing filters 602 and 604 in the MTF correction section 78 and the ON/OFF of the output of the Laplacian filter 610 to respond to the sharpness mode SHARP designated externally.

TABLE 13

| sharpness mode | SHARP 5 | 4 | 3 | 2 | 1 | 0 | smoothing processing | multiplier for $V_{E7-0}$ | MTF data |
|---|---|---|---|---|---|---|---|---|---|
| weak | — | — | — | 0 | 0 | 0 | 5 × 5 smoothing | ×0 | MTF data A |
| ↑ | 0 | 0 | 0 | 1 | 0 | 0 | | ×0.25 | (MPX2 = "L") |
| | 0 | 0 | 1 | 1 | 0 | 0 | | ×0.5 | |
| | 0 | 1 | 0 | 1 | 0 | 1 | 3 × 3 smoothing | ×0.75 | |
| standard | 0 | 1 | 1 | 1 | 0 | 1 | | | |
| ↓ | 1 | 0 | 0 | 1 | 0 | 1 | | ×1 | |
| | 1 | 0 | 1 | 1 | 1 | — | none | | |
| | 1 | 1 | 0 | 1 | 1 | — | | ×1.25 | |
| strong | 1 | 1 | 1 | 1 | 1 | — | | ×1.5 | |
| map mode | — | — | — | 1 | 1 | — | | — | MTF data B (MPX2 = "H") |

(h-5) color blur correction

The color blur correction is performed by vanishing the data C, M, Y of chromatic reproduction colors in a black edge portion of an original image according to the achromatic edge decision signal $\overline{EDG}$ generated in the region discrimination section 74. As explained above, the $\overline{EDG}$ signal and the read mode signal MODE (photograph/standard) are inputted to the Laplacian table (color blur correction table) 620.

The color blur correction is performed if $\overline{EDG}$ = "L" (achromatic color edge portion) and MODE = "H" (standard mode). The output D is set to be −64 irrespective of the input value A. Then, the product with the MTF data obtained in the following multiplier 622 is forced to be negative. Therefore, if $PD_{17-10}$ is C, M, Y data ($\overline{CMY/K}$ = "L"), −64*(MTF data) is subtracted from the $PD_{17-10}$, and the C, M, Y data are vanished in the black portion to prevent color blur.

Figure 59:
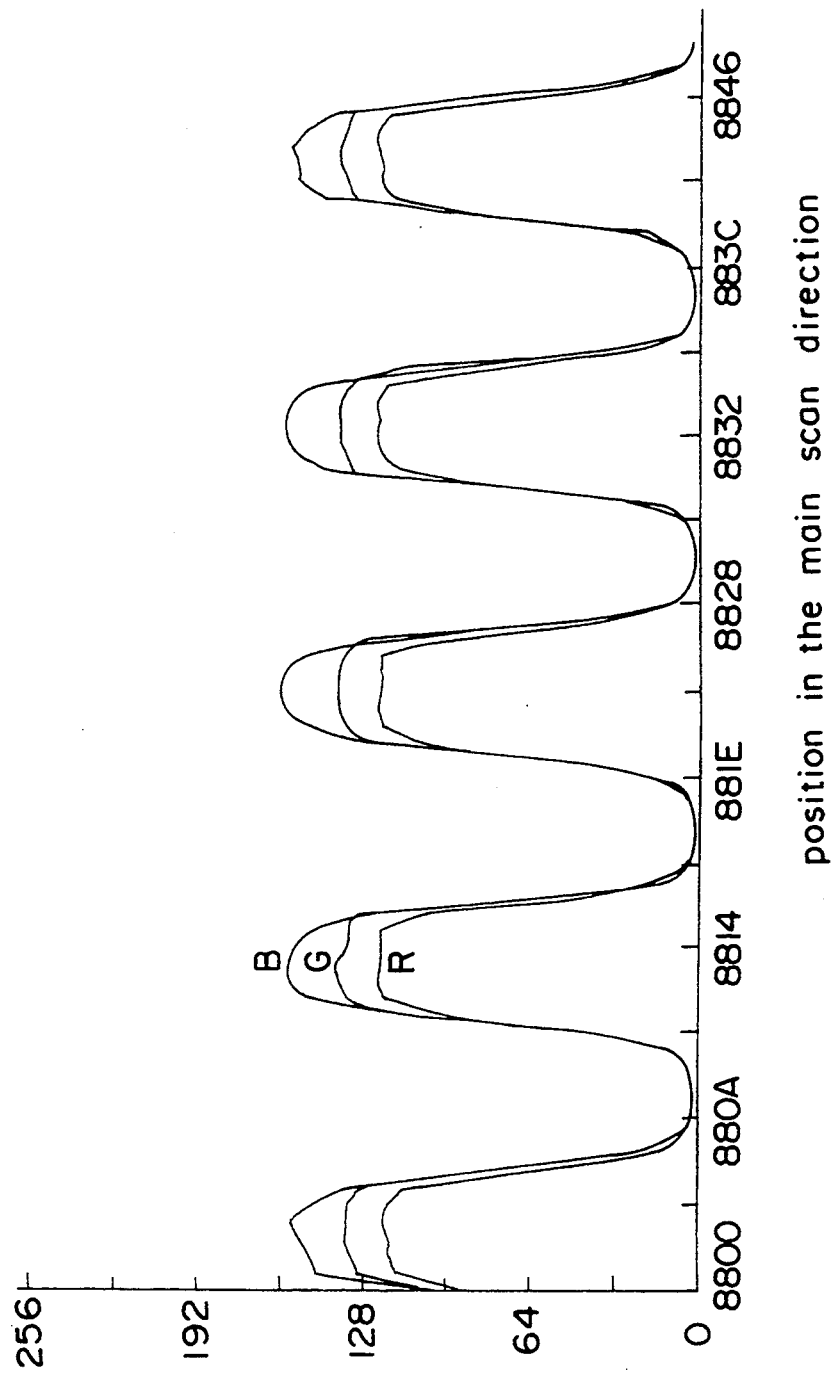
FIG. 59 is a graph of read data of R, G and B.
Figure 60:
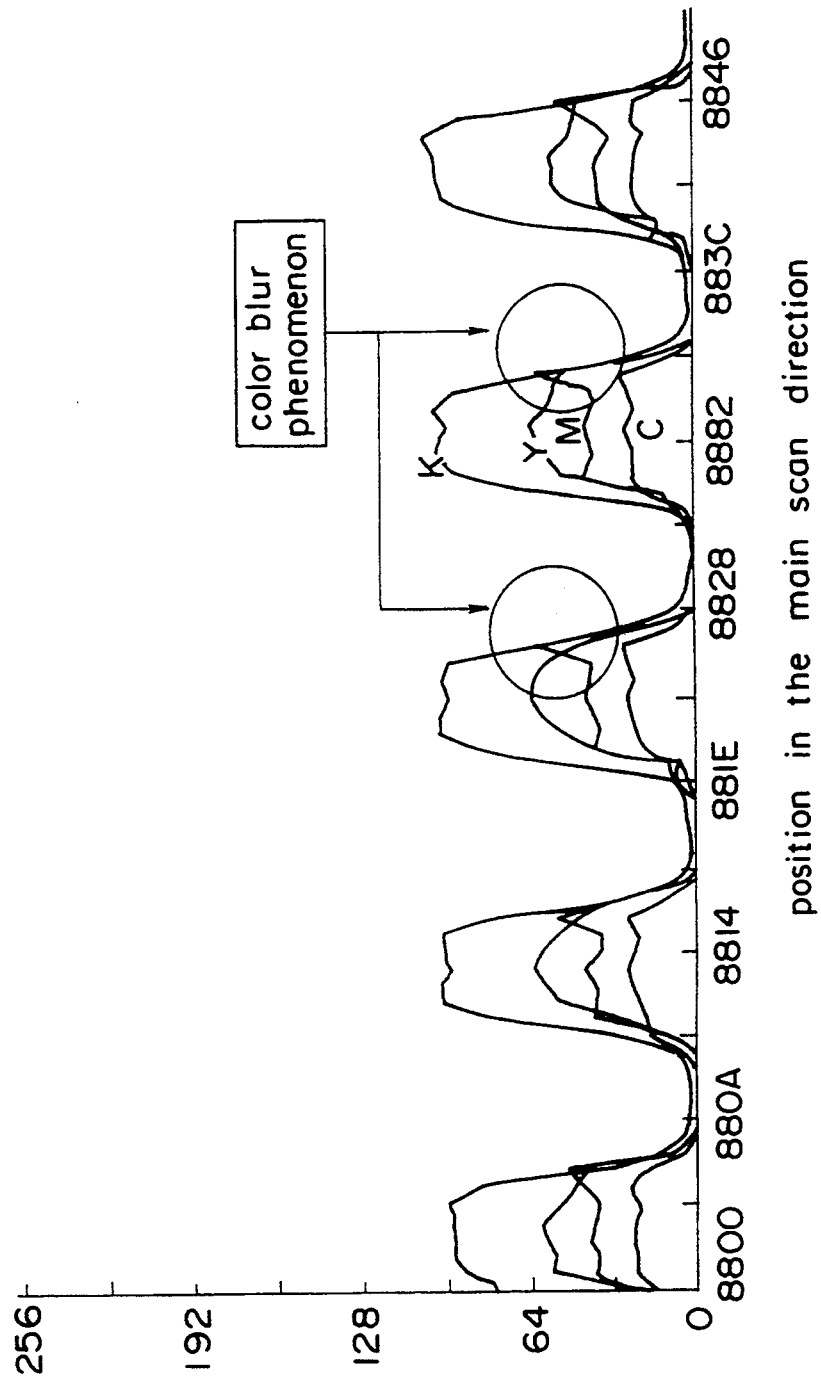
FIG. 60 is a graph of the result of automatic UCR/BP processing of the data of FIG. 59.
Figure 61:
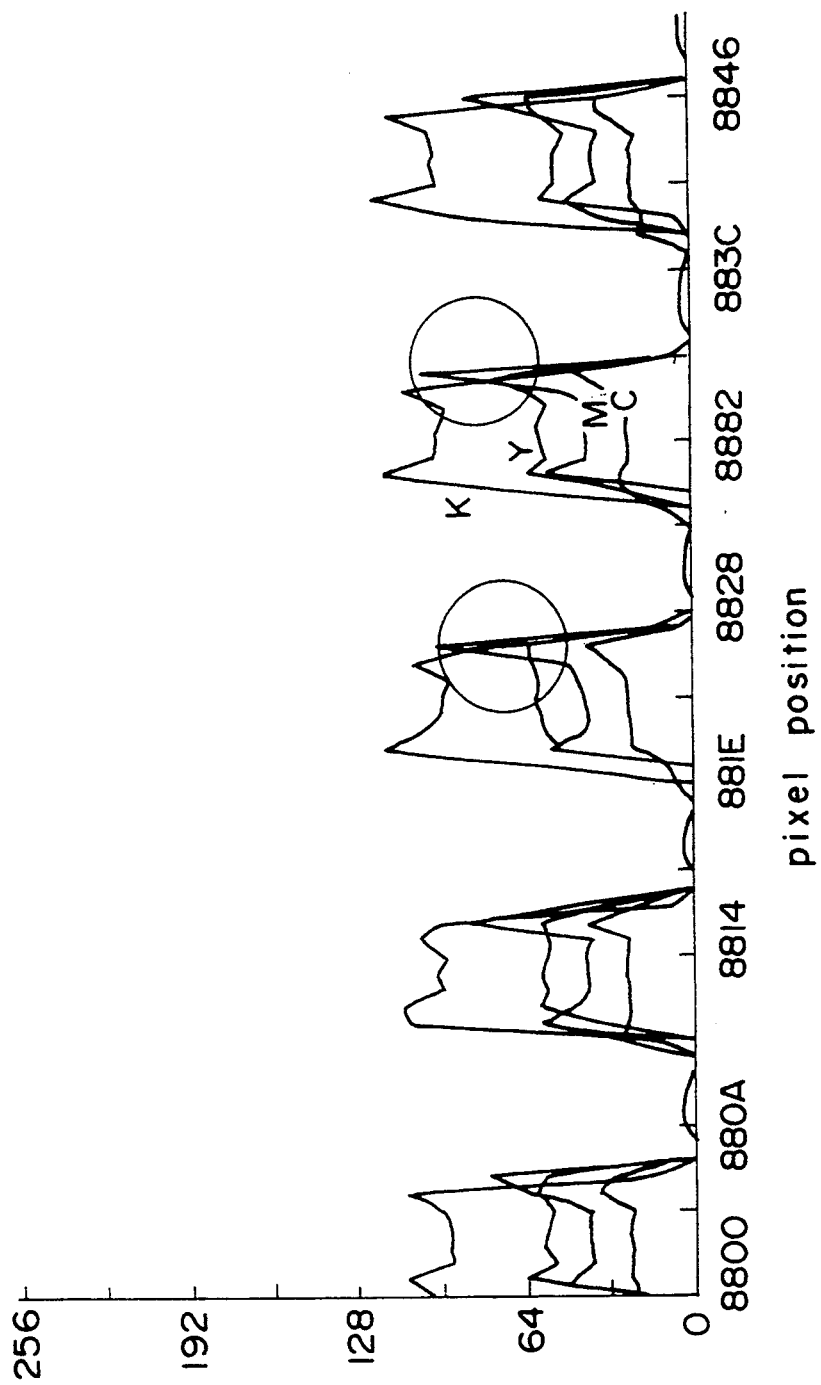
FIG. 61 is a graph of the result of automatic MTF processing of the data of FIG. 59.
Figure 62:
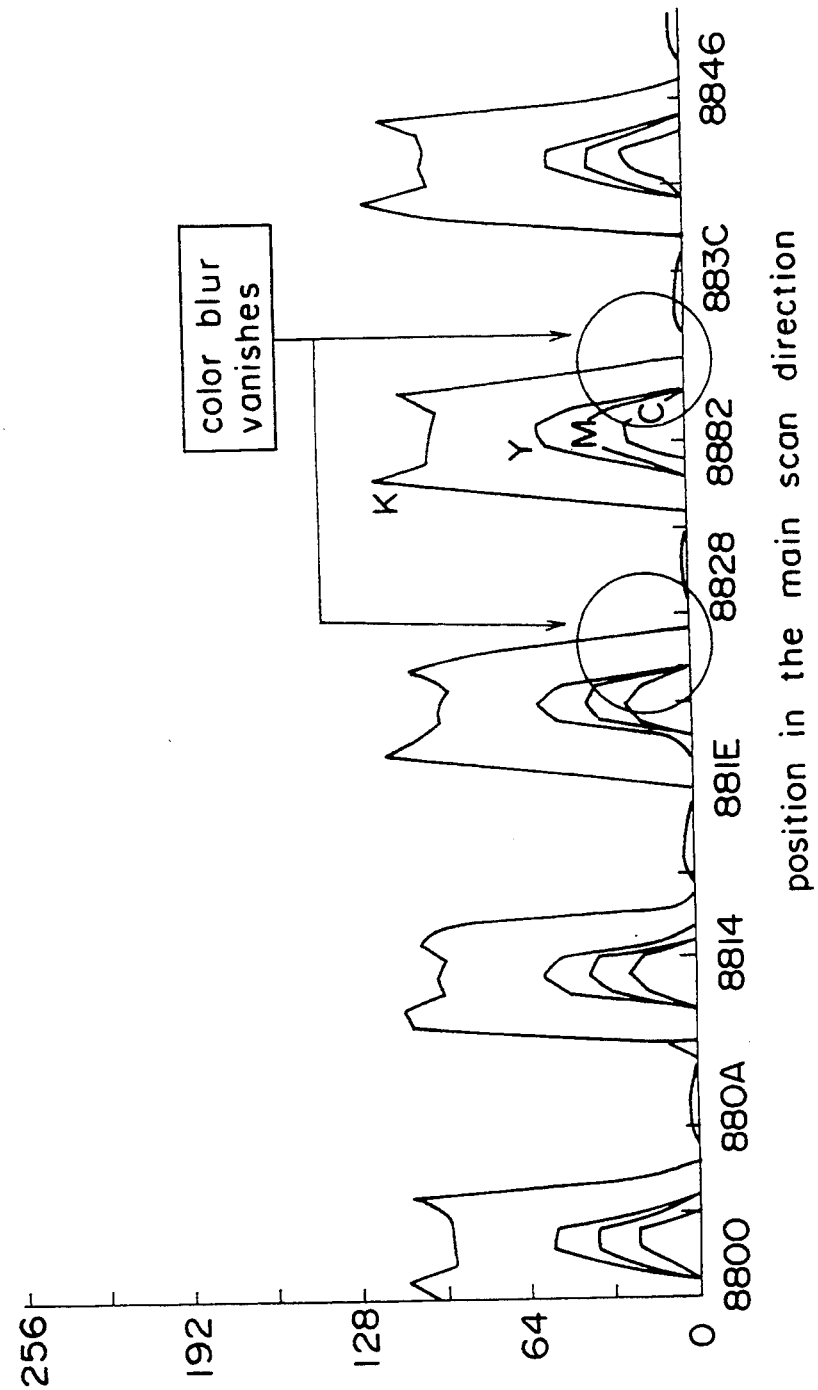
FIG. 62 is a graph of the result of color blur correction of the data of FIG. 59.

Next, examples of the color blur correction is explained. If the above-mentioned automatic UCR/BP processing is performed on the read density data of G, B, R shown in FIG. 59 in the color correction section 72, the output results shown in FIG. 60 can be obtained. (In FIG. 60, the UCR/BP ratios are set to be about 80%.) The abscissa designates the pixel number. Color blur phenomena arise in the edge portions designated by open circles shown in FIG. 60. That is, at the edge portion of K, the data C, M and Y also have edge portions. Therefore, chromatic colors overlay besides black, so that colors bleed and the edge cannot be reproduced clearly. As shown in FIG. 61, if the edge emphasis is performed in the MTF correction in the MTF correction section 78 without the color blur correction, the color blue is exaggerated further (refer the portions designated by circles). On the other hand, as shown in FIG. 62, if the color blur correction is performed in the achromatic edge portion in the standard mode according to the $\overline{EDG}$ and MODE signals, the outputs of C, M, Y at the black edge portions vanish, and the color blur is solved as shown in the portiones designated by circles.

(h-6) contour extraction mode

The edge detection signal RAP sent from the Laplacian filter 610 (FIG. 53) is compared with the threshold value REF in the edge level decision circuit 630 to generate the contour extraction signal $\overline{RAP}$. That is, the edge detection signal RAP is first converted to the absolute value if negative and to "00" if positive. Next, the resultant value is compared with the threshold value REF to convert to a bi-level signal, and if the value is larger than the threshold value, $\overline{RAP}$ = "L" is sent to the selector 632 (refer FIG. 63). The selector 632 receives the image data and EDG data, and if $\overline{RAP}$ = "L" and $\overline{EGEN2}$ (contour extraction signal) = "L", the EDG data (contour data) is selected.

Figure 63:
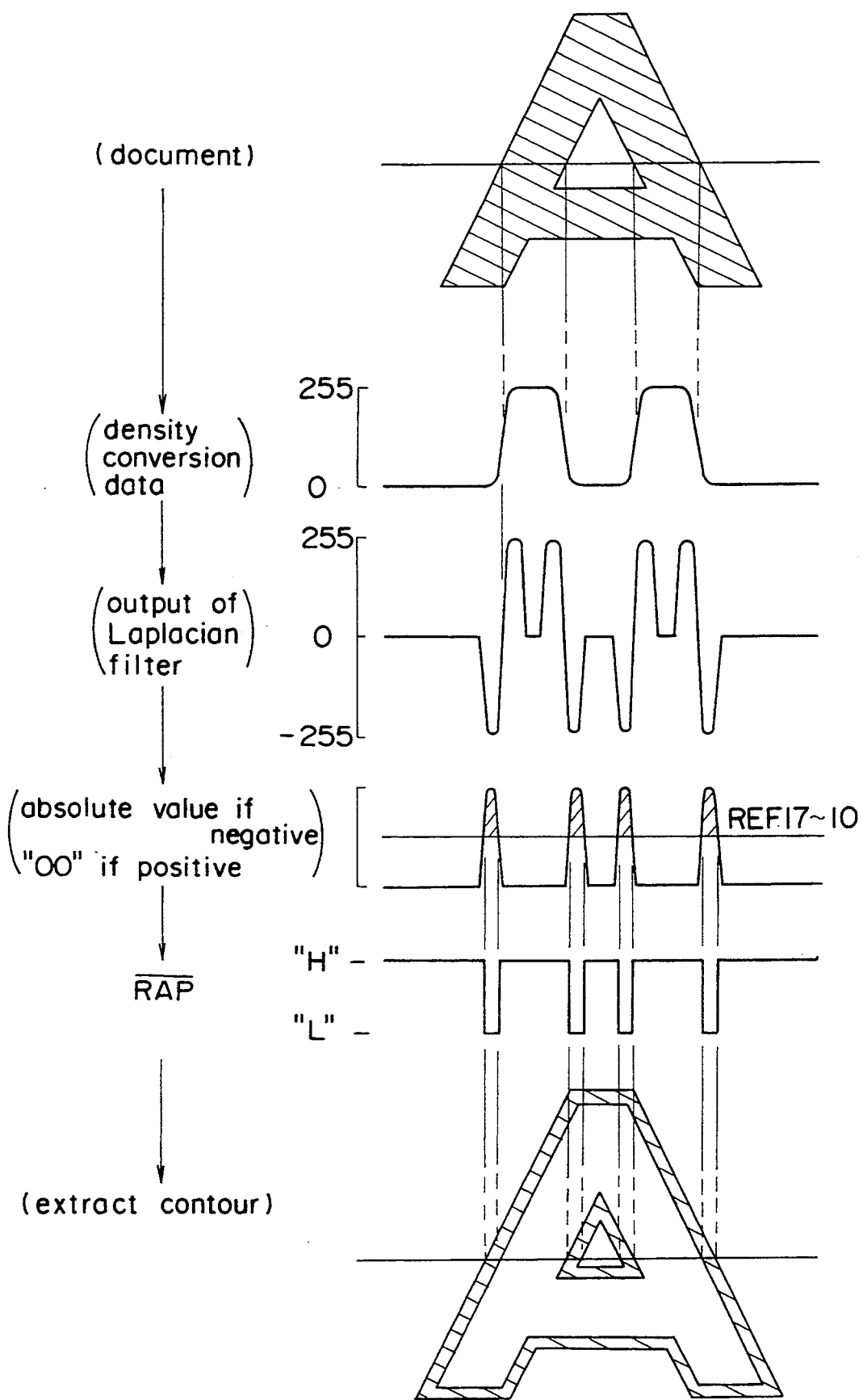
FIG. 63 is a diagram of contour extraction in contour extraction mode.

FIG. 63 shows an example of the contour extraction. As to the density conversion data of a document image of a large character "A" shown at the top of FIG. 63, the second derivative is calculated, and if the second derivative is negative, the second derivative data is converted to an absolute value while if positive, to "00". The $\overline{RAP}$ signal is generated only for the converted value larger than the threshold value REF, and this shows the contour portion.

The $REF_{17-10}$ (binarization level for contour extraction), the EDG data (contour data) and the MTF data B (edge emphasis data) are set in the address map of the CPU, as shown in Table 14. The data are set at the rising edge of the $\overline{WR}$ signal when $\overline{GCS1}$ = "L".

TABLE 14

| MA 1.0 | content of register |
|---|---|
| 0 | set MTF data B in $MD_{7-0}$ |
| 1 | set REF $_{17-10}$ in $MD_{7-0}$ |
| 2 | set EDG data in $MD_{7-0}$ |
| 3 | — |

Further, as shown in Table 15, two MTF data are divided: If MPX2 = "L", the MTF data is selected to be the MTF data A of the region discrimination section 74 used for the automatic control of edge emphasis (photograph/standard mode), while the MTF data is selected to be the MTF data B used for the manual control according to the set value (MTF data B) in the register (map mode).

TABLE 15

| MPX2 | MTF data (output of selector 644) |
|---|---|
| "L" | MTF data A (output of MTF control table in region discriminator) |
| "H" | MTF data B (value to be set in register) |

Further, Table 16 shows the bit definition of the MTF data B.

TABLE 16

| bit | 9 | 8 | 7 | 6 | 5 | 4 | 3 | 2 | 1 | 0 |
|---|---|---|---|---|---|---|---|---|---|---|
| digit | SIN | 2 | 1 | 1/2 | 1/4 | 1/8 | 1/16 | 1/32 | 1/64 | 1/128 |

In the map mode, the priority is given to the reproducibility of narrow line, the parameters are set so that MTF data B = "80" (1), MODE = "H" (standard mode) and $\overline{BKEN}$ = "H" (without color blue correction).

(h-7) examples of automatic MTF correction

Figure 64:
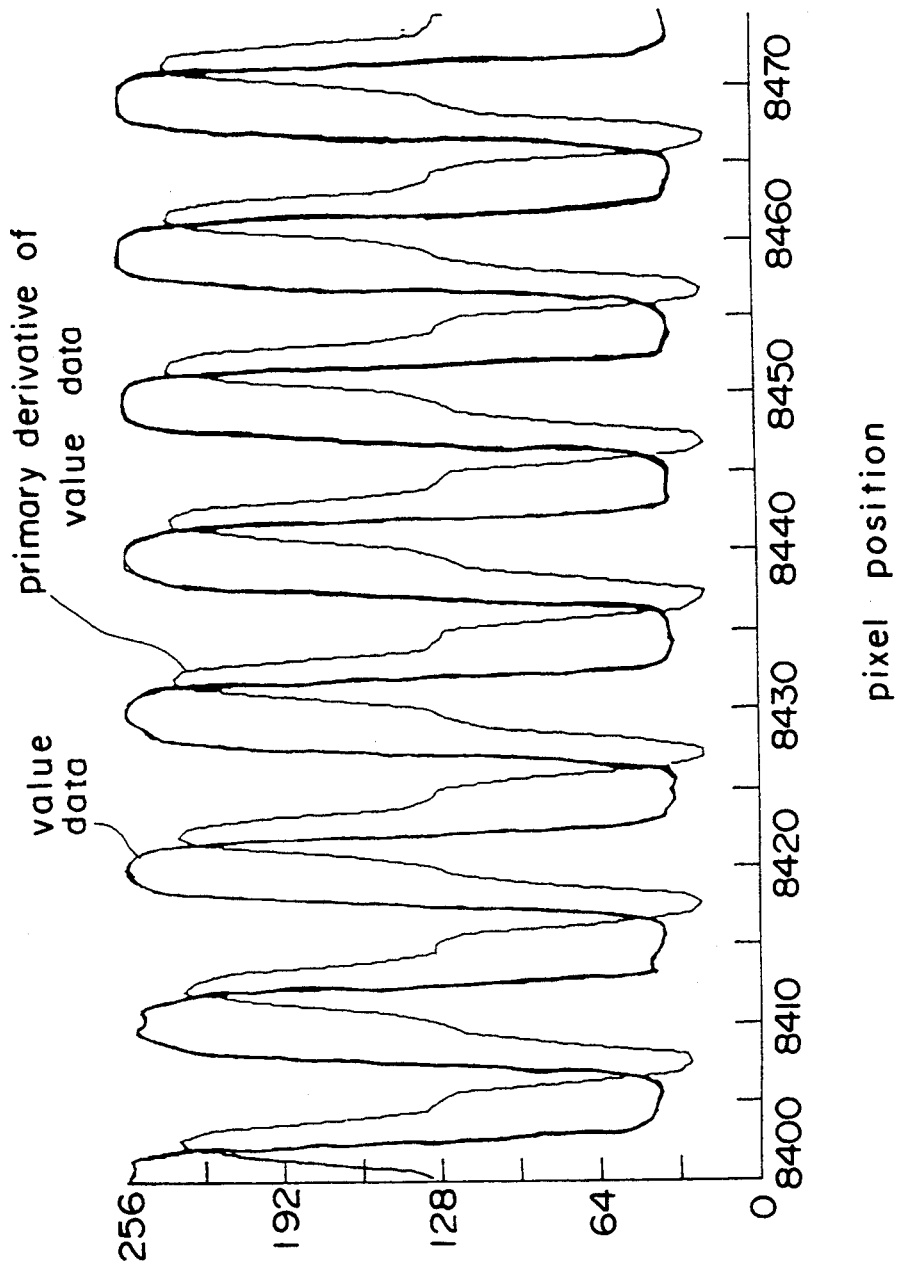
FIG. 64 is a graph of value data and its primary derivative of a document of 1 line pair/mm.
Figure 65:
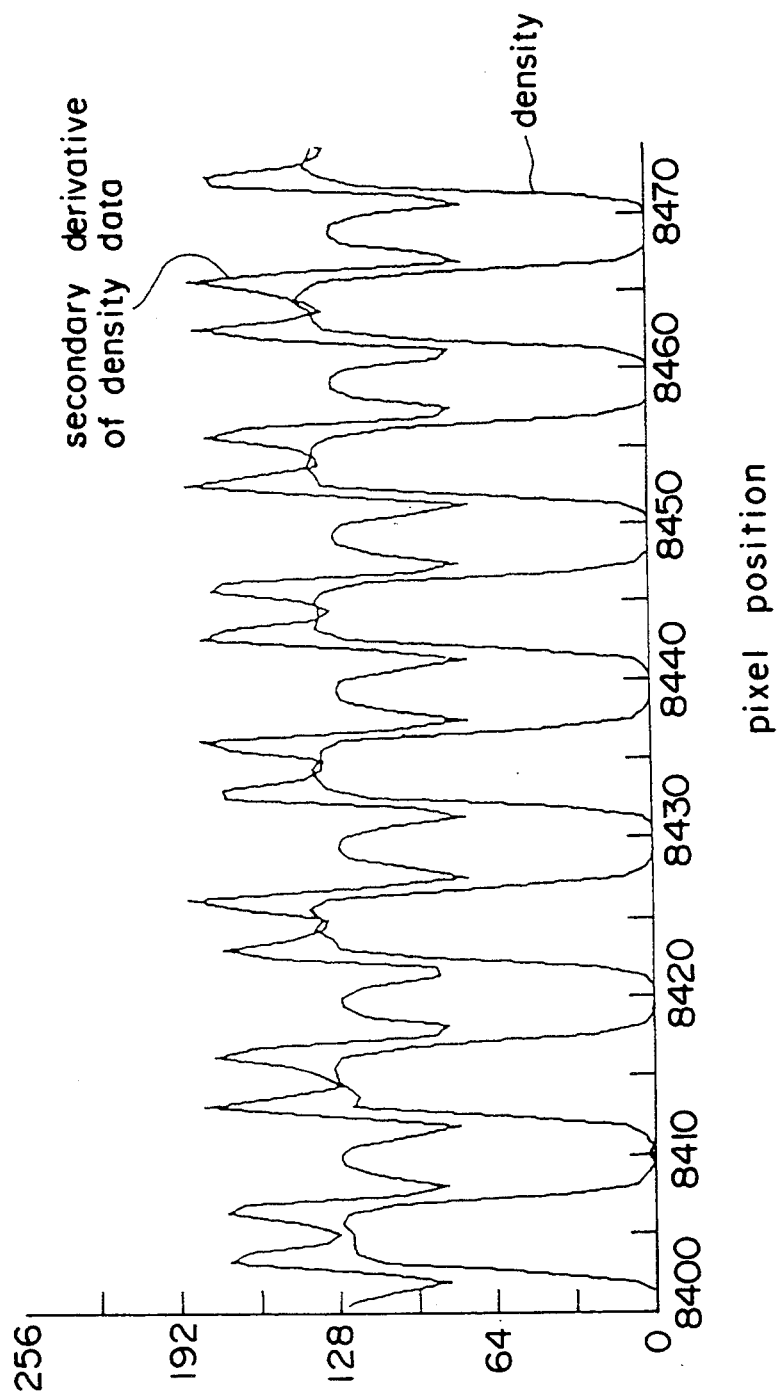
FIG. 65 is a graph of density data and its primary derivative of the data of FIG. 64.
Figure 66:
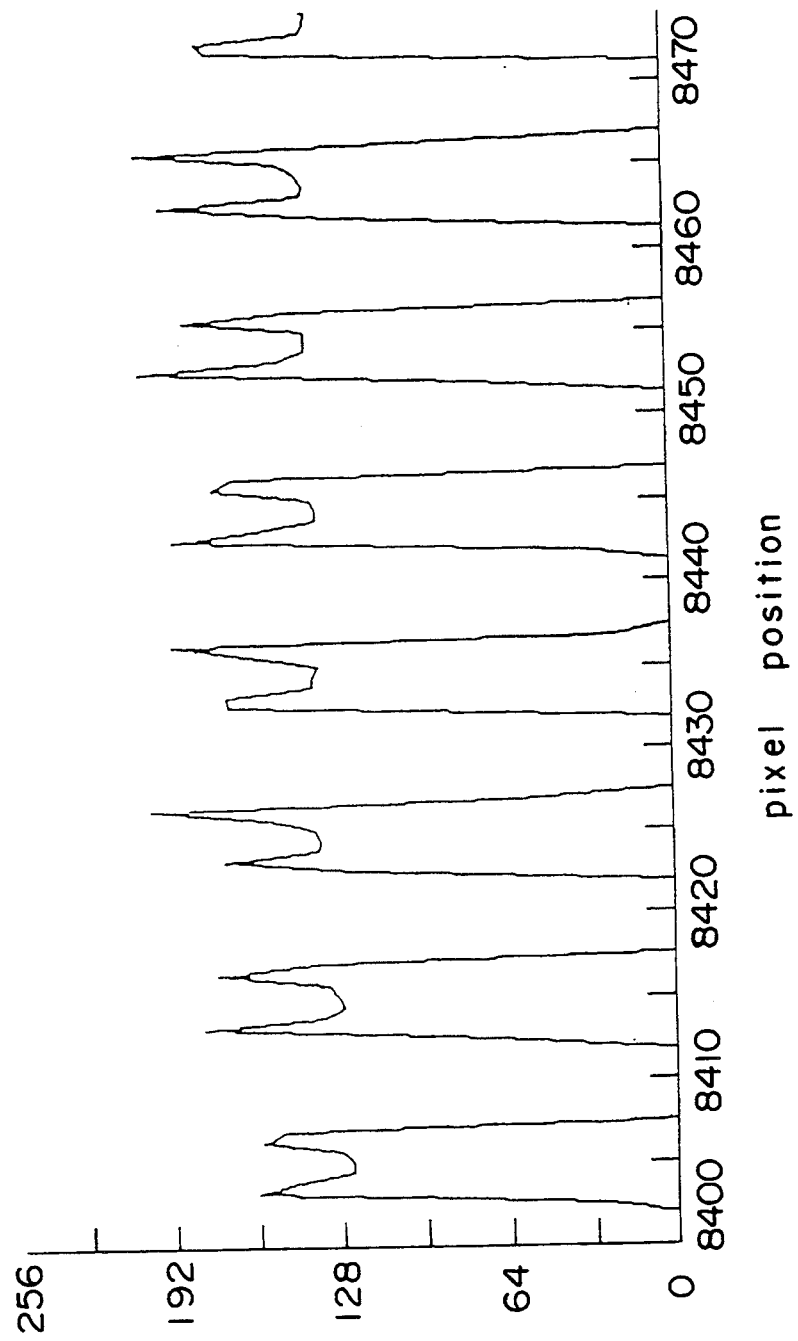
FIG. 66 is a graph of the result of the automatic MTF correction of the data of FIG. 64.

FIGS. 64–66 shows an example of the automatic MTF correction of a document of 1 line/mm. FIG. 64 shows the value data and its primary derivative, wherein the abscissa represents the pixel position. It is found that the value changes according to each line. FIG. 64 shows the density data and its secondary derivative.

FIG. 66 shows the result of the automatic MTF correction for the density data. The processing similar to the edge emphasis is performed. It is better for an image of line pairs to have a sharper boundary. Therefore, the reproducibility of the image is improved.

Figure 67:
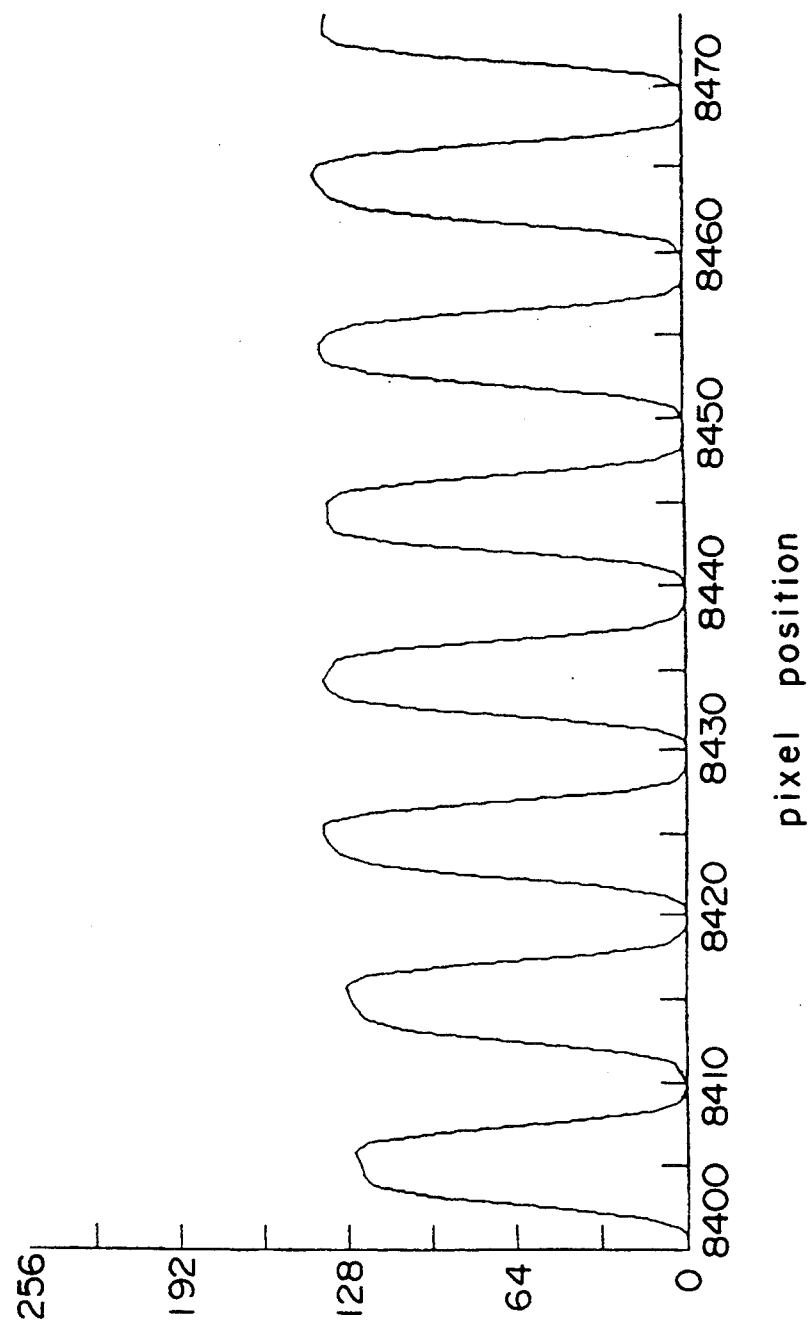
FIG. 67 is a graph of the result of smoothing (comparison example) of the data of FIG. 64.
Figure 68:
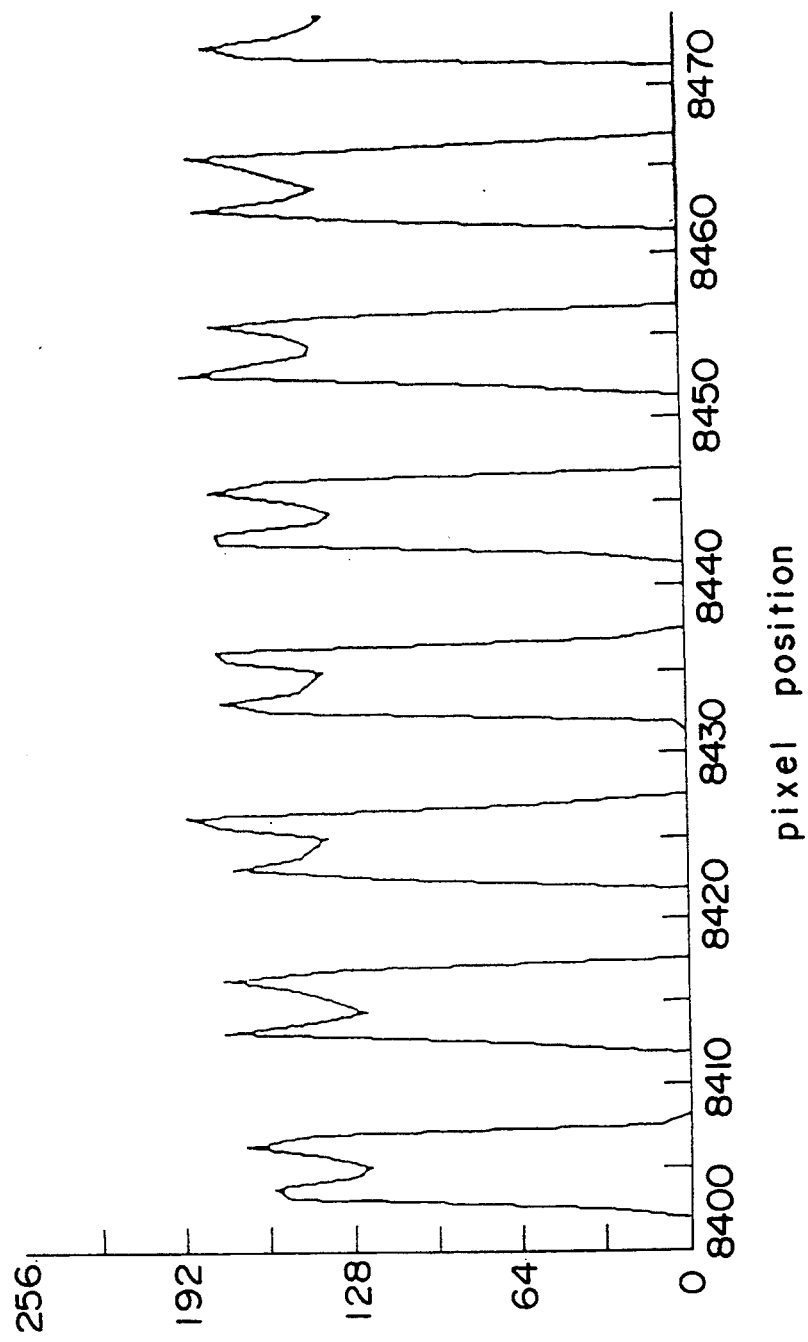
FIG. 68 is a graph of the result of edge emphasis (comparison example) of the data of FIG. 64.

For comparison, FIG. 67 shows the result of the smoothing processing. It is found that the reproducibility of line pairs is not good. FIG. 68 shows the result of the usual edge emphasis, and this shows a similar data as the present embodiment.

Figure 69:
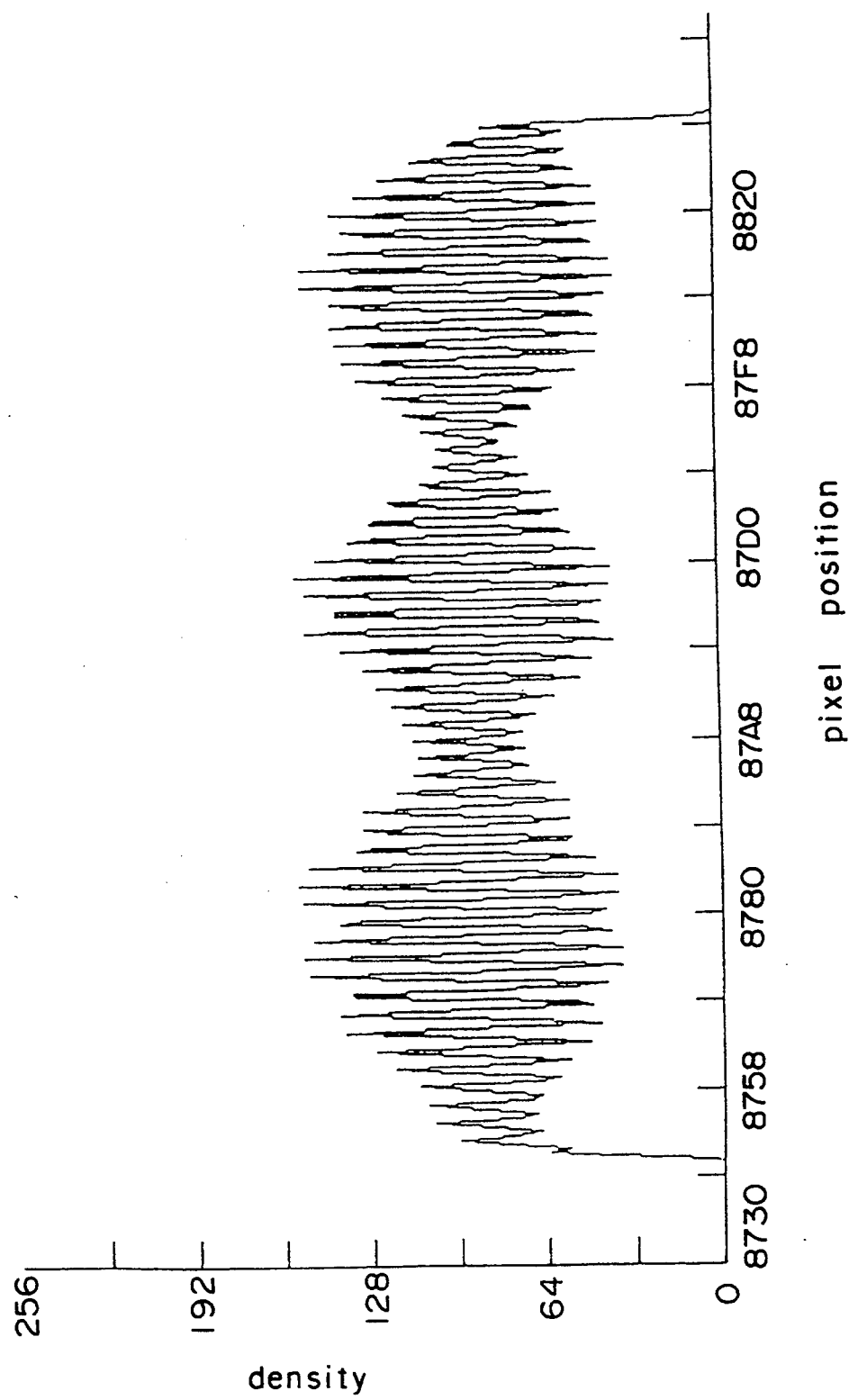
FIG. 69 is a graph of density data of a dot image.
Figure 70:
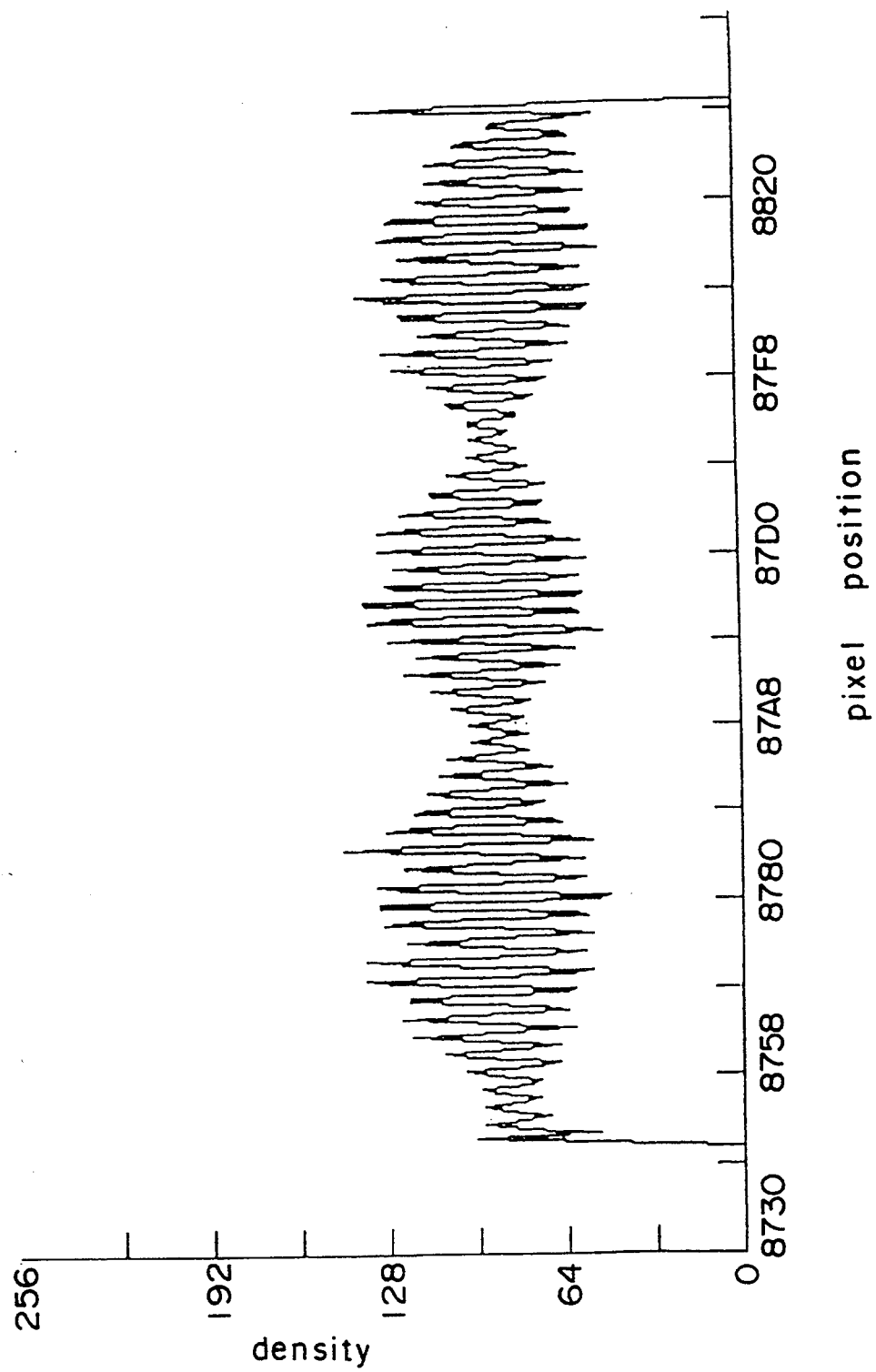
FIG. 70 is a graph of the result of the automatic MTF correction of the data of FIG. 69.

FIGS. 69 and 70 show an example of the automatic MTF correction for the density data of a dot document (screen 133 line). FIG. 69 shows the density data, wherein the abscissa designates the pixel position. The moire pattern is observed in the data.

FIG. 70 shows the result of the automatic MTF correction for the density data. It is found that the moire pattern is not emphasized.

Figure 71:
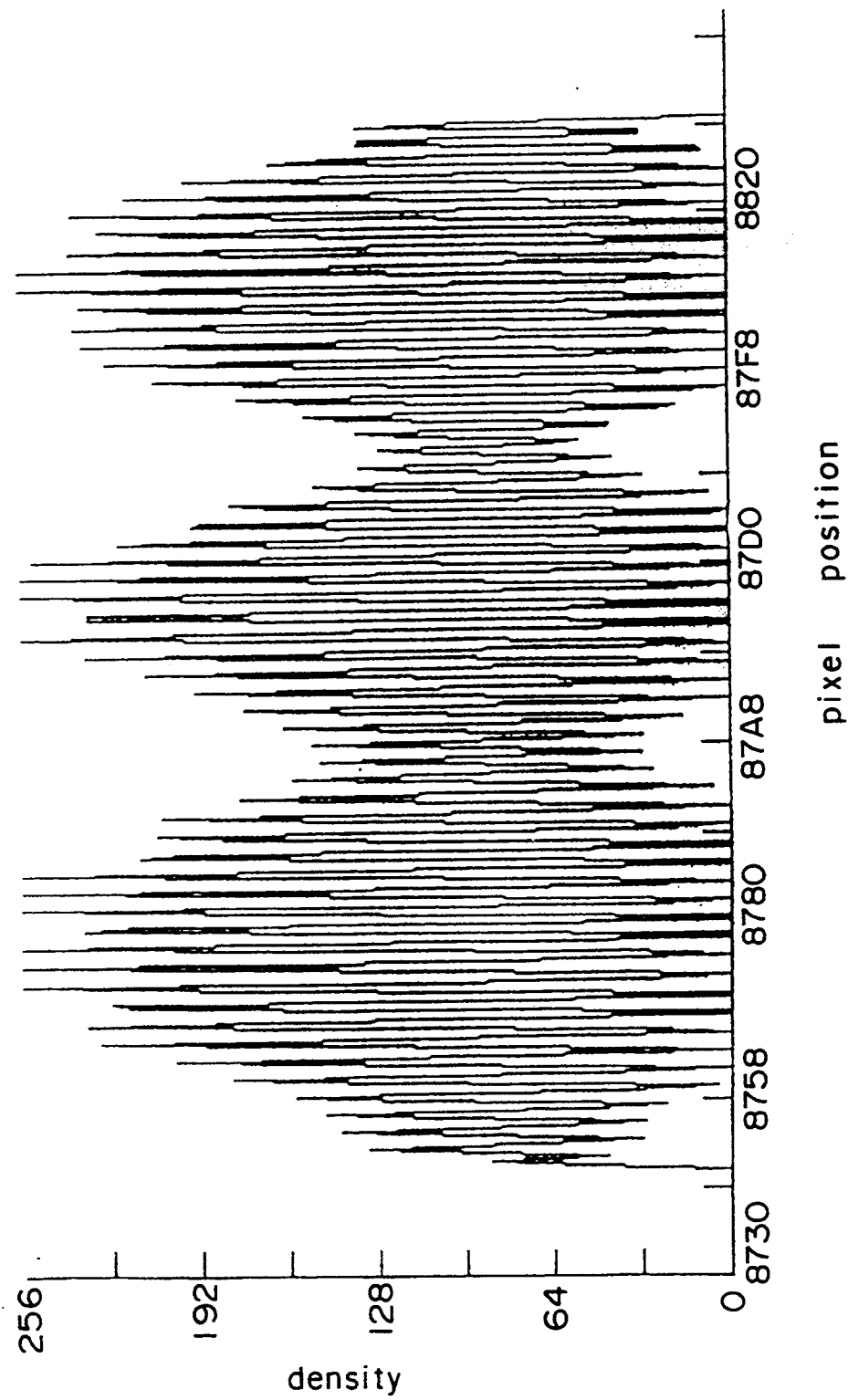
FIG. 71 is a graph of the result of edge emphasis (comparison example) of the data of FIG. 69.
Figure 72:
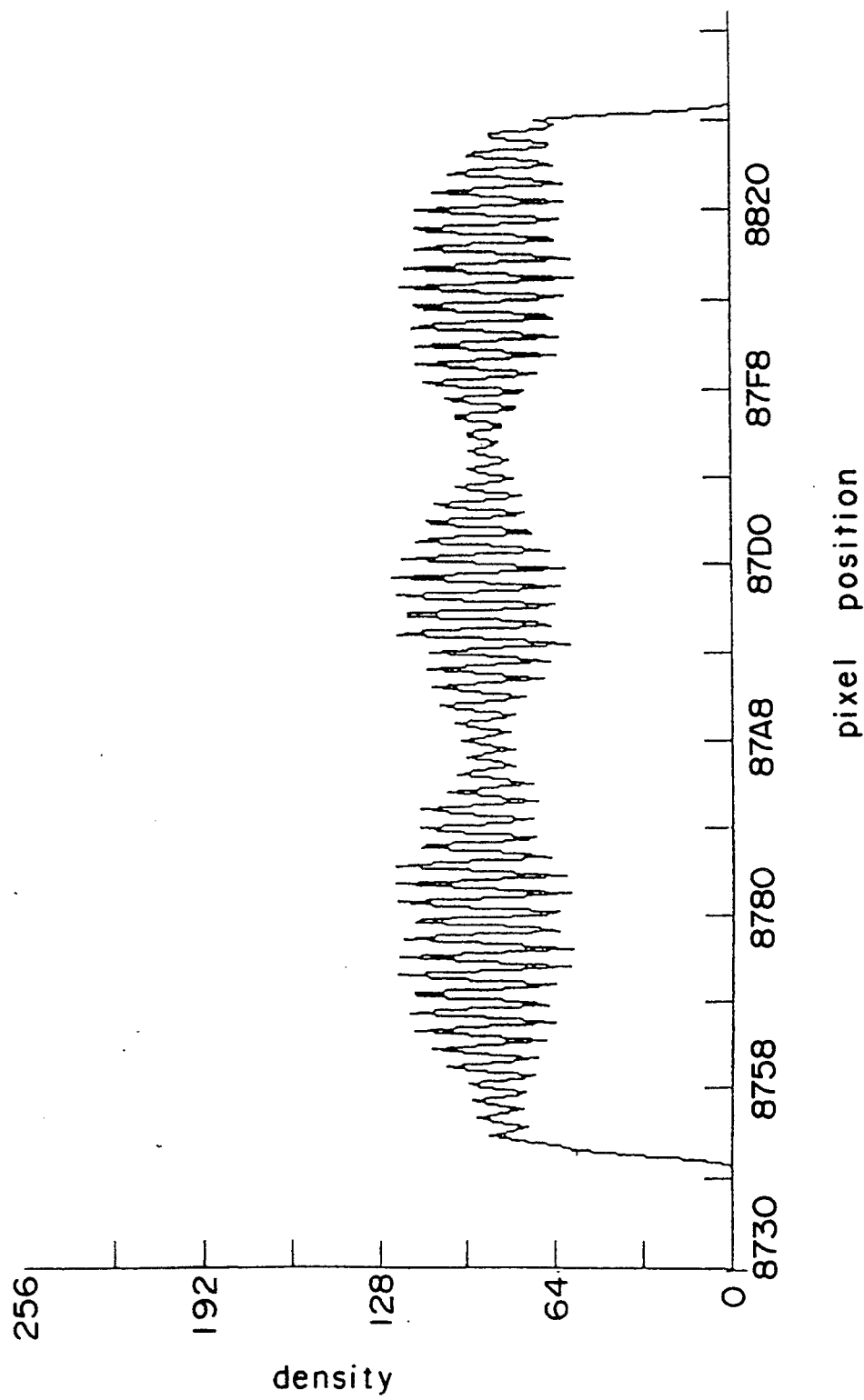
FIG. 72 is a graph of the result of smoothing (comparison example) of the data of FIG. 69.

For comparison, FIG. 71 shows the result of the edge emphasis, wherein the moire pattern is emphasized. Further, FIG. 72 shows the result of the smoothing processing. It is found that the density change becomes smaller.

Figure 73:
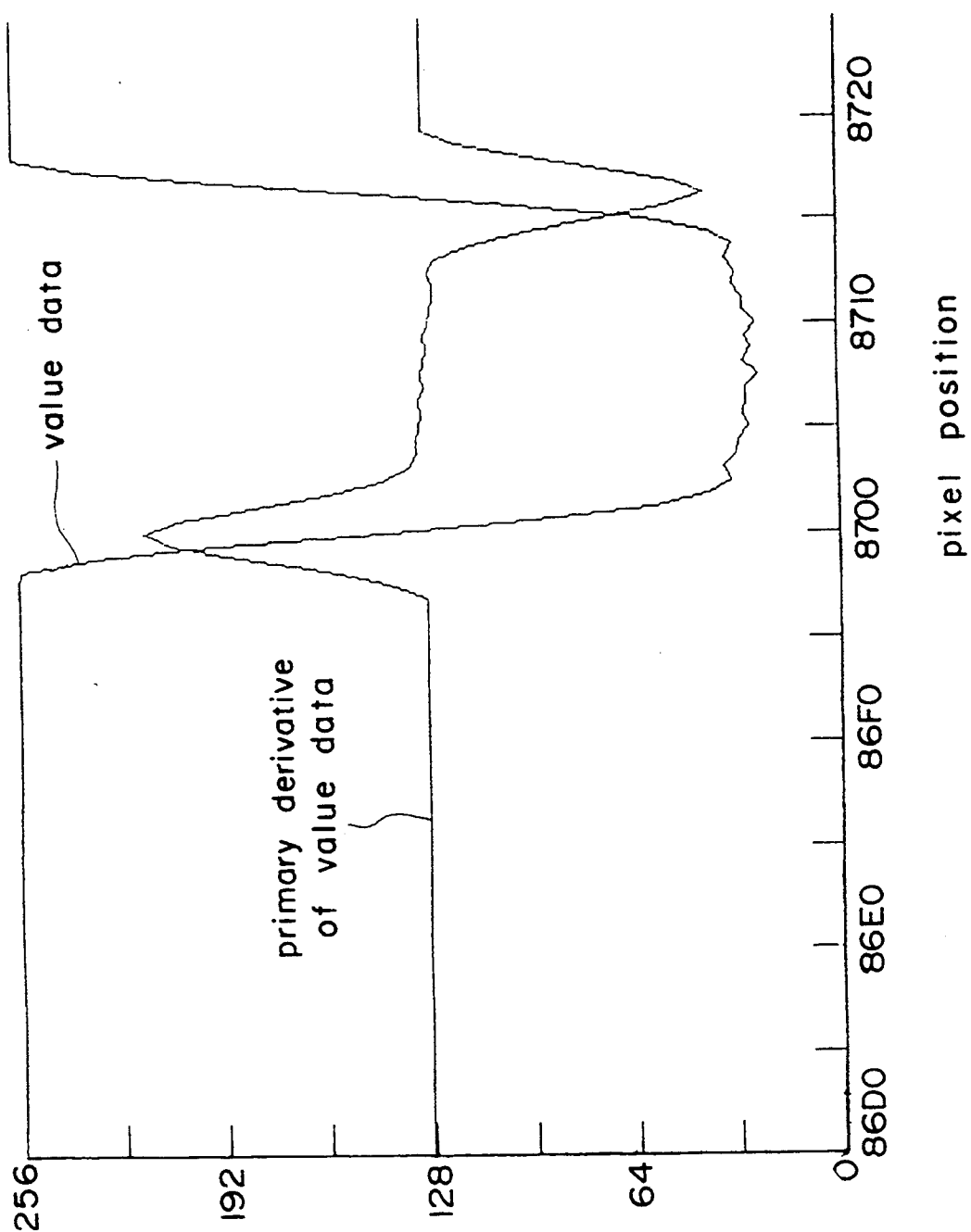
FIG. 73 is a graph of value data and its primary derivative of a document of black lines of 1 mm width.
Figure 74:
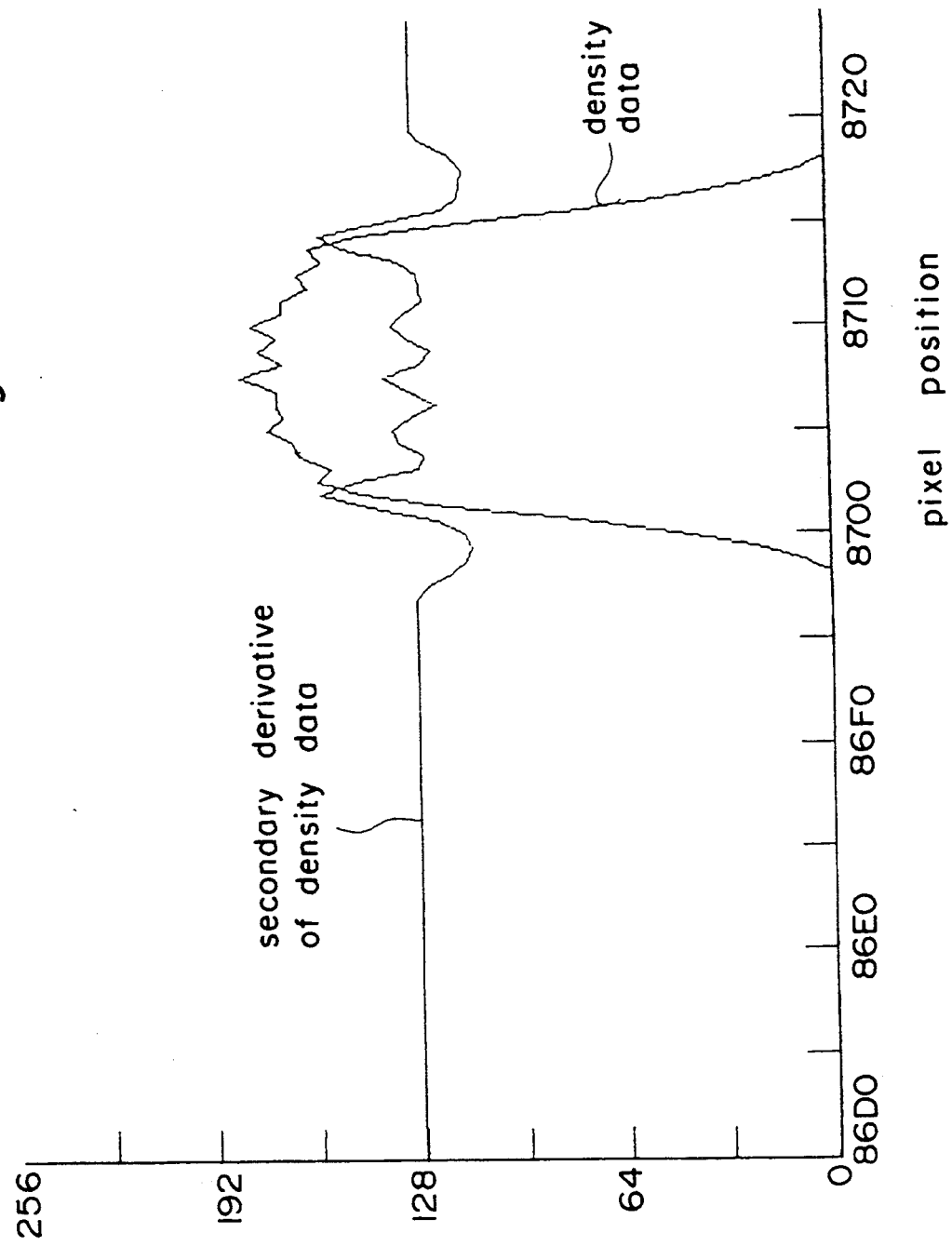
FIG. 74 is a graph of density data and its secondary derivative of the data of FIG. 73.
Figure 75:
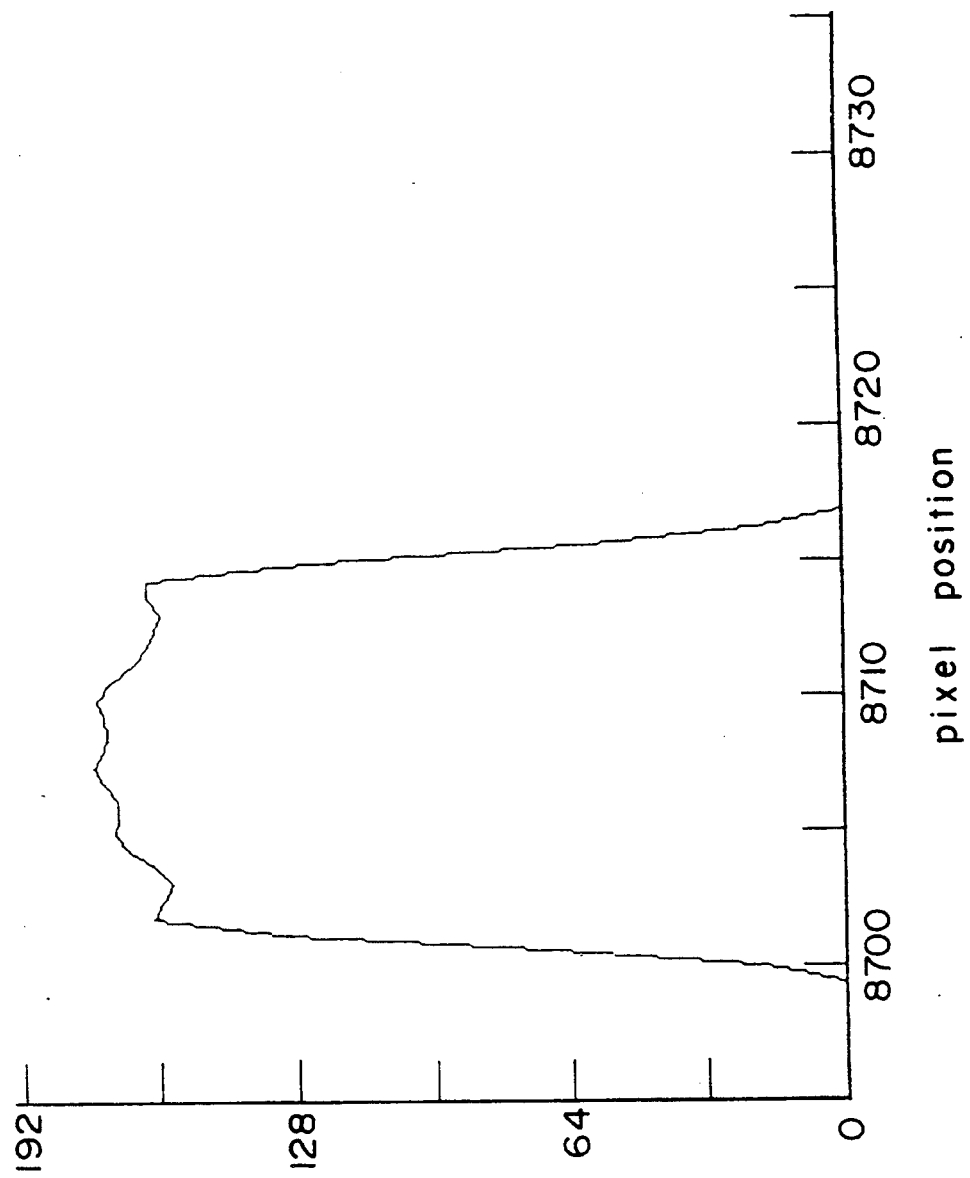
FIG. 75 is a graph of the result of the automatic MTF correction of the data of FIG. 74.

FIGS. 73-75 show an example of the automatic MTF correction for a document of a black line of 1 mm width. FIG. 73 shows the value data and its primary derivative. It is found that the value changes in response to the black line. Further, FIG. 74 shows the density data and its secondary derivative.

FIG. 75 shows the result of the automatic MTF correction. It is found that the smoothing effect is large at the flat portion of the image, while the gradient of the edge becomes large at the edge portions of the image. Therefore, the reproducibility of the image of black line is good.

Figure 76:
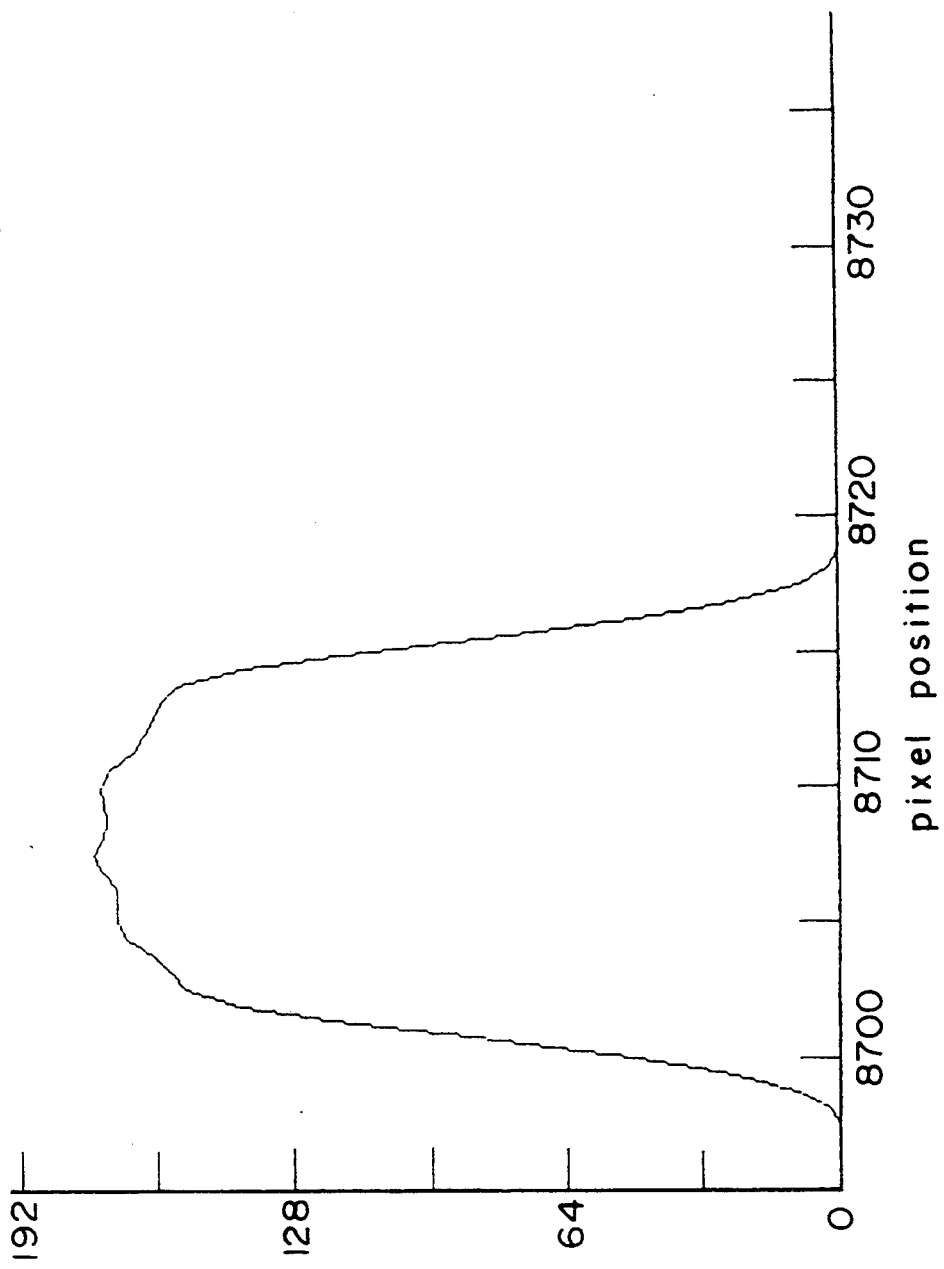
FIG. 76 is a graph of the result of smoothing (comparison example) of the data of FIG. 74.
Figure 77:
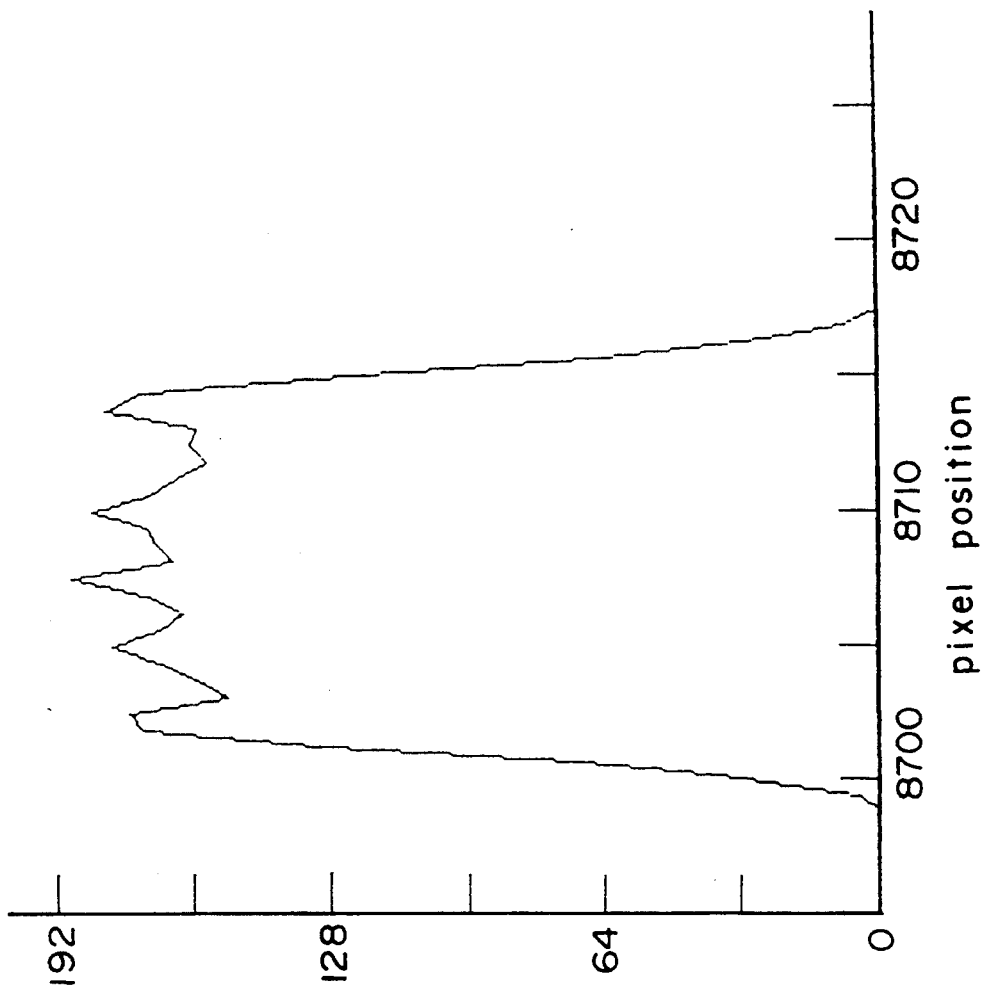
FIG. 77 is a graph of the result of edge emphasis (comparison example) of the data of FIG. 74.

For comparison, FIG. 76 shows the result of the smoothing, wherein the gradient of the edge becomes gradual. Further, FIG. 77 shows the result of the edge emphasis. It is found that the density changes largely at the flat portion of the image.

As explained above, the optimum MTF correction can be performed for any kind of image by using the automatic MTF correction of the present invention.

Though the above-mentioned MTF correction is applied to the full color mode, a similar MTF correction can be applied to the monochromatic color mode. In this case, a circuit as shown in FIG. 25 is used. In the monochromatic color mode, the read data can be treated as the value data. Therefore, the construction of the circuit can be simplified.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor, wherein each image data is processed to obtain image data for printing for each pixel, comprising:

a read means for reading a document image to send an image data of three primary colors of an additive color system;

an edge decision means for deciding an edge image portion according to the image data received from said read means;

an achromatic color decision means for deciding an achromatic color according to the image data received from said read means;

a generation means for generating image data of three primary colors in a subtractive color system and of a black color from the image data received from said read means;

a correction means for conducting edge emphasis processing not on the image data of the three primary colors in the subtractive color system, but on the image data of the black color, in an edge image portion of achromatic color decided by said edge decision means and said achromatic color decision means.

2. An image processor according to claim 1, further comprising a first signal generation means for generating a value signal from the image data obtained by said read means, wherein said edge decision means decides the edge image portion according the value signal.

3. An image processor according to claim 1, further comprising a second signal generation means for generating two kinds of color difference signals from the image data obtained by said read means, wherein said achromatic color decision means decides an achromatic color image portion according to the two kinds of color difference signals.

4. An image processor, wherein each image data is processed to obtain image data for printing for each pixel, comprising:

a read means for reading a document image to send an image data of three primary colors of an additive color system;

a calculation means for calculating the chroma from the image data received from said read means;

a generation means for generating image data of three primary colors in a subtractive color system and of a black color from the image data received from said read means;

a first determination means for determining an under color remove amount which is subtracted from the image data of the three primary color generated by said generation means according to the chroma calculated by said calculation means; and a second determination means for determining a black paint image data to be used as one of image data for printing according to the chroma calculated by said calculation means.

5. An image processor according to claim 4, wherein said first determination means increases the under color remove amount with increasing chroma.

6. An image processor according to claim 4, wherein said second determination means increases the black paint image data with increasing chroma.

7. An image processor, wherein each image data is processed to obtain image data for printing for each pixel, comprising:

a read means for reading a document image to send an image data;

a first generation means for generating a value signal from the image data obtained by said read means;

a first edge detection means for detecting a change in the value signal generated by said first generation means; deciding an edge image portion according to the image data received from said read means;

a second generation means for generating image data for printing from the image data obtained by said read means;

a second edge detection means for detecting a change in the image data for printing generated by said second generation means;

a synthesis means for synthesizing the change of the value signal detected by said first edge detection means and the change of the image data detected by said second edge detection means as to the same pixel in the document image; and a correction means for conducting edge emphasis processing on the image data for printing according to the change synthesized by said synthesis means.

8. An image processor according to claim 7, wherein said image data for a printing is image data for black color.

9. An image processor, wherein each image data is processed to obtain image data for color reproduction for each pixel, comprising:

a read means for reading a document image to send an image data of three primary colors of an additive color system;

a first generation means for generating a value signal from the image data obtained by said read means;

a first edge detection means for detecting a change in the value signal generated by said first generation means; deciding an edge image portion according to the image data received from said read means;

a second generation means for generating image data for color reproduction from the image data obtained by said read means;

a second edge detection means for detecting a change in the image data for color reproduction generated by said second generation means;

a synthesis means for synthesizing the change of the value signal detected by said first edge detection means and the change of the image data detected by said second edge detection means as to the same pixel in the document image; and a correction means for conducting edge emphasis processing on the image data for color reproduction according to the change synthesized by said synthesis means.

10. An image processor according to claim 9, wherein said synthesis means comprises means for obtaining a product of the change of the value signal obtained by said first edge detection means with the change of the image data for color reproduction obtained by said second edge detection means.

11. An image processor according to claim 9, wherein said correction means conducts the edge emphasis processing on a plurality of the image data for color reproduction successively.

12. An image processor according to claim 11, wherein said plurality of image data includes image data of three primary colors in a subtractive color system.

* * * * *